United States Patent [19]
Yoshida et al.

[11] Patent Number: 5,651,598
[45] Date of Patent: Jul. 29, 1997

[54] PROJECTOR

[75] Inventors: Kazushi Yoshida; Yasuyuki Tejima; Ryota Ogawa; Satoru Tachihara, all of Tokyo, Japan

[73] Assignee: Asahi Kogaku Kogyo Kabushiki Kaisha, Tokyo, Japan

[21] Appl. No.: 109,591

[22] Filed: Aug. 20, 1993

Related U.S. Application Data

[62] Division of Ser. No. 17,406, Feb. 11, 1993, Pat. No. 5,278,594, which is a continuation of Ser. No. 617,509, Nov. 23, 1990, abandoned.

[30] Foreign Application Priority Data

| Nov. 22, 1989 | [JP] | Japan | 1-304196 |
| Apr. 5, 1990 | [JP] | Japan | 2-091234 |
| Apr. 5, 1990 | [JP] | Japan | 2-091235 |
| Apr. 20, 1990 | [JP] | Japan | 2-105640 |
| Apr. 20, 1990 | [JP] | Japan | 2-105641 |

[51] Int. Cl.$^6$ ............................................. G03B 21/28
[52] U.S. Cl. .................................. 353/37; 353/34
[58] Field of Search ........................ 353/30, 31, 33, 353/37, 97, 98, 99, 122, 94, 69, 70; 348/744–745, 756–757, 778–782

[56] References Cited

U.S. PATENT DOCUMENTS

| 4,376,949 | 3/1983 | Rowe | 358/60 |
| 4,432,011 | 2/1984 | Lehnert | 358/60 |
| 4,458,993 | 7/1984 | Kempf | 353/94 |
| 4,679,069 | 7/1987 | Andrea et al. | 353/30 |
| 4,730,211 | 3/1988 | Hasegawa | 358/64 |
| 4,861,142 | 8/1989 | Tanaka et al. | 353/37 |
| 4,935,758 | 6/1990 | Miyatake et al. | 353/31 |
| 4,943,154 | 7/1990 | Miyatake et al. | 353/31 |
| 4,969,730 | 11/1990 | Van Der Brandt | 353/37 |
| 4,981,352 | 1/1991 | Tejima et al. | 353/37 |
| 5,010,397 | 4/1991 | Hasegawa | 358/64 |
| 5,012,274 | 4/1991 | Dolgoff | 340/702 |
| 5,042,921 | 8/1991 | Sato et al. | 359/40 |
| 5,105,265 | 4/1992 | Sato et al. | 353/31 |
| 5,181,054 | 1/1993 | Nicolas et al. | 353/37 |
| 5,311,227 | 5/1994 | Takayasu et al. | 353/31 |
| 5,394,204 | 2/1995 | Shijeta et al. | 353/37 |

FOREIGN PATENT DOCUMENTS

| 62-160437 | 7/1987 | Japan . |
| 1267612 | 10/1989 | Japan . |

*Primary Examiner*—William Dowling
*Attorney, Agent, or Firm*—Greenblum & Bernstein P.L.C.

[57] ABSTRACT

A projector has projecting optical systems. The projecting optical systems have image formers and projecting lenses for projecting the images onto a screen. The optical axes of the projecting lenses are intersected with each other on the side of the screen. The image formers are arranged such that an image surface of each image former is coincident with the screen in accordance with Scheimpflug's rule.

102 Claims, 44 Drawing Sheets

FIG. 3
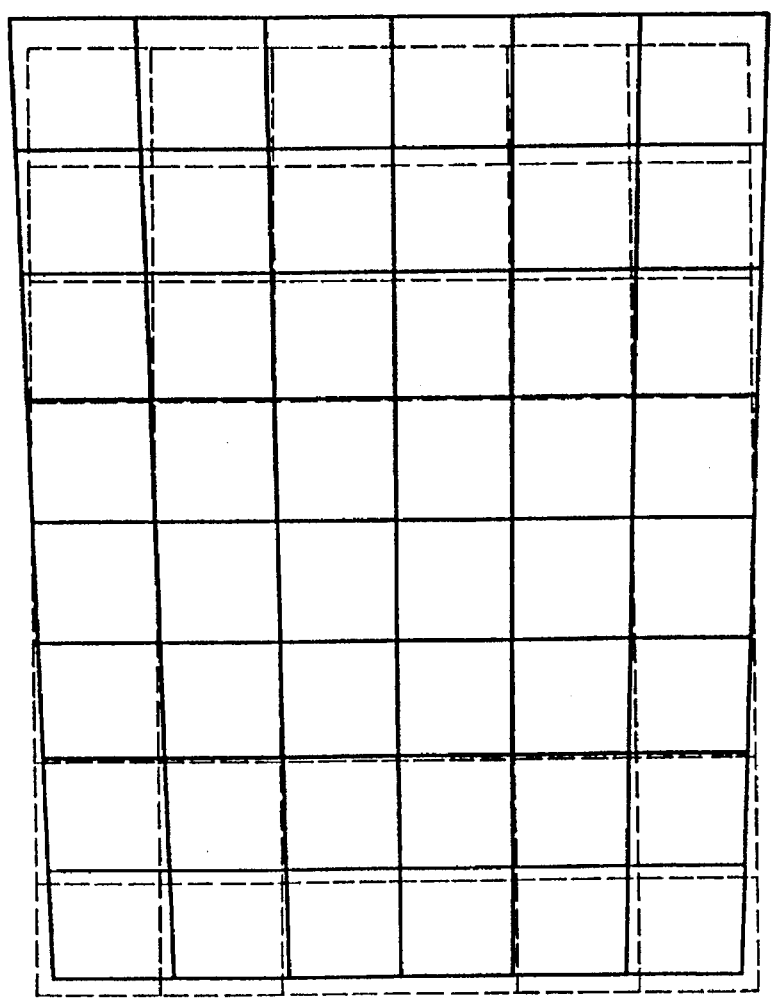
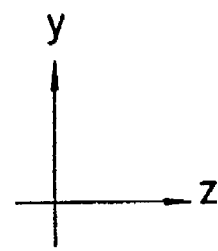

FIG. 11
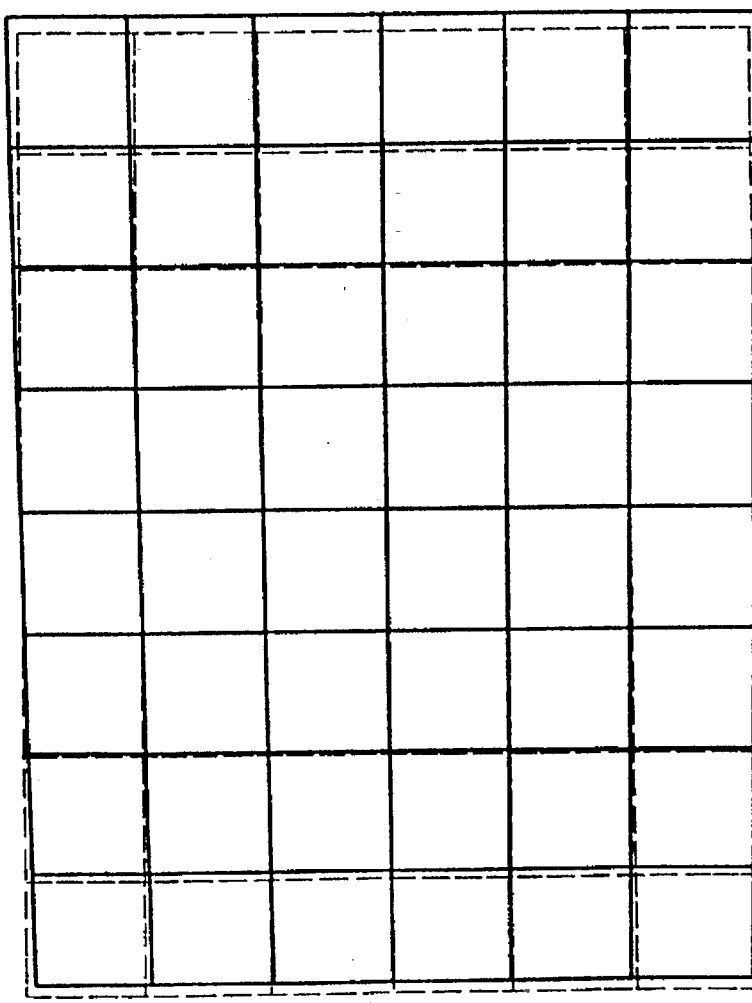
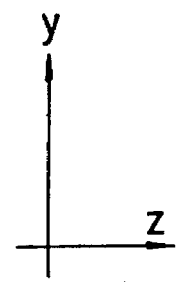

F I G. 28
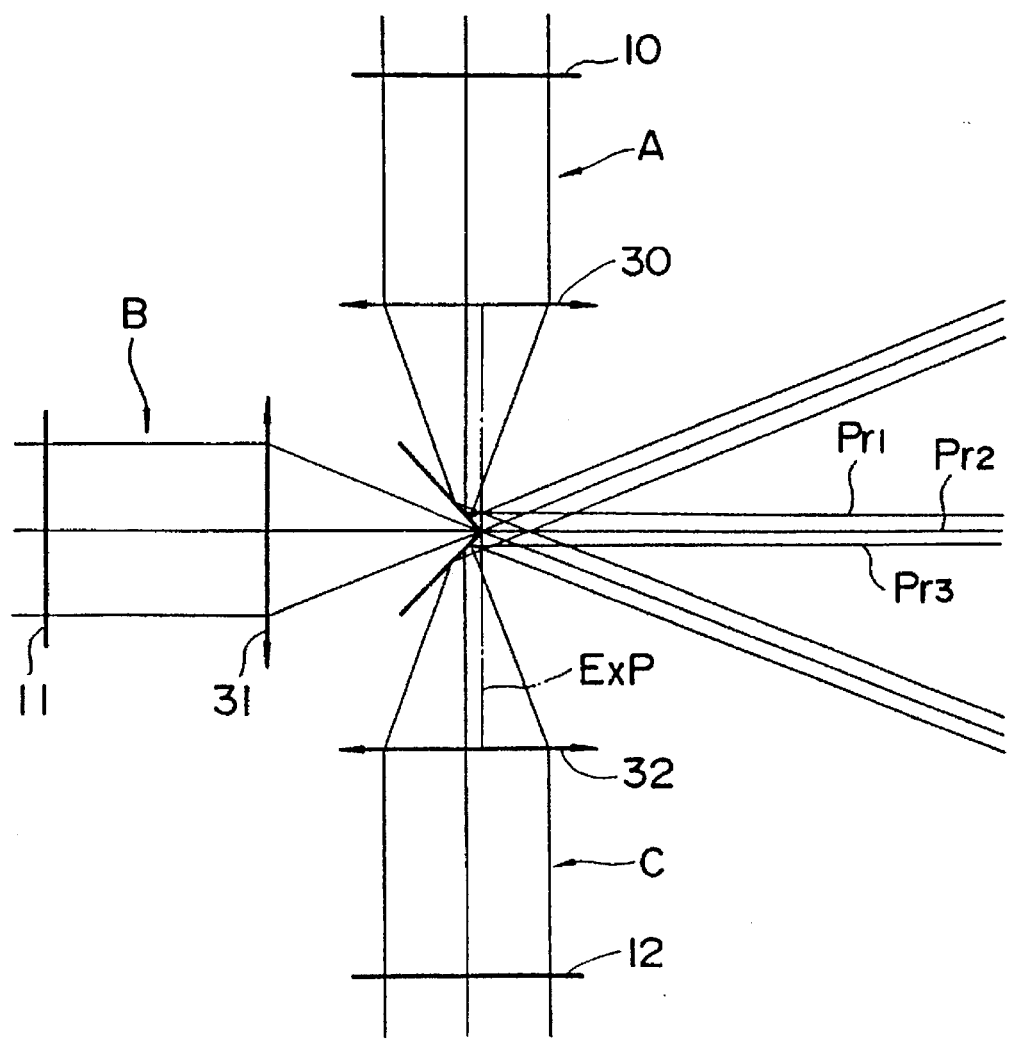

F I G. 30
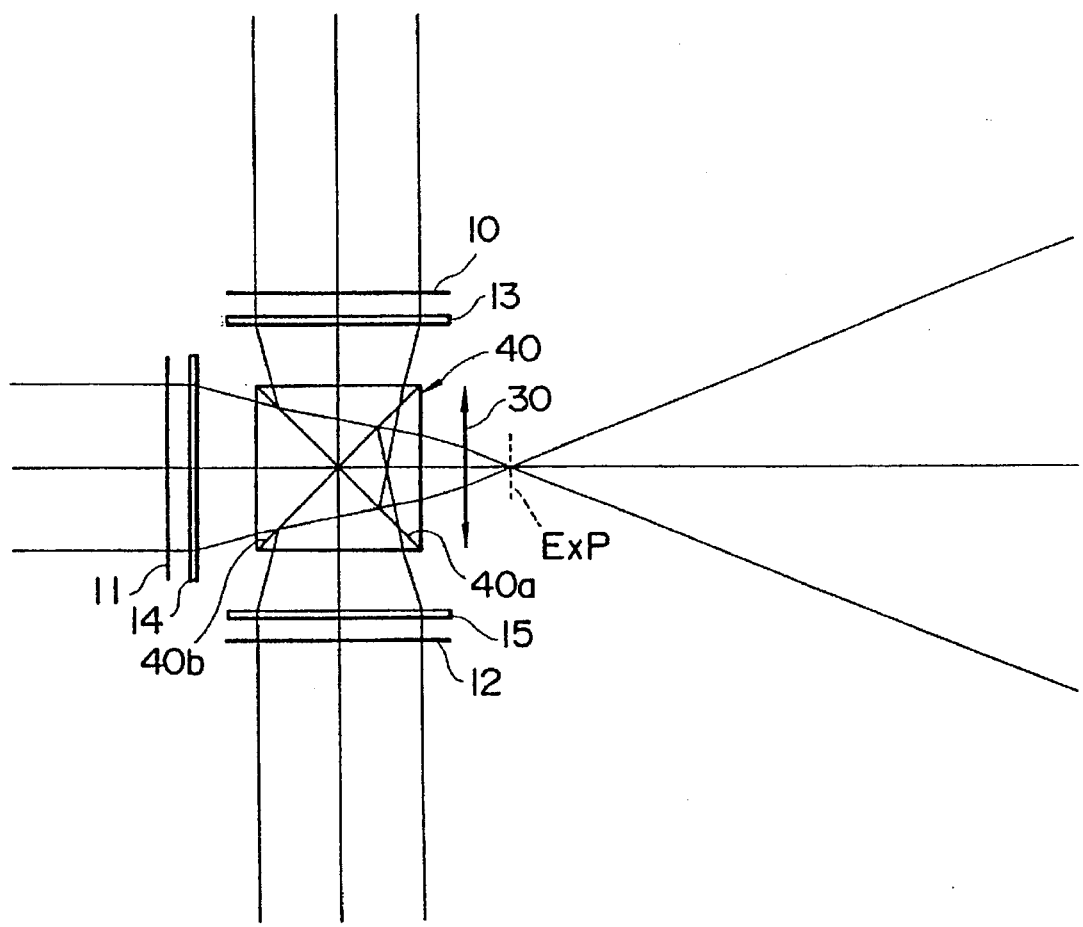

F I G. 39
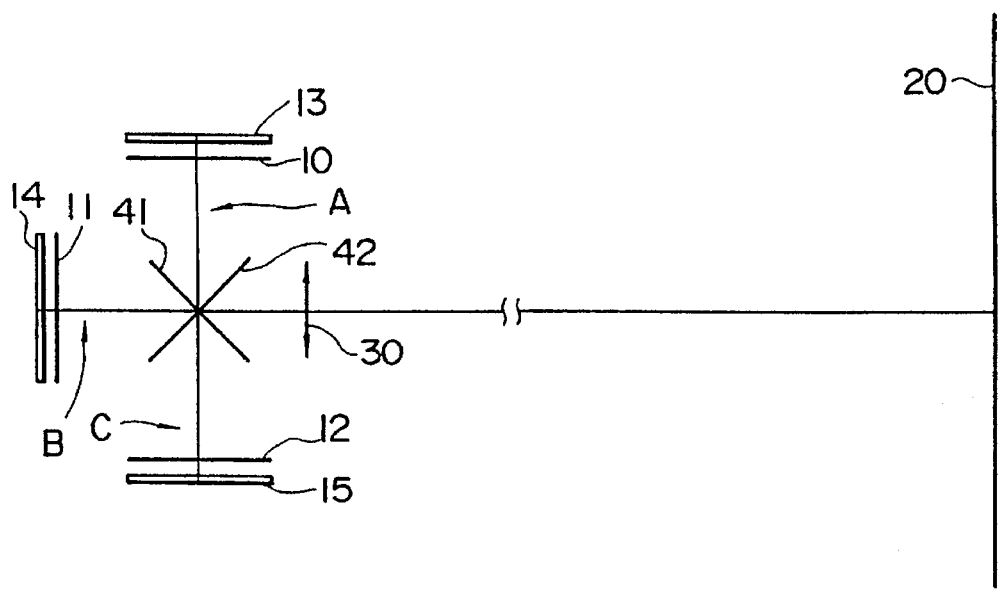
F I G. 40
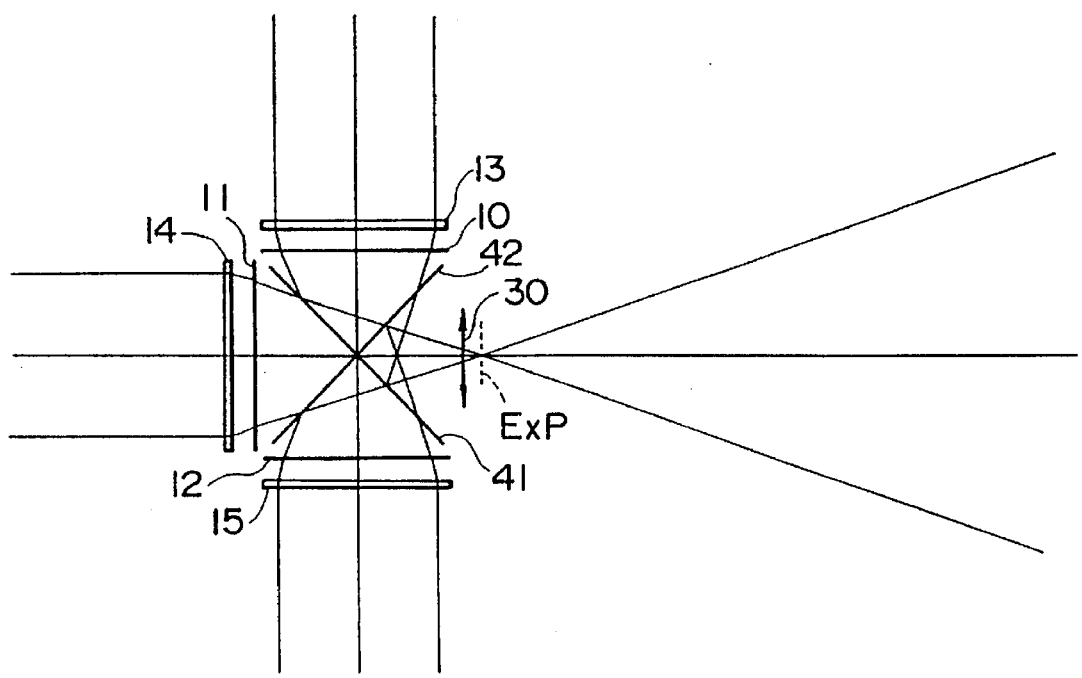

PROJECTOR

This application is a division of application Ser. No. 08/017,406, filed Feb. 11, 1993, U.S. Pat. No. 5,278,594 which is a continuation of U.S. Ser. No. 07/617,509, filed Nov. 23, 1990, now abandoned.

BACKGROUND OF THE INVENTION

1. Field of the Invention

This invention relates to a projector such as a video projector, a liquid crystal projector or the like, and particularly to a projector for projecting images of image forming means which correspond to the colors of, for example, B (blue), G (green) and R (red), onto a screen in an overlapping fashion to form a composite multicolor image.

2. Description of the Prior Art

FIG. 71 shows the optical system of a conventional projector. The projector in FIG. 71 has image forming means 1, 2, 3 such as a liquid crystal display (hereinafter referred to as the "LCD") or as a CRT. The image forming means form pictures, and projecting lenses 4, 5 and 6 having optical axes Ax1, Ax2, Ax3 are perpendicular to each image forming means. The image forming means 1 and the lens 4 comprise a projecting optical system A. The image forming means 2 and the lens 5, and the image forming means 3 and the lens 6 comprise projecting optical systems B, C. In FIG. 71, principal rays emitting from three points of each image forming means are shown.

The optical axis Ax2 of the central projecting lens 5 is perpendicular to a screen 7 onto which images are projected, while the optical axes Ax1, Ax3 of the projecting lenses 4, 6 intersect with the optical axis Ax2 of the projecting lens 5 on the screen and are not perpendicular to the screen 7.

It is defined here that the optical axis Ax1 is the x-axis, the crossline between a plane including three optical axes and the screen is the y-axis, and the direction perpendicular to the y-axis on the screen is the z-axis.

FIG. 72 shows an optical path of the projecting optical system C of FIG. 71. The luminous flux as shown in this Figure is converged most in the projecting lens 6.

However, the above-mentioned conventional projector has problems since images formed by the projecting optical systems A, C are angled with respect to the screen. As a result, distortion is generated and a focus error of an image is generated in the peripheral portion in the y-axis direction.

Next, the degree of focus error in the above-mentioned construction will be described concretely by applying concrete numerical figures.

The image forming means is an LCD of three inches size. The display area is about 46 mm×61 mm. The LCD is provided on the periphery of the display area with a lead frame or a substrate for mounting a drive IC. In this example, the substrate measures 160 mm in the width direction. When, therefore, the LCDs are arranged side by side as shown in FIG. 71, the distance between the centers of the adjacent LCDs is a minimum of 160 mm. Also, it is arranged such that the focal lengths of the projecting lenses 4, 5, 6 are 75 mm, the magnification is −15.5 times, the distances from the image forming means to the corresponding projecting lenses are 79.8 mm, the distances from the projecting lenses to the screen are 1237.5 mm, and the distances from the central projecting lens 5 to the peripheral projecting lenses 4,6 are 160 mm, respectively. According to this arrangement, the angle formed between the optical axis Ax2 of the central projecting lens 5 and the optical axes Ax1, Ax3 of the projecting lenses 4, 6 is 7.4°.

FIG. 73 shows a distortion and spot diagram of the image when lattice image forming means are projected to the screen by the projecting optical systems B, C. Since the spot diagram appears symmetrically with reference to the y-axis, only one side is shown in the Figure.

A lattice indicated by broken lines in the Figure is an image projected by the system C, while the lattice indicated by a solid line is an image projected by the system B. Since the projecting optical system C has such distortion, a point expressed by the coordinate (y , z)=(30.5,22.9) on the LCD 12 is imaged at a point of (y , z)=(−454.0,−337.7) on the screen, while a point expressed by the coordinate (y , z)=(−30.5,22.9) on the LCD 12 is imaged at a point (y , z)=(501.1,−372.7) on the screen. If there were no distortion of the image, the point on the LCDs should be imaged at points (y , z)=(±472.4,−354.3) on the screen.

The dots in the Figure show dispersion of luminous flux on each point. If the image plane coincides with the screen, that is, if there is no focus error at any points, luminous flux is focused into one point. The size of the dot corresponds to the focus error of the image at the relevant points. FIG. 73 shows the dispersion of the luminous flux enlarged by 20 times.

A projection image projected by the other peripheral projecting optical system A generates a focus error and a line distortion symmetric with the image formed by the projecting optical system C reference to the z-axis.

In order to reduce the focus error of an image, there has also been proposed a projector of the type shown in FIG. 74.

The luminous flux having the components R, G and B and coming from the image forming means 1, 2 and 3 are overlapped by a dichroic prism 8 and projected to the screen 7 by the projecting lens 9. In order to overlap the luminous flux, a dichroic mirror is also used besides the dichroic prism 8.

According to this method, since the luminous flux from each image forming means is projected onto the screen 7 by a single projecting lens, no focus error and distortion are generated.

However, in the construction shown in FIG. 74, the parallel luminous flux is made incident to the dichroic prism and the prism is required to be the same size as the image forming means. If, therefore, the size of the image forming means is made large in order to improve the resolution of the image, the prism and the projecting lens must also be large and high cost results.

The same problem is present when a dichroic mirror is used.

SUMMARY OF THE INVENTION

This invention has been developed to solve the above-mentioned problems. It is, therefore, a general object of the invention to provide a projector which is capable of preventing the focus error of each image on the screen and avoiding the cost increase of the apparatus by not requiring the diameter of the projecting lens to be made large.

The general object is addressed by providing:

a projector having projecting optical systems including image forming means for forming images and projecting lenses for projecting the images onto a screen, wherein optical axes of the projecting lenses are intersected with each other on one side of the screen. The image forming means are arranged such that an image surface of each image forming means coincides with the screen in accordance with the Scheimpflug rule. The projecting lenses associated with each projecting optical system have the same performance.

Further provided is a projector having a central projecting optical system having an optical axis perpendicular to a screen and two peripheral projecting optical systems disposed on both sides of the system, wherein image forming means of the central projecting optical system is perpendicular to the optical axis of the system, said image forming means of the peripheral projecting optical systems are tilted relative to the optical axes of the systems.

Also, a projector having projecting optical systems including image forming means for forming images and projecting lenses for projecting the images onto a screen is provided, wherein optical axes of the projecting lenses are perpendicular to the screen and the image forming means are perpendicular to the optical axes of the projecting lenses. The image surfaces of the image forming means coincide with each other on the screen. The projecting lenses are lenses all having the same performance.

Alternatively, at least one of the projecting lenses of the projecting systems may be different from the others.

A projector having a central projecting optical system perpendicular to a screen is provided, in which two peripheral projecting optical systems are disposed on both sides of the system. Image forming systems of the central projecting optical system are symmetrically arranged with reference to an optical axis of a projecting lens of the system. Image forming means of the peripheral projecting optical systems are symmetrically arranged with respect to optical axes of projecting lenses of the systems.

In this embodiment, an image circle of the projecting lens of the central projecting optical system is smaller than that of the projecting lens of each of the peripheral projecting optical systems.

A projector having projecting optical systems including image forming means for forming images and projecting lenses for projecting the images onto a screen is provided, in which optical axes of the projecting lenses are intersected with each other on one side of the screen, and at least one of the projecting lenses includes a mirror adapted to deflect the optical axis toward the screen. As an example, the mirror may be a total reflection mirror. Also, the mirror may be a dichroic mirror.

The projecting lenses of the projecting optical systems of this embodiment are comparable lenses.

Alternatively, at least one of the projecting lenses of the projecting optical systems may be different from the others.

Further, a pivot mechanism is provided for pivoting the mirror for adjustment.

A projector having a central projecting optical system perpendicular to a screen, and two peripheral projecting optical systems disposed on both sides of the system, with each of the peripheral projecting optical systems including a mirror adapted to deflect the optical axis toward the screen, includes a pivot mechanism for pivoting at least one of the mirrors.

Also discussed is a projector having a plurality of image forming means, an auxiliary lens for reducing the diameter of luminous flux coming from each image forming means, and a projecting lens for projecting the luminous flux transmitted through the auxiliary lenses.

Alternatively, a projector includes projecting optical systems including image forming means forming images and auxiliary lenses adapted to reduce the diameter of luminous flux projected from the image forming means, a projecting lens for projecting luminous flux coming from each of the projecting optical systems onto a screen. At least one of the projecting optical systems includes a mirror adapted to reflect the luminous flux in order that the luminous flux is made incident to the projecting lens.

A projector is disclosed wherein the image forming means of the projecting optical system including the mirror are asymmetrically arranged with respect to the optical axis of the auxiliary lens, and the image forming means of the projecting optical systems including no mirror are symmetrically arranged with respect to the optical axis of the auxiliary lens.

A projector includes projecting optical systems having image forming means for forming images, and auxiliary lenses adapted to reduce the diameter of luminous flux projected from the image forming means. A projecting lens is provided for projecting luminous flux coming from each projecting optical system onto a screen. At least one of the projecting optical systems includes a mirror adapted to reflect the luminous flux in order that the luminous flux is made incident to the projecting lens.

Further, the image forming means which includes the mirror are asymmetrically arranged with respect to the optical axis of the auxiliary lens, and the image forming means including no mirror are symmetrically arranged with respect to the optical axis of the auxiliary lens.

A projector having three projecting optical systems is disclosed, and includes image forming means for forming images of different color components. Three projecting lenses for projecting luminous flux coming from the projecting optical systems onto a screen are included, as well as a first dichroic mirror disposed in such a manner as to cover a half of an optical path, and adapted to permit the color components of the first projecting optical system to transmit and reflect the color components of the second projecting optical system. A second dichroic mirror is disposed in such a manner as to cover a half of the optical path of the projecting optical systems, and adapted to permit color components of the first projecting optical system and reflect the color compositions of a third projecting optical system.

Further, each of the projecting optical systems includes an auxiliary lens adapted to reduce the diameter of luminous flux made incident to the projecting lens from the image forming means, and the projecting lens is disposed between the first and second dichroic mirrors and the screen.

The image forming means of said first projecting optical system of this embodiment are symmetrically arranged with reference to the optical axis of the auxiliary lens. The image forming means of the second and third projecting optical systems are asymmetrically arranged with reference to the optical axis of the auxiliary lens.

Each of the projecting optical systems may include an auxiliary lens adapted to reduce the diameter of luminous flux made incident to the image forming means from a light source, and the projecting lens is disposed between the first and second dichroic mirrors and the screen.

Alternatively, a projector is provided wherein each of the projecting optical systems includes a projecting lens disposed between the image forming means and the first and second dichroic mirrors.

The image forming means of the first projecting optical system may be symmetrically arranged with reference to the optical axis of the projecting lens, and the image forming means of the second and third projecting optical systems may be asymmetrically arranged with the optical axis of the projecting lens.

A projector having projecting optical systems including image forming means for forming images corresponding to different color components is provided, and has an auxiliary lens system for reducing the diameter of luminous flux projected from the image forming means. A projecting lens projects the luminous flux coming from each of the projecting optical systems onto the screen, and a dichroic mirror surface reflects color components from one of the projecting optical systems and permits color components of the luminous flux coming from the other projecting optical system, so that the luminous flux coming from the projecting optical systems are overlapped and made incident to the projecting lens.

A projector is disclosed which has two dichroic mirror surfaces which are intersected with each other. Further, the dichroic mirror surfaces may be disposed within a prism.

Alternatively, the dichroic mirror surfaces may be plate-like mirrors.

Still further, a projector is disclosed to have two dichroic mirror surfaces which are independently disposed in different positions on the optical path.

The auxiliary lens system functions to make the luminous flux made incident to said dichroic mirror surface into parallel luminous flux.

An auxiliary lens may be disposed between said projecting lens and said dichroic mirror surface.

A projector having projecting optical systems including image forming means adapted to form images, and projecting lenses for projecting images onto a screen, and a dichroic mirror surface disposed to an intersecting part of the optical axes of the projecting lenses and adapted to reflect color components from one of the projecting optical systems and to permit color components of the luminous flux coming from the other projecting optical system is disclosed. The luminous flux coming from the projecting optical systems are thereby overlapped.

The projector further includes an auxiliary lens disposed between the image forming means and the projecting lenses and is adapted to reduce the diameter of the luminous flux made incident to the projecting lens.

The auxiliary lens is adapted to make the luminous flux incident to the image forming means into a convergent luminous flux.

Further, the projector may include two dichroic mirror surfaces which are intersected with each other.

The dichroic mirror surfaces may be disposed within a prism, or may be provided as plate-like mirrors.

Alternatively, the two dichroic mirror surfaces may be erected from different positions on an optical path of the projector.

BRIEF DESCRIPTION OF THE DRAWINGS

FIG. 3 is a schematic view showing the distortion of a projection pattern formed by the optical system of FIG. 2;

FIG. 11 is a schematic view showing the distortion of a projection pattern formed by the optical system of FIG. 10;

FIG. 28 is an enlarged view of the light path overlapping portion in FIG. 27;

FIG. 30 is an enlarged view of the light path overlapping portion in FIG. 29;

FIG. 39 is a schematic view of a projector of embodiment 17 according to the present invention;

FIG. 40 is an enlarged view of the light path overlapping portion in FIG. 39;

DETAILED DESCRIPTION OF THE EMBODIMENTS

The present invention will now be described with reference to the accompanying drawings. The present disclosure relates to subject matter contained in Japanese patent applications No. HI-304196 (filed on Nov. 22, 1989), H2-91234 (filed on Apr. 5, 1990), H2-91235 (filed on Apr. 5, 1990), H2-105640 (filed on Apr. 20, 1990), and H2-105641 (filed on Apr. 20, 1990), all of which are expressly incorporated herein by reference in their entirety.

Embodiment 1

Figure 1:
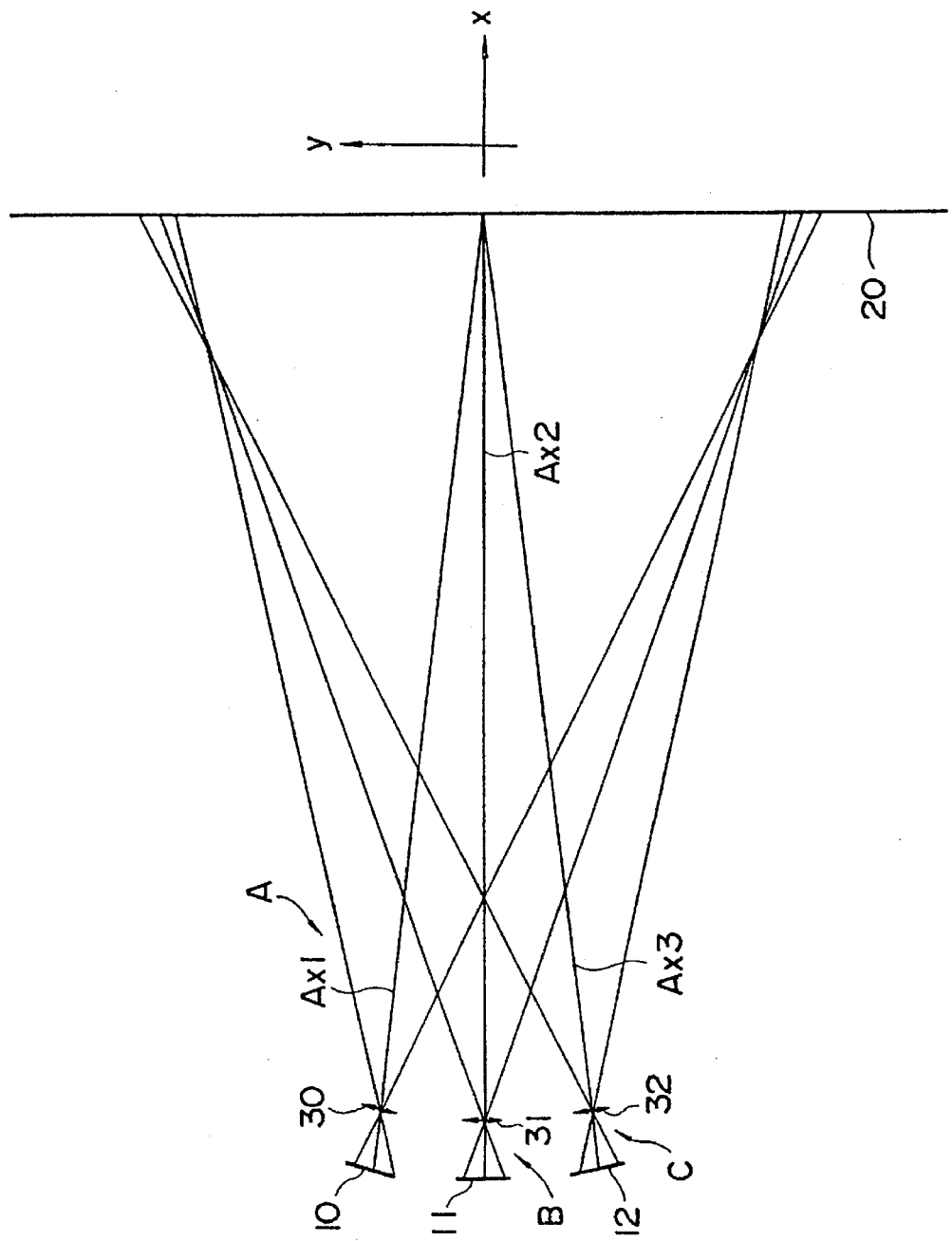
FIG. 1 is a schematic view of a projector of embodiment 1 according to the present invention.
Figure 2:
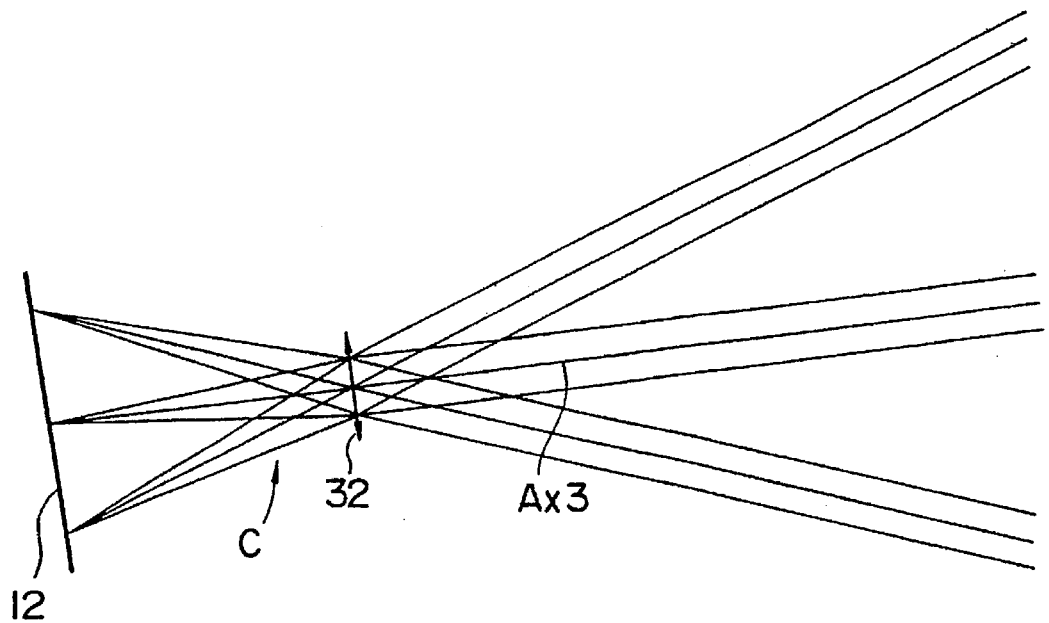
FIG. 2 is an enlarged view showing one of the peripheral projecting optical systems in FIG. 1.

FIGS. 1–3 show the projector of embodiment 1.

The projector, as shown in FIG. 1, is a color projector having three projecting optical systems A, B and C comprising three LCDs 10, 11 and 12 providing image forming means for forming images corresponding to colors R, G and B, and three projecting lenses 30, 31 and 32 disposed corresponding to the LCDs and adapted to project images onto a screen 20.

Disposed behind the LCDs are light sources (not shown) for the colors RGB. By luminous flux corresponding to the colors transmitted through the LCDs, images are formed onto the screen in an overlapping fashion through the corresponding projecting lenses.

In the description of the embodiment, one must keep in mind that the projecting lenses are ideal lenses in which the distance between two principal points is 0 and which have no aberration, and the three lenses mentioned are mutually compatible with one another. In FIG. 1, three principal rays are shown for each LCD.

The optical axis Ax2 of the central projecting lens 31 is vertical or perpendicular to the screen 20, while the optical axes Ax1, Ax3 of the projecting lenses 30, 32 intersect with the optical axis Ax2 of the projecting lens 31 at one point on the screen 20.

The LCD 11 of the central projecting optical system B is disposed so that it is vertical or perpendicular to the optical axis Ax2 of the projecting lens 31, while perpendicular lines of the LCDs 10, 12 of the peripheral projecting optical systems A, C are tilted with respect to the optical axes Ax1, Ax3 so that the image surfaces coincide with the screen 20 in accordance with the Scheimpflug rule.

The screen 20 is of a known structure provided with a Fresnel lens on its projecting lens side and with a lenticular pattern on its side that is visible to the naked eye. The directions of rays of light coming from the image forming means are orderly arranged with the Fresnel surface and the angle of view field being adjusted by the lenticular pattern.

It is defined here, as in the case of the prior art description, that the optical axis Ax1 is the x-axis, the crossline between a plane including three optical axes and the screen is the y-axis, and the direction perpendicular to the y-axis on the screen is the z-axis.

Concrete numerical examples will now be described.

In the embodiments which will be described hereinafter, the image forming means is an LCD of three inches size, the display area of which is about 46 mm×61 mm, and a substrate of which is 160 mm in the width direction.

focal length of the projecting lenses: 75 mm magnification: −15.5 times distance from the image forming means to the lens: 79.8 mm distance from the lenses to the screen: 1237.5 mm distances between the central projecting lens 31 and the peripheral projecting lenses 30, 32: 160 mm The perpendicular lines of the LCDs 10, 12 form an angle of 0.5° with the optical axes Ax1, Ax3 of the projecting lenses 30, 32, and the angle formed between the optical axis AX2 of the central projecting lens 31 and the optical axes Ax1, Ax3 of the peripheral projecting lenses 30, 32 is 7.4°.

FIG. 2 is a view showing one of the optical systems of FIG. 1, i.e., the peripheral projecting optical system C in its enlarged scale together with the luminous flux emitted thereby.

FIG. 3 is a view showing the distortion of an image which is formed when lattice image forming means are projected onto the screen by the peripheral projecting optical systems B, C.

One pattern, indicated by broken lines in the Figure, is a projected image by the system B, while the other pattern, indicated by a solid line, is the same image by the system C. Since the projecting optical system C has distortion, the coordinate (y, z)=(30.5,22.9) on the LCD 12 is imaged at a point of (y, z)=(−452.6,−336.6) on the screen, while the coordinate (y, z)=(−30.5,22.9) on the LCD 12 is imaged at a point (y, z)=(502.8,−374.0) on the screen. If the projecting optical system C has no distortion, these points should be imaged at points (y, z)=(±472.4,−354.3) on the screen.

Figure 18:
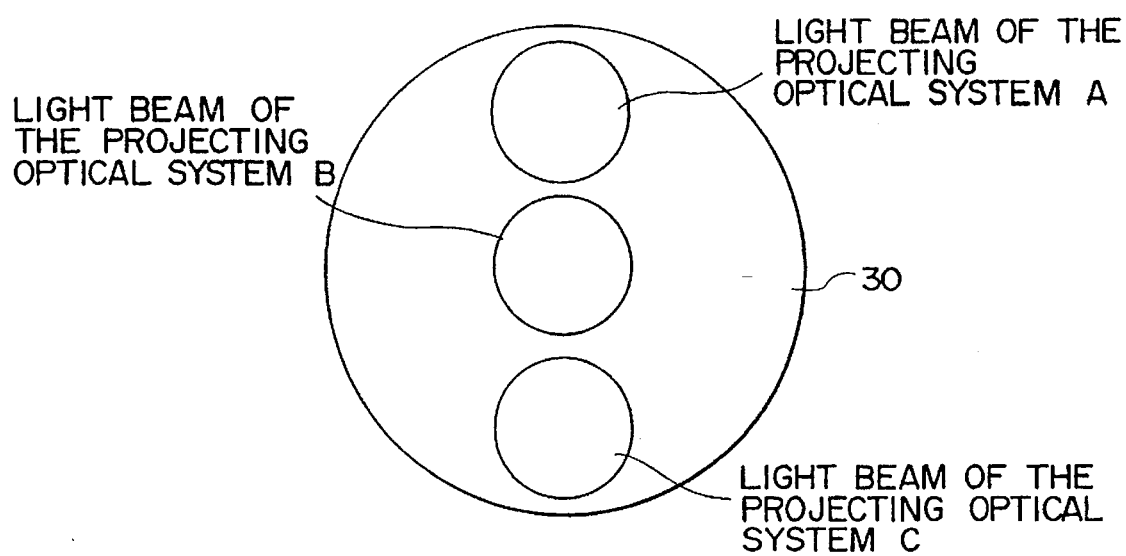
FIG. 18 is a schematic view showing the position of the luminous flux transmitted by the projecting lens in FIG. 16.

In the construction of this embodiment, since the image surface coincides with the screen and the luminous flux from one point on the LCD 12 is imaged at one point on the screen, the irregularity of the spots shown by dots in FIG. 18 is not detected.

An image formed by the central projecting optical system B is projected onto the screen as a regular image without focus error and distortion, while an image formed by the other peripheral projecting optical system A is projected onto the screen with a distortion symmetric with the image formed by the peripheral projecting optical system C.

Embodiment 2

Figure 4:
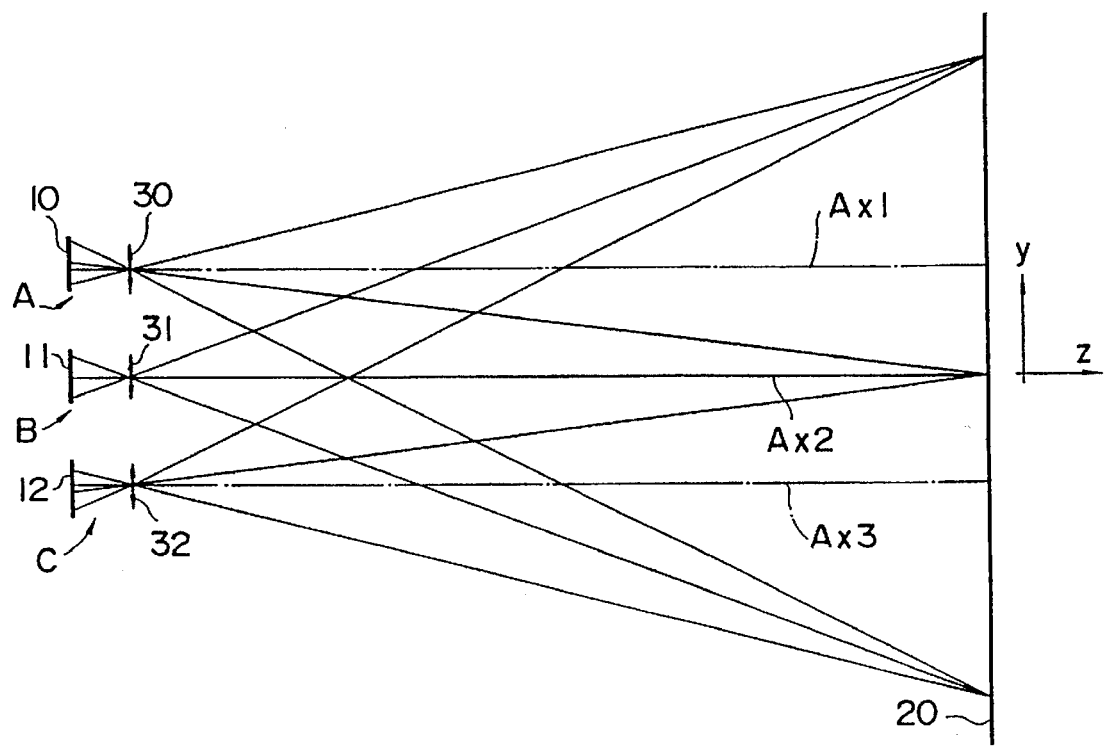
FIG. 4 is a schematic view of a projector of embodiment 2 according to the present invention.
Figure 5:
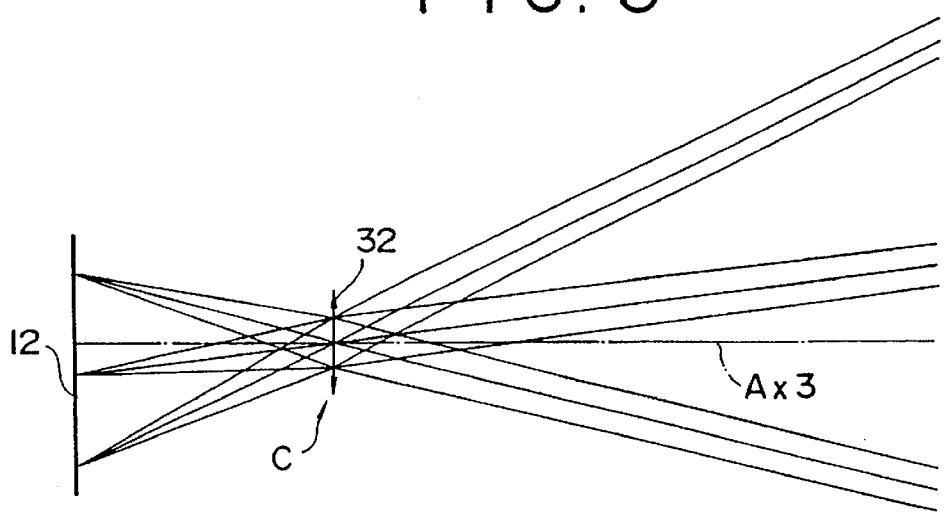
FIG. 5 is an enlarged view showing one of the peripheral projecting optical systems in FIG. 4.

FIGS. 4 and 5 show embodiment 2 of the projector according to the present invention. Identical materials to those of embodiment 1 are denoted by identical reference numerals in the embodiments as will be described hereinafter and duplicate descriptions will be omitted.

In embodiment 1, the projector has an inconvenience that a trapezoidal distortion of an image cannot by eliminated, although the focus error can successfully be eliminated. There is thus shown a construction in embodiment 2 wherein both the focus error and trapezoidal distortion can be reduced.

As shown in FIG. 4, all of the optical axes Ax1, Ax2, Ax3 of the projecting lenses 30, 31, 32 are perpendicular to the screen 20. Also, each of the LCDs 10, 11, 12 is disposed so that it is perpendicular to the optical axis of the corresponding projecting lens. In the central projecting optical system B, the LCD 11 is symmetrically arranged with reference to the optical axis Ax2, while in the peripheral projecting optical systems A, C, the LCDs 10, 12 are disposed such that they are shifted in the y-axis direction relative to the optical axes Ax1, Ax3 of the corresponding projecting lenses.

A numerical example for embodiment 2 will now be described:

focal length of the projecting lenses: 75 mm magnification: −15.5 times distances between the central projecting lens 31 and the peripheral projecting lenses 30, 32: 160 mm FIG. 5 is a view showing the peripheral projecting optical system C in its enlarged state together with the luminous flux. The shift amount of the LCD 12 relative to the optical axis Ax3 is 10.3 mm.

The coordinate expressed by (y, z)=(±30.5,22.9) on each LCD 10, 12 is imaged at points expressed by (y, z)= (±472.4,− 354.3) on the screen. This coordinate is the same to the projecting point by the projecting optical system B.

According to embodiment 2, both the focus error and trapezoidal distortion are obviated.

In the construction of embodiment 2, since the luminous flux from the LCDs 10, 12 of the peripheral projecting optical systems A, C is made incident to the projecting lenses 30, 32 at angles, the projecting lenses 30, 32 of the peripheral projecting optical system A, C are required to have larger image circles than the projecting lens 31 of the central projecting optical system B. Therefore, if the projecting lenses are not made all the same, in other words, if a lens of a small image circle is used as the projecting lens 31 and lenses of a large image circle are used as the projecting lenses 30, 32, the total cost of the lenses can be reduced.

The quality of the image is deteriorated first from the peripheral portion due to a decrease of light quantity in this position. The expression "image circle" refers to a circle which serves as a border line between a portion where the quantity of an image is sufficiently clear for use in a projector and another portion where the quality of an image is not clear enough to satisfy the requirements for use in a projector.

Embodiment 3

Figure 6:
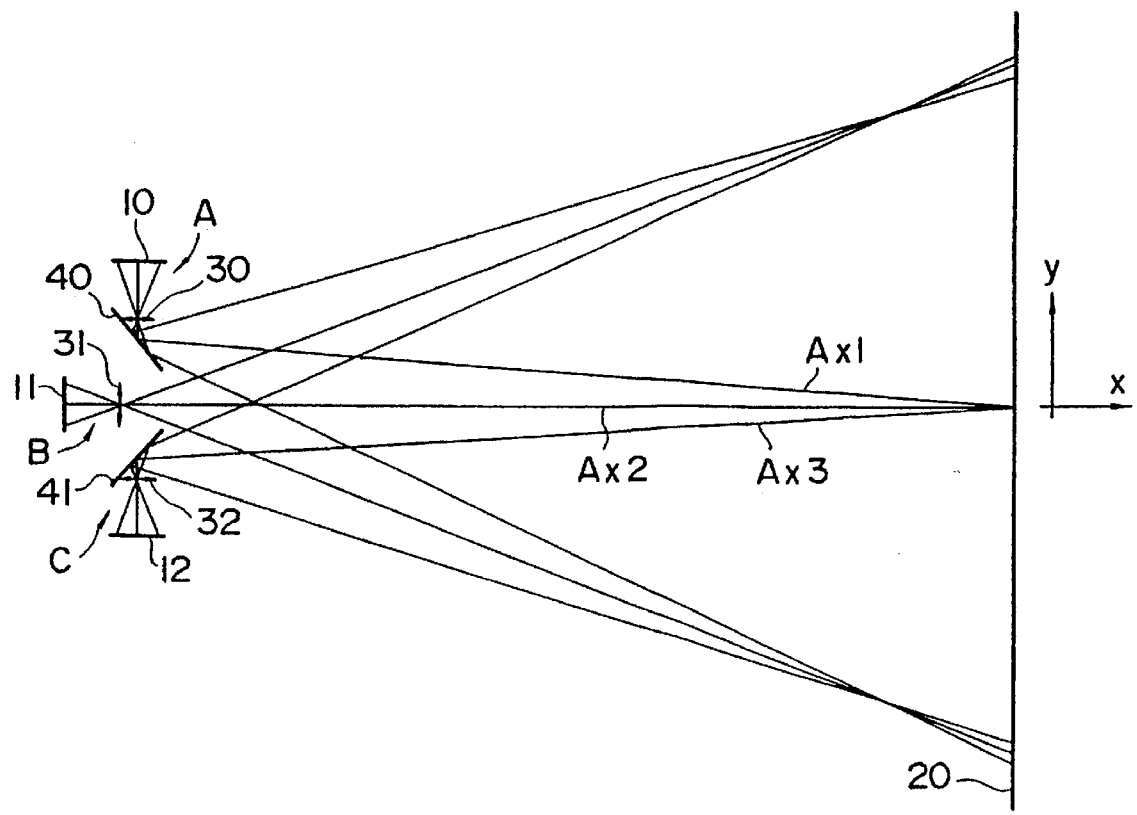
FIG. 6 is a schematic view of a projector of embodiment 3 according to the present invention.
Figure 7:
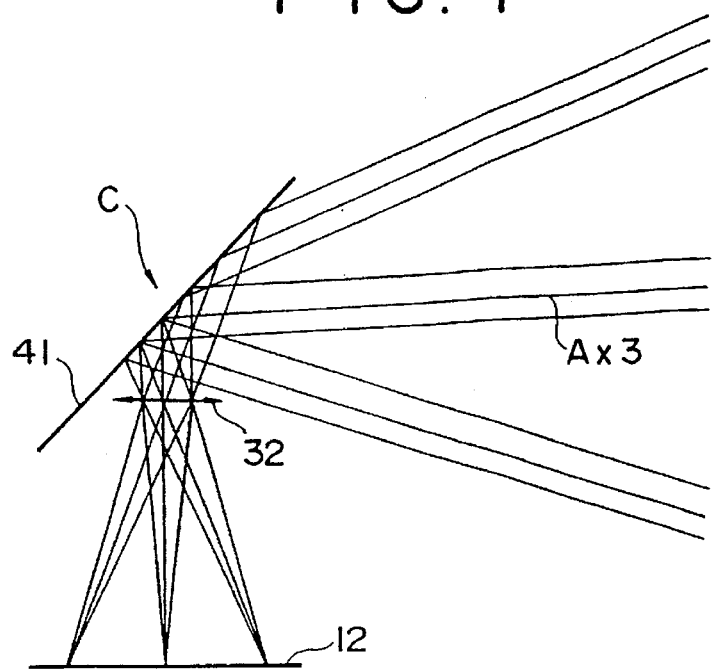
FIG. 7 is an enlarged view showing one of the peripheral projecting optical systems in FIG. 6.
Figure 8:
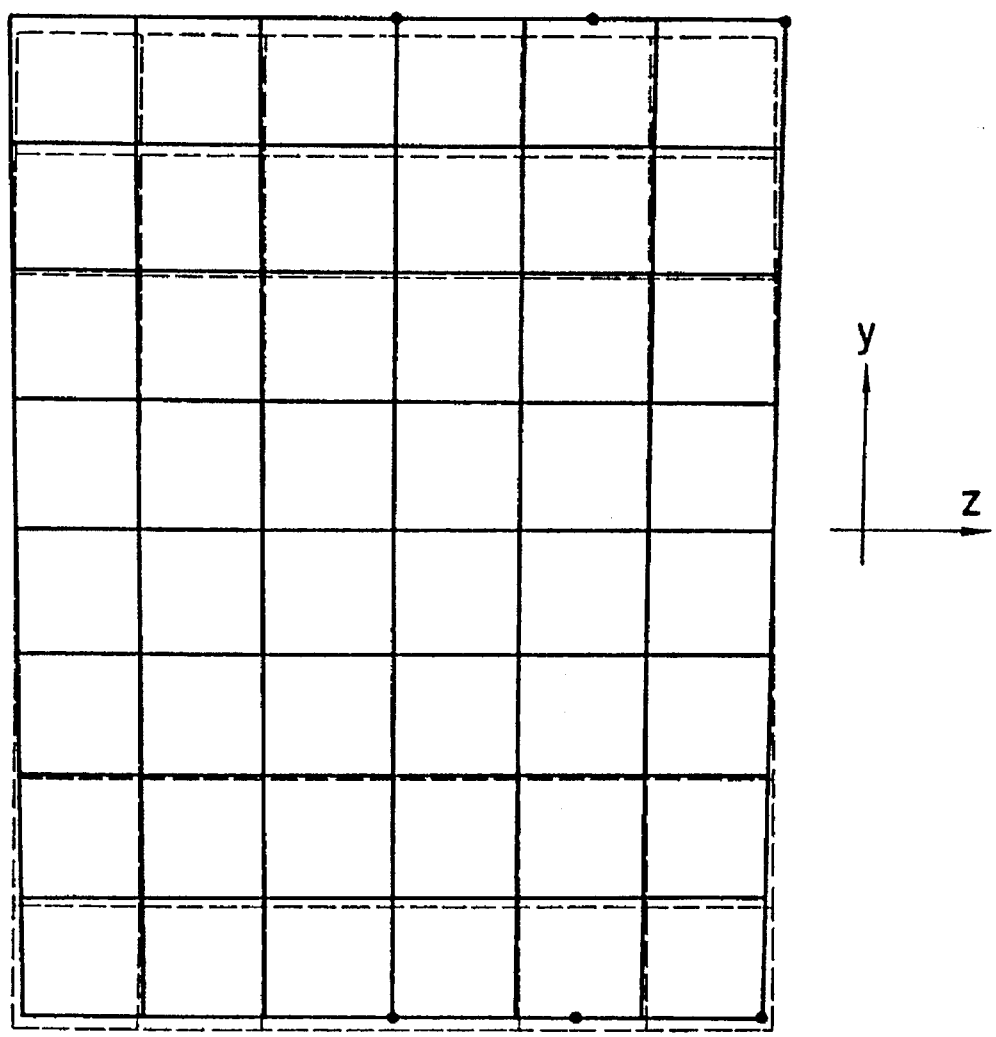
FIG. 8 is a schematic view showing the distortion of a projection pattern formed by the optical system of FIG. 7.

FIGS. 6–8 show embodiment 3 of the projector according to the present invention.

In the methods of embodiment 1 and embodiment 2, when the width of the LCD, in particular, becomes large, the distance between the adjacent displays must be set large. Accordingly, the angle of expectation of the peripheral image forming means relative to the screen becomes large, and the distance between the projecting lenses becomes large.

Accordingly, the angles of rays of light are different for the colors R, G and B when the rays of light are projected from the screen due to differences in the angle of incidence of the rays of light relative to the screen. This means that the color of the screen looks different between a ray projected towards the screen from the center of a peripheral image forming means (i.e., 10 or 12) and the x-axis (Ax2) depending on the direction from which the screen is seen, for example, in one case the image looks somewhat red when viewed from one direction, while it looks somewhat blue when viewed from the other direction.

Also, in the method of embodiment 2, the shift amount of the LCD of the peripheral projecting optical system becomes large, and a projecting lens having a large image circle becomes necessary.

In embodiment 3 since the mirror is used, the difference of the angle of incidence is reduced to be small even in cases where the width of the LCD is large.

This projector, as shown in FIG. 6, includes the central projecting optical system B, which has a projecting lens 31 of which the optical axis is perpendicular to the screen 20, and the peripheral projecting optical systems A, C which are disposed at both sides in symmetrical relation with the central projecting optical system B placed therebetween. The projecting optical systems A, C have mirrors 40, 41 for deflecting the optical path towards the screen 20. If the mirrors 40, 41 are not disposed, the optical axes Ax1, Ax2, Ax3 of the projecting lenses 30, 31, 32 would intersect at a point near the projecting lens 31. Moreover, it is acceptable that the optical axes do not intersect at one point but they come close to one another.

Figure 71:
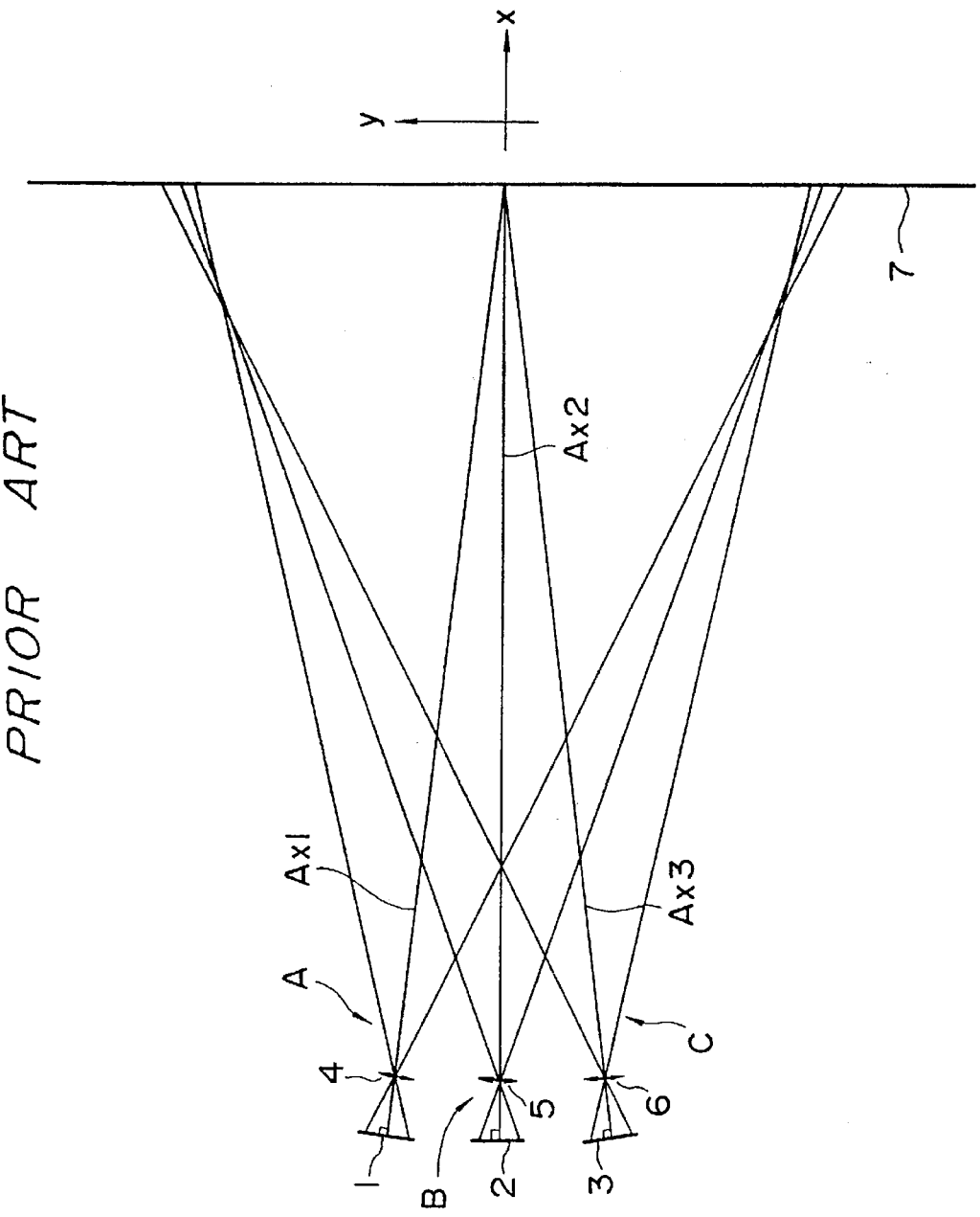
FIG. 71 is a view showing an optical system of a conventional projector.
Figure 72:
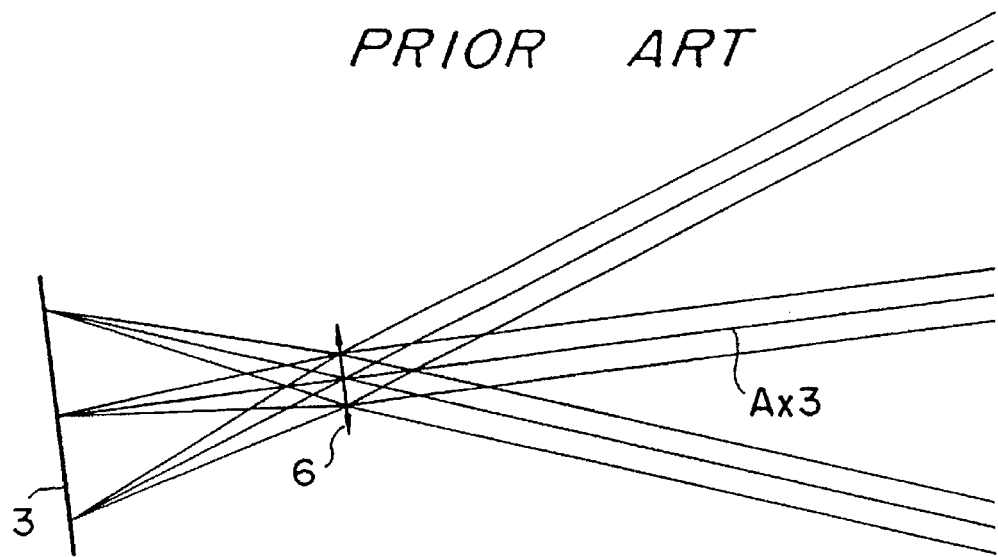
FIG. 72 is an enlarged view of the light path overlapping portion in FIG. 71.

The projector shown in FIG. 6 is appropriate to add the mirrors into the construction of FIG. 71, the optical axis Ax2 and the optical axes Ax1, Ax3 deflected by the mirrors are intersected at one point on the screen 20. Each LCD is perpendicular to each optical axis of the projecting lens.

The projector of FIG. 6 is equivalent to the construction of the prior art shown in FIG. 71 with a mirror added. Deflected optical axes are intersected at one point on the screen 20 and the LCDs thereof are perpendicular to the respective optical axes.

A numerical example of embodiment 3 will now be described:

focal lengths of the projecting lenses: 75 mm magnification: −15.5 times distances from the image forming means to the lenses: 79.8 mm distances from the mirrors to the lenses: 25 mm distances from the mirrors to the screen: 1212.5 mm Where the optical axes Ax1, Ax3 of the projecting lenses 30, 32 are extended from the screen 20 side disregarding the mirror, the lengths of the perpendicular lines drawn from the center of the central projecting lens 31 toward the extended optical axes are 80 mm. The angle formed between the optical axis Ax2 of the central projecting lens 11 and the optical axes Ax1, Ax3 of the deflected peripheral projecting lenses 10, 12 is 3.7°.

FIG. 7 is a view showing one of the optical systems of FIG. 6, i.e., the peripheral projecting optical system C in its enlarged scale together with a luminous flux. FIG. 8 is a view showing the distortion and spot diagram of the image when the lattice image forming means are projected onto the screen by the projecting optical system B, C.

One pattern, indicated by broken lines in the Figure, is a projected image by the system B, while the other pattern, indicated by a solid line, is the same by the system C. Since the projecting optical system C has the distortion, the coordinate (y, z)=(30.5,22.9) on the LCD 12 is imaged at a point of (y, z)=(−452.0,−345.8) on the screen, while the coordinate (y, z)=(−30.5,22.9) on the LCD 12 is image at a point (y, z)=(485.4,−363.3) on the screen. If the projecting optical system C has no distortion, these points should be imaged at points (y, z)=(±472.4,−354.3) on the screen.

The dots in FIG. 7 show dispersion of luminous flux on each point. FIG. 8 shows the dispersion of the spots in an enlarged state by twenty times.

Figure 73:
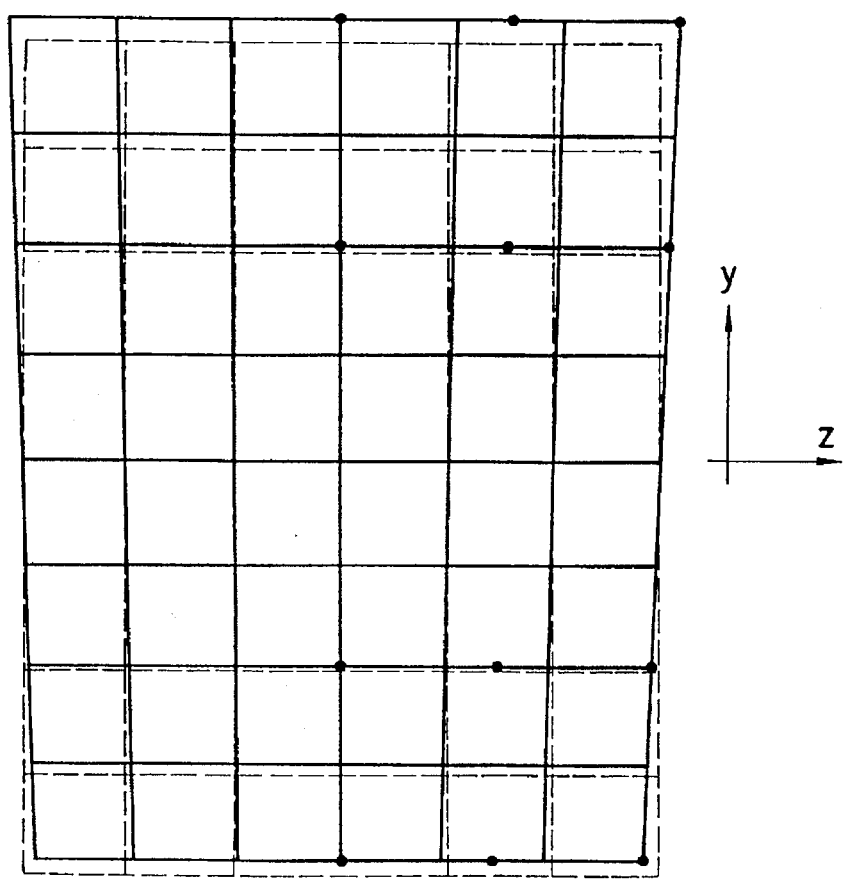
FIG. 73 is a schematic view showing the distortion of a projection pattern formed by the optical system of FIG. 17.
Figure 74:
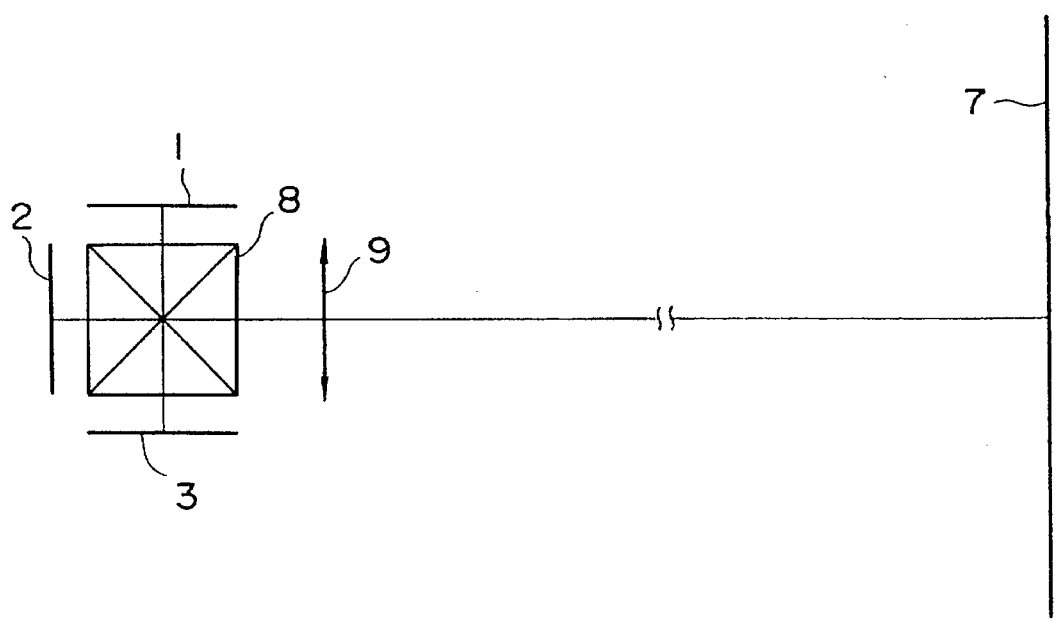
FIG. 74 is a schematic view of another type of conventional projector.

The prior art shown in FIG. 71 and embodiment 6 are different only in difference of angle of the optical axes of the respective projecting lenses. Comparison between FIG. 73 and FIG. 8 reveals the fact that reduction of the difference in angle reduces both the distortion and focus error of the image.

An image formed by the central projecting optical system B is projected onto the screen as a regular image which has no focus error and no distortion, while an image formed by the other peripheral projecting optical system A is projected onto the screen with a distortion symmetric with the image formed by the peripheral projecting optical system C.

According to the construction of embodiment 3, the optical axes of the projecting lenses directed toward the screen can be mutually approached irrespective of the size of the LCD, and the difference in incident angle of the luminous flux of the projecting optical systems is reduced to be small relative to the screen. As a result, the color shift caused by the visual recognizing direction of the screen is reduced. Moreover, the focus error and trapezoidal distortion become small.

If the mirrors 40, 41 are pivotable, even when the screen is moved and the relative position of the image is changed on the screen, the image formed by the peripheral projecting optical systems can be made coincident with the image formed by the central projecting optical system. The mirrors 40, 41 may be pivoted independently. If there is a synchronizing mechanism for causing two mirrors to pivot by the same angle, easier adjustment can be obtained.

Embodiment 4

Figure 9:
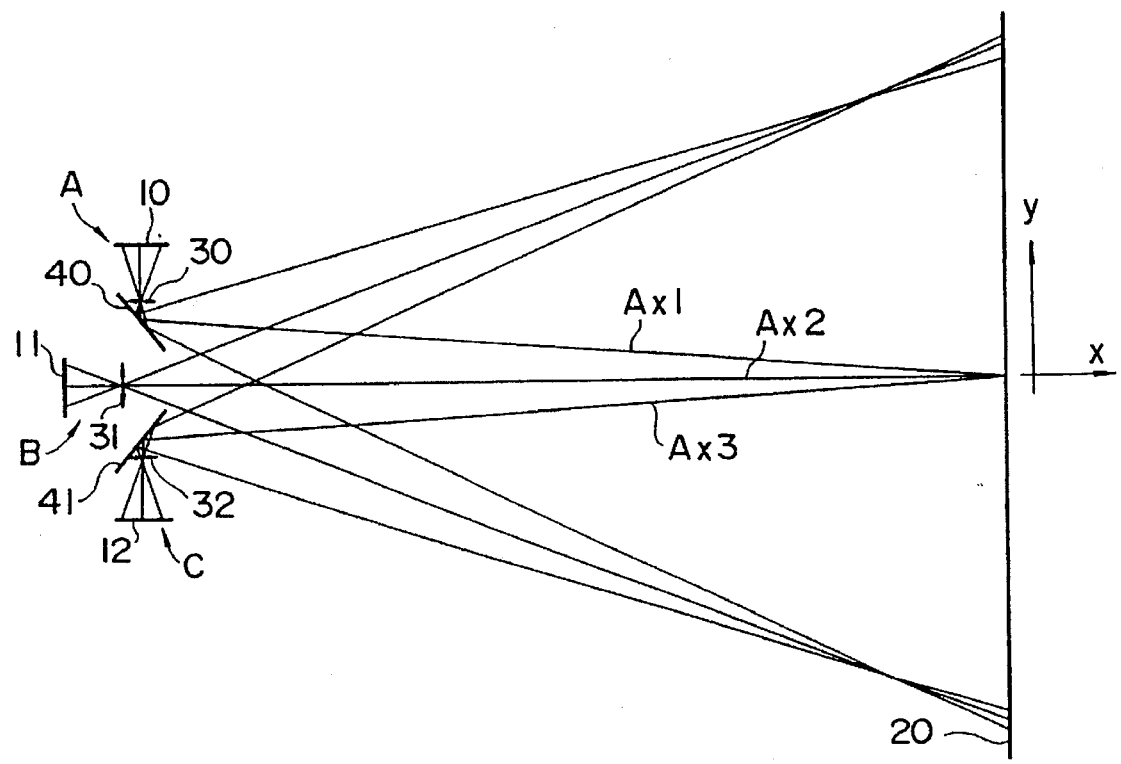
FIG. 9 is a schematic view of a projector of embodiment 4 according to the present invention.
Figure 10:
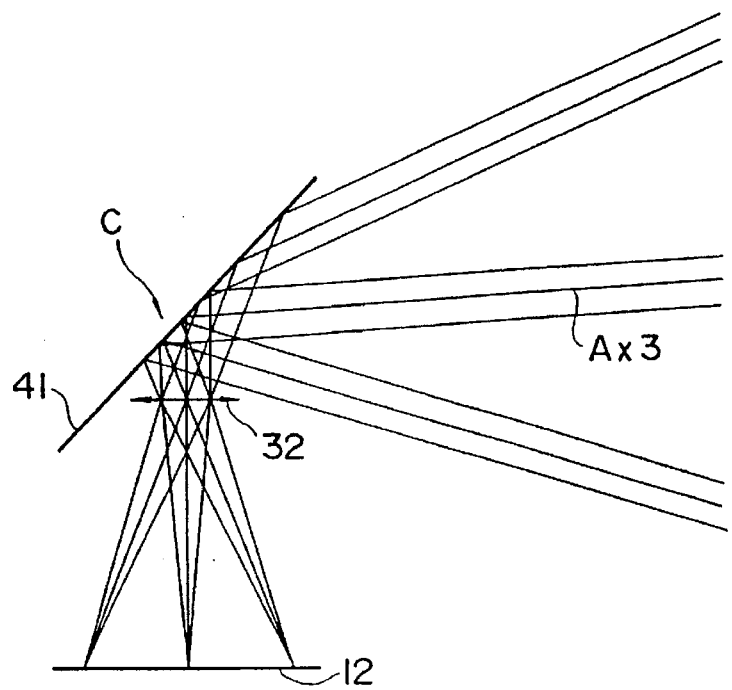
FIG. 10 is an enlarged view showing one of the peripheral projecting optical system in FIG. 9.

FIGS. 9 to 11 show the projector of embodiment 4.

This projector has three projecting optical systems A, B, C as in embodiment 3, and the mirrors 40, 41 are provided to the peripheral projecting optical systems A, C.

The projector of FIG. 9 is equivalent to the construction of embodiment 1 shown in FIG. 1 added with mirrors. Deflected optical axes are intersected at one point on the screen 20 and the LCDs thereof are perpendicular to the optical axis Ax2, while the LCDs 10, 12 are inclined relative to the optical axes Ax1, Ax3.

A numerical example for embodiment 4 will now be described:

focal lengths of the projecting lenses: 75 mm magnification: −15.5 times distances from the image forming means to the lenses: 79.8 mm distances from the mirrors to the lenses: 25 mm distances from the mirrors to the screen: 1212.5 mm In the case where the optical axes Ax1, Ax3 of the peripheral lenses 30, 32 are extended from the screen 20 side disregarding the mirrors, the lengths of the perpendicular lines drawn from the center of the central projecting lens 31 toward the extended optical axes are 80 mm.

Also, the LCDs 10, 12 of the peripheral projecting optical systems A, C are disposed so that perpendicular lines of the LCDs are inclined by 0.24° relative to the optical axes Ax1, Ax3, and the angle formed between the optical axis Ax2 of the central projecting lens 11 and the optical axes Ax1, Ax3 of the peripheral projecting lenses 10, 12 becomes 3.7°.

The angle of the mirrors 40, 41 relative to the optical axis is 46.7°.

FIG. 10 is a view showing one of the optical systems of FIG. 9, i.e., the peripheral projecting optical system C in its enlarged scale together with a luminous flux.

FIG. 11 is a view showing the distortion of an image which is formed when lattice image forming means are projected onto the screen by this peripheral projecting optical system B, C.

One pattern, indicated by broken lines in FIG. 11, is a projected image by the system B, while the other pattern, indicated by a solid line, is the same by the system C. Since the projecting optical system C has distortion, the coordinate (y, z)=(30.5,22.9) on the LCD 12 is imaged at a point of (y, z)=(−461.3,−345.3) on the screen, while the coordinate (y, z)=(−30.5,22.9) on the LCD 12 is imaged at a point (y, z)=(486.2,−363.9) on the screen. If the projecting optical system C has no distortion, these points should be imaged at points (y, z)=(±472.4,−354.3) on the screen.

In the construction of this embodiment, since the image surface is coincident with the screen and the luminous flux from one point on the LCD 12 is imaged at one point on the screen, the dispersion of the spots shown by dots in FIG. 8 is not detected.

Embodiment 5

Figure 12:
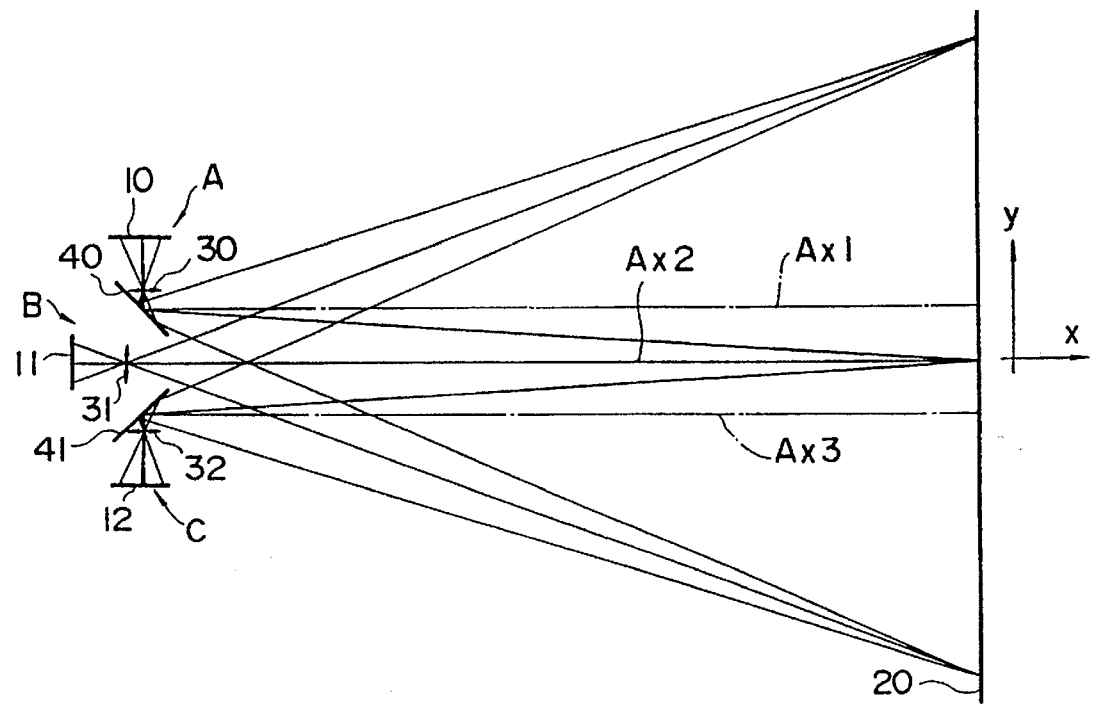
FIG. 12 is a schematic view of a projector of embodiment 5 according to the present invention.
Figure 13:
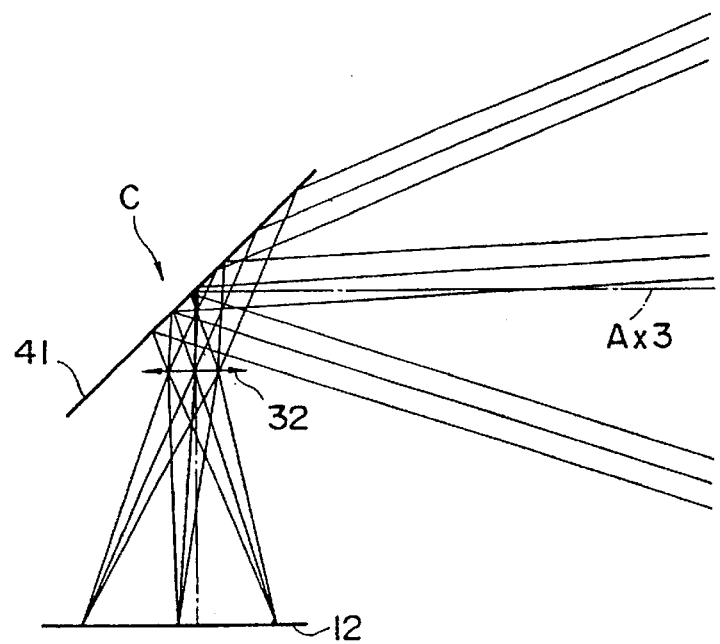
FIG. 13 is an enlarged view showing one of the peripheral projecting optical systems in FIG. 12.

FIGS. 12 and 13 show the embodiment 5 of the projector according to the present invention.

This projector has three projecting optical systems A, B, C as in embodiment 3, and the mirrors 40, 41 are provided to the peripheral projecting optical systems A, C.

The projector of FIG. 12 is equivalent to the construction of embodiment 2 shown in FIG. 4 with mirrors added. Deflected optical axes are vertical to the screen 20, while the LCDs are perpendicular to the optical axes of the respective projecting lenses.

In the central projecting optical system B, the LCD 11 is symmetrically arranged with reference to the optical axis Ax2, while in the peripheral projecting optical systems A, C, the LCDs 10, 12 are shifted relative to the optical axes Ax1, Ax3 of the corresponding projecting lenses.

A numerical example for embodiment 5 will now be described:

focal length of the projecting lenses: 75 mm magnification: −15.5 times distances from the image forming means to the lenses: 79.8 mm distances from the mirrors to the lenses: 25 mm distances from the mirrors to the screen: 1212.5 mm In case the optical axes Ax1, Ax3 of the peripheral lenses 30, 32 are extended from the screen 20 side disregarding the mirrors, the lengths of the perpendicular lines drawn from the center of the central projecting lens 31 toward the extended optical axes are 80 mm.

The angle of the mirrors 40, 41 relative to the optical axis is 45.0°.

FIG. 13 is a view showing one of the optical systems of FIG. 12, i.e., the peripheral projecting optical system C in its enlarged scale together with a luminous flux.

According to the above-mentioned construction, the color shift that is dependent on the visual recognizing direction can be reduced by minimizing the difference in angle of incidence of the luminous flux of the respective projecting optical systems.

Also, since the images formed by the respective projecting optical systems are overlapped on the regular position as in the case of embodiment 2 and projected in that state, the focus error and distortion of the image can be avoided.

Embodiment 6

Figure 14:
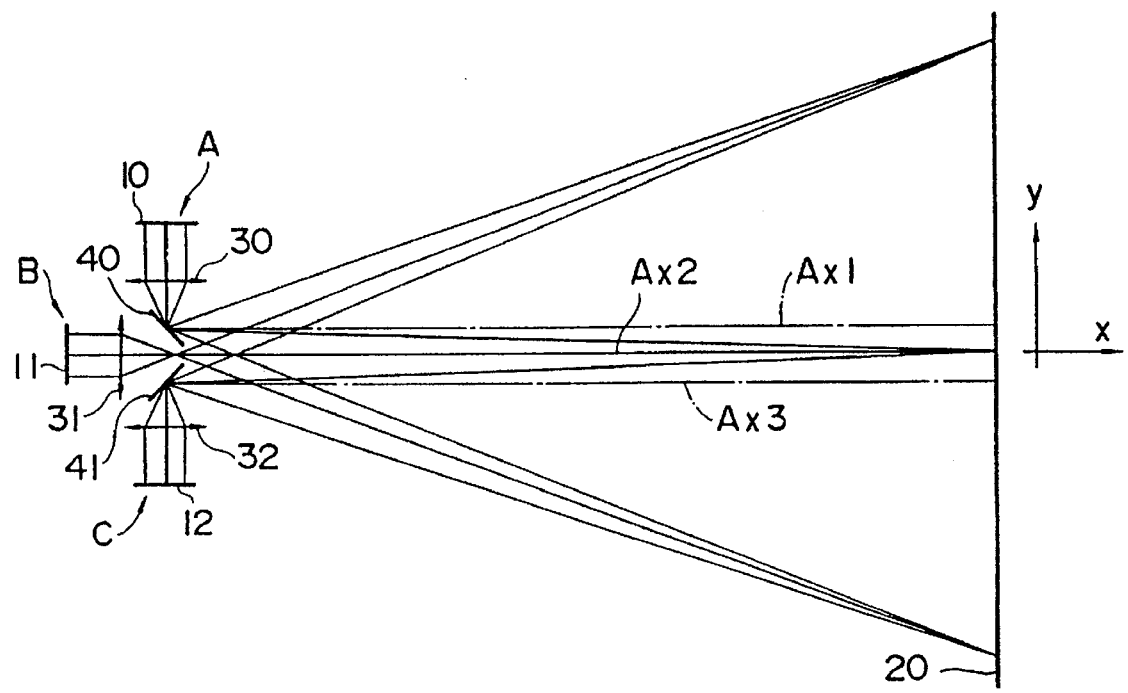
FIG. 14 is a schematic view of a projector of embodiment 6 according to the present invention.
Figure 15:
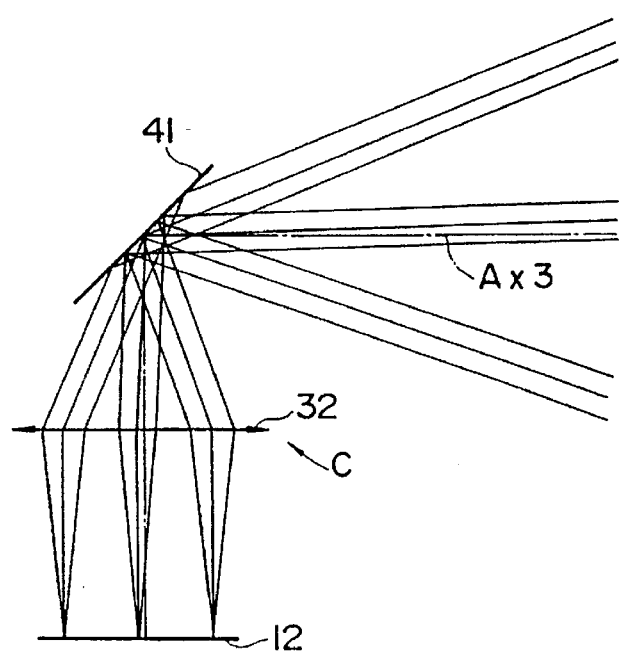
FIG. 15 is an enlarged view showing one of the peripheral projecting optical systems in FIG. 14.

FIGS. 14 and 15 show embodiment 6 of the projector according to the present invention.

This projector comprises a lens in which the exit pupil is located behind the lens such as, for example, a telecentric lens on the side of the image forming means.

In the projecting lens of embodiments 3 to 5, since the exit pupil, where the luminous flux is most converged, is located within the lens, the luminous flux spreads abruptly after it transmits through the lens. In order to prevent the vignetting of the luminous flux of the central projecting optical system, the mirror is required to be disposed far from the lens.

However, if a lens in which the exit pupil is located behind the lens such as, for example, a telecentric projecting lens, is used, the luminous flux is converged after the luminous flux transmits through the lens. Accordingly, even when the mirrors 40, 41 are brought to be proximate to the central projecting optical system B, the luminous flux of the central projecting optical system is not vignetted and the optical axes of the respective projecting optical systems can be brought to be more proximate to each other.

In this embodiment, the deflected optical axes of the projecting lens are perpendicular to the screen 20 and the LCDs 11 are perpendicular to the optical axis.

In the central projecting optical system B, the LCD 11 is symmetrically arranged with reference to the optical axis Ax2, while in the peripheral projecting optical systems A, C, the LCDS 10, 12 are shifted relative to the optical axes Ax1, Ax3 of the corresponding projecting lenses.

A numerical example of embodiment 6 will now be described:

focal length of the projecting lenses: 80 mm magnification: −15.5 times distances from the image forming means to the lenses: 85.2 mm distances from the lenses to the mirrors: 80 mm distances from the mirrors to the screen: 1212.5 mm In case the optical axes Ax1, Ax3 of the peripheral lenses 30, 32 are extended from the screen 20 side disregarding the mirrors, the lengths of the perpendicular lines drawn from the center of the central projecting lens 31 toward the extended optical axes are 40 mm.

The angle of the mirrors 40, 41 relative to the optical axis is 45°.

FIG. 15 is a view showing one of the optical systems of FIG. 14, i.e., the peripheral projecting optical system C in its enlarged scale together with a luminous flux.

According to the above-mentioned construction, the difference in angle of the luminous flux directing toward the screen 20 from the respective projecting optical systems can be minimized, and the color shift depending on the visually recognizing direction can be reduced. Moreover, the distortion of the image and focus error can be avoided. Also, the mirror becomes smaller compared with embodiments 3 to 5.

Embodiment 7

Figure 16:
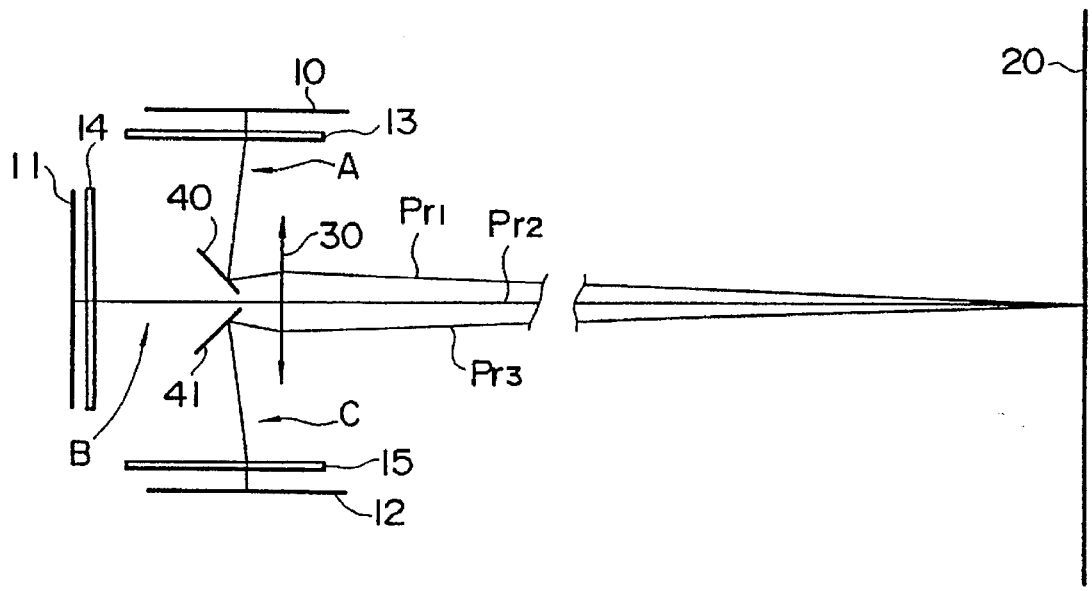
FIG. 16 is a schematic view of a projector of embodiment 7 according to the present invention.
Figure 17:
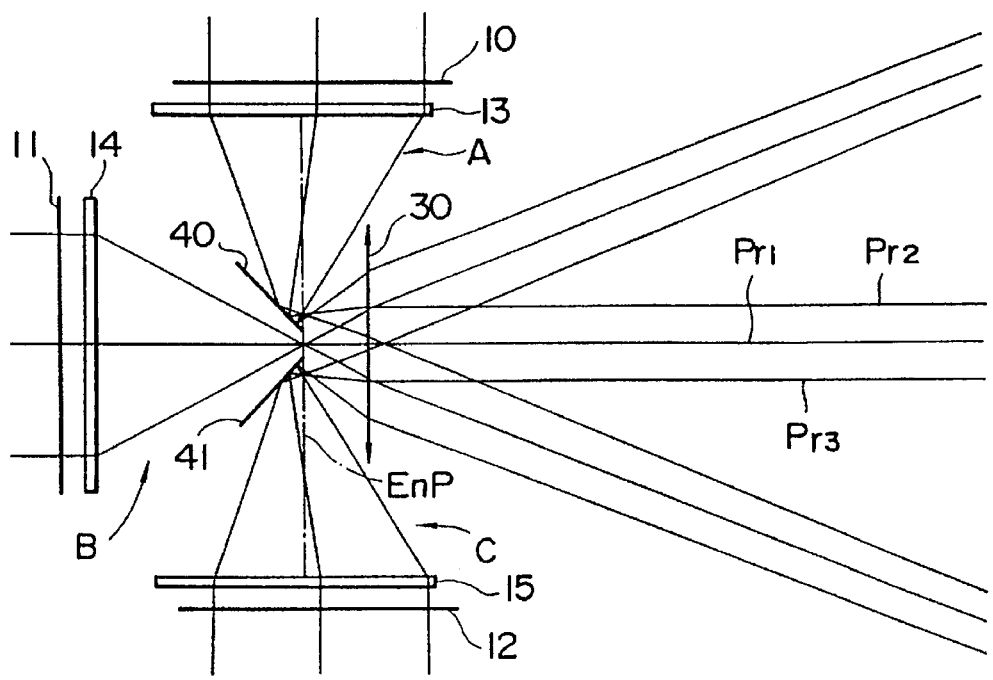
FIG. 17 is an enlarged view of the light path overlapping portion in FIG. 16.

FIGS. 16 and 17 show embodiment 7 of the projector according to the present invention. FIG. 16 is an overall view, and FIG. 17 is an enlarged view of the luminous flux overlapping portion.

As shown in FIGS. 16 and 17, this projector includes the LCDs 10, 11, 12, auxiliary lenses 13, 14, 15, which are adapted to reduce the diameter of the luminous flux coming from each of the LCDs, respectively, the projecting lens 30 for projecting the luminous flux transmitted from the auxiliary lenses onto the screen 20, and the mirror 40, 41 for reflecting the luminous flux from the peripheral projecting optical systems so that the luminous flux is made incident to the projecting lens 30.

In FIG. 16, principal rays Pr1, Pr2, Pr3 are shown for the three projecting optical systems, while in FIG. 17, three principal rays are shown for each of them.

The optical axis of the auxiliary lens 14 of the central projecting optical system B is in alignment with the optical axis of the projecting lens 30, while the optical axes of the auxiliary lenses 13, 15 of the peripheral projecting optical systems A, C are perpendicular to the optical axis of the projecting lens. The entrance pupil EnP of the projecting lens is shown by the two-dotted chain line in FIG. 17. The position of the entrance pupil EnP is located where the optical axes of the three auxiliary lenses intersect. The mirrors 40, 41 are coincident with the entrance pupil EnP at end points of the center side thereof and are tilted by 45° relative to the optical axis of the projecting lens 30.

The LCD 11 is disposed so that its central axis is in alignment with the optical axis of the auxiliary lens 14 in the central projecting optical system B, while in the peripheral projecting optical systems A, C, the central axes of the respective LCDs 10, 12 are shifted rightward in FIGS. 16 and 17 relative to the optical axes 13, 15 of the auxiliary lenses. Accordingly, the principal ray Pr2 of the central projecting optical system B is brought to be perpendicular to the screen 20 after passing through the optical axis, while the principal rays Pr2, Pr3 of the peripheral projecting optical systems A, C are projected to be angled with respect to the screen. Three principal rays are intersected on the screen.

The shifting of the LCD and the lens in the peripheral projecting optical system is an arrangement to avoid the focus error and trapezoidal distortion of the image. If the central axis of the LCD is aligned with the central axis of the auxiliary lens, the image projected onto the screen by the peripheral projecting optical system would include the focus error and the trapezoidal distortion.

According to the above-mentioned construction, in the central projecting optical system B comprising the LCD 11 and the auxiliary lens 14, after the parallel luminous flux emitted from a light source is transmitted by the LCD 11, the parallel luminous flux is converted to a convergent light by the auxiliary lens 14 and made incident to the projecting lens 30. On the other hand, in the peripheral projecting optical systems A, C, the convergent light transmitted through the auxiliary lenses 13, 15 is made incident to the projecting lens through the mirrors 40, 41. These luminous flux are overlapped on the screen through the projecting lens and forms a color image thereon.

Since the luminous flux of the respective projecting optical system is once made into a convergent light by the auxiliary lens and then made incident to the projecting lens, the diameter of the projecting lens becomes small compared with the prior art shown in FIG. 71.

Also, since the luminous flux coming from the peripheral projecting optical systems A, C are reflected by the mirrors and made incident to the projecting lens 30, the angle formed between the luminous flux of the respective projecting optical systems can be made small compared with a case where the LCDs are arranged in juxtaposed relation as in the prior art shown in FIG. 71, and the colors are prevented from being one sided on the screen 20.

Concrete numerical examples will now be described.

In all numerical examples listed hereinafter, the projecting lens 30 is an ideal lens in which the distance between the principal points is zero, and the auxiliary lens is a Fresnel lens of 2.000 mm in thickness. The auxiliary lens is not limited to the Fresnel lens. Instead, it may be a spherical lens or aspherical lens.

focal length of the auxiliary lens: 60.000 mm focal length of the projecting lens: 80.000 mm the image forming means–an incident surface of the auxiliary lens: 7.000 mm the outgoing surface of the auxiliary lens–entrance pupil: 60.000 mm entrance pupil–the projecting lens: 17.918 mm the projecting lens–the screen: 1175.333 mm The central axes of the LCDs 10, 12 of the peripheral projecting optical systems A, C are shifted by 4.196 mm relative to the optical axes of the auxiliary lenses 13, 15.

In this example, the respective projecting luminous flux transmitting through the projecting lens as shown in FIG. 18 are arranged on the diameter of the projecting lens.

Figure 19:
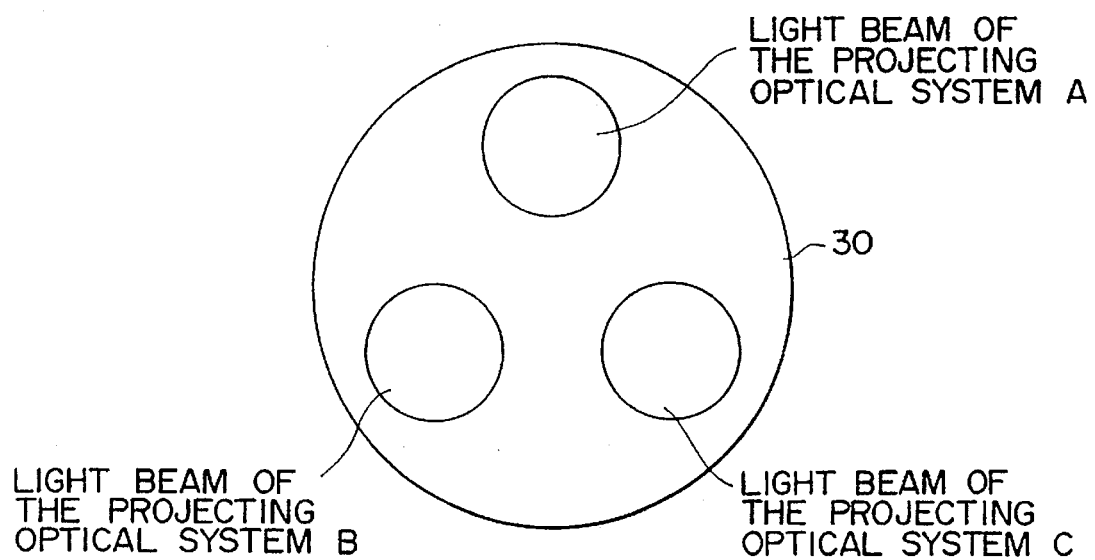
FIG. 19 is a schematic view showing another embodiment of the position of luminous flux transmitted by the projecting lens.

However, the arrangement of the projecting optical system, the invention is not limited to this construction. The central axis of the three luminous flux may be located at the apex of the triangle as shown in FIG. 19. According to this construction, since the pupil of the projecting lens can be utilized effectively, the effective aperture of the projecting lens can be reduced. This modification of the arrangement of the projecting system can likewise be utilized in other embodiments.

Embodiment 8

Figure 20:
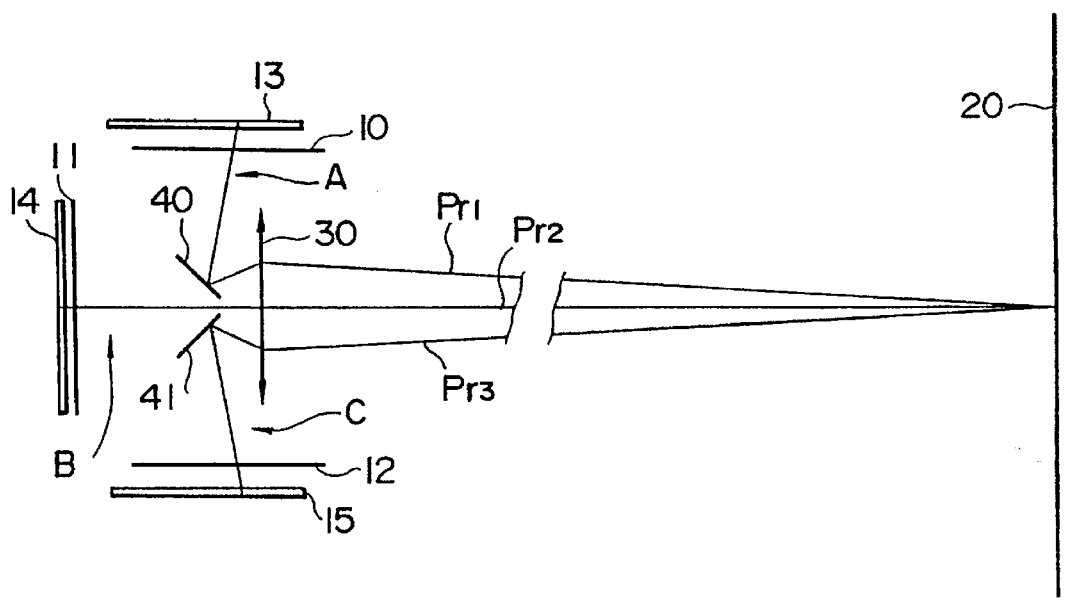
FIG. 20 is a schematic view of a projector of embodiment 8 according to the present invention.
Figure 21:
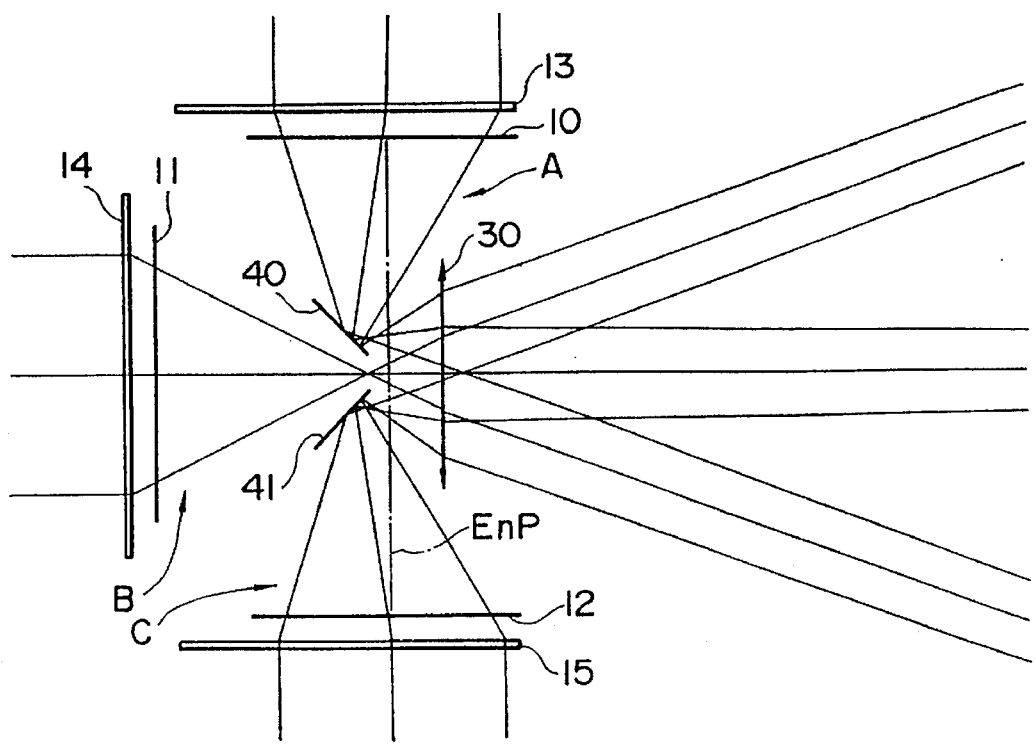
FIG. 21 is an enlarged view of the light path overlapping portion in FIG. 20.

FIGS. 20 and 21 show embodiment 8 of the projector according to the present invention.

This projector has an auxiliary lens disposed between a light source and a liquid crystal panel, so that the luminous flux made incident to the liquid crystal panel is made as a convergent light. All the other components are the same to the above-mentioned embodiment 7.

Next, a concrete numerical construction will be described:

focal length of the auxiliary lens: 70.000 mm focal length of the projecting lens: 80.000 mm the exit pupil plane of the auxiliary lens–the image forming means: 7.000 mm the image forming means–entrance pupil: 63.000 mm entrance pupil–the projecting lens: 22.161 mm the projecting lens–the screen: 1320.000 mm The central axes of the liquid crystal panels 10, 12 of the peripheral projecting optical systems A, C are disposed in such a manner as to be shifted relative to the optical axis of the auxiliary lenses 13, 15.

As for the mirror, a dichroic mirror may also be used besides a total reflection mirror.

Embodiment 9

Figure 22:
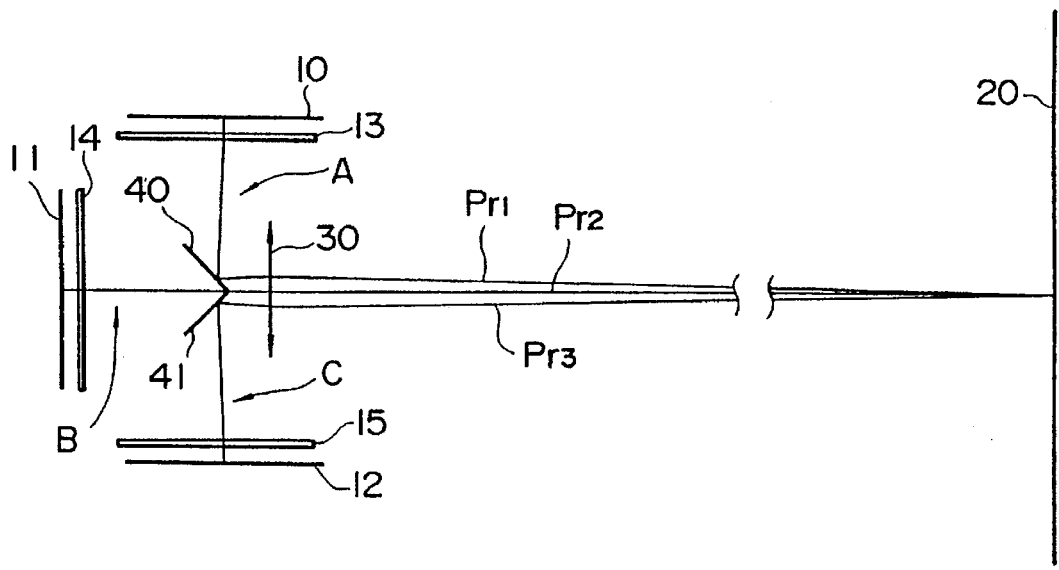
FIG. 22 is a schematic view of a projector of embodiment 9 according to the present invention.
Figure 23:
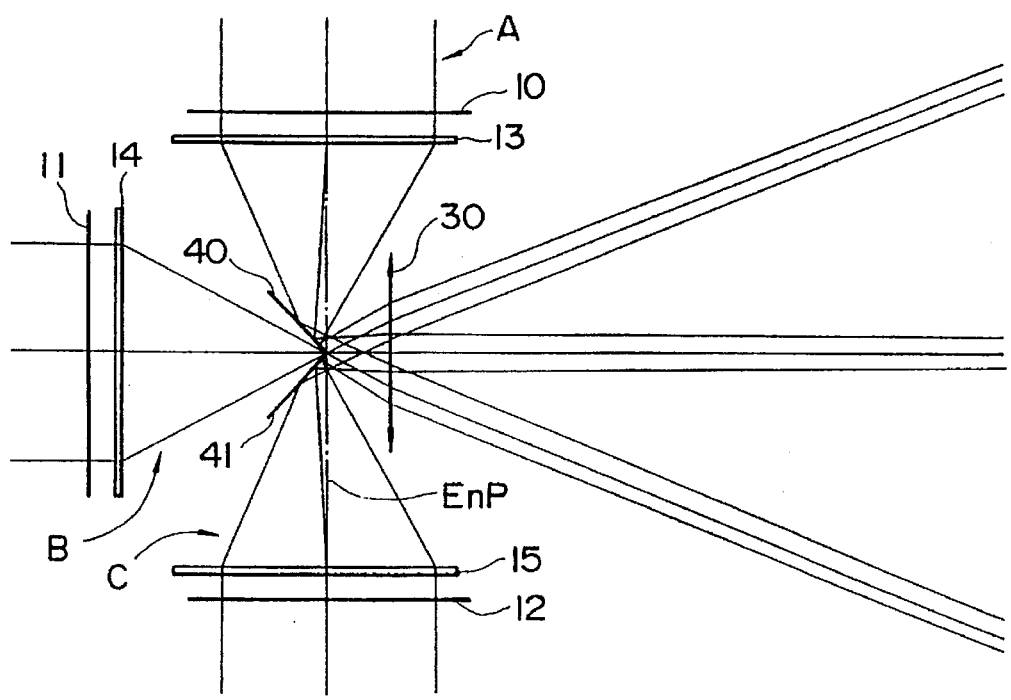
FIG. 23 is an enlarged view of the light path overlapping portion in FIG. 22.
Figure 24:
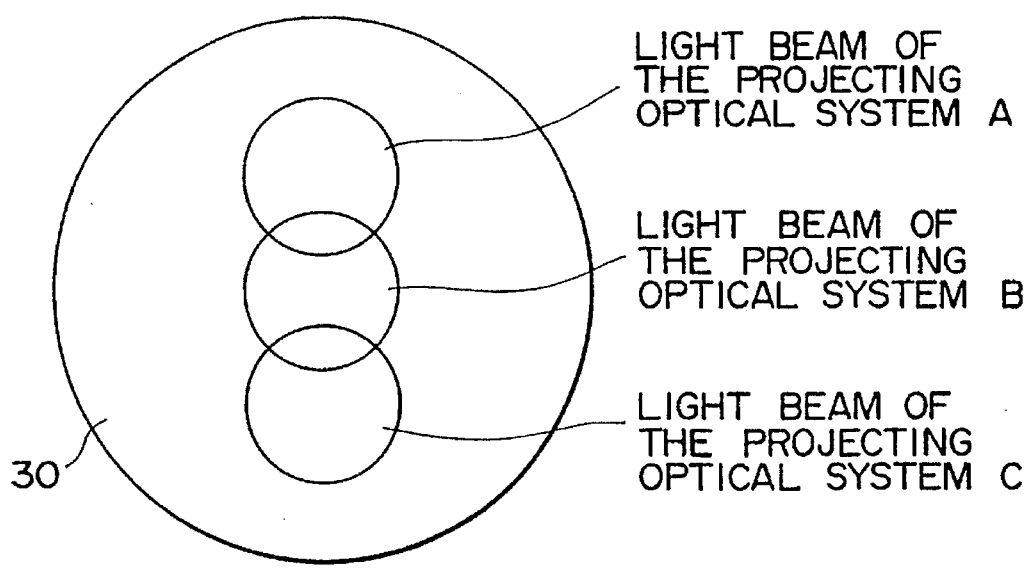
FIG. 24 is a schematic view showing the position of luminous flux transmitted by the projecting lens in FIG. 22.

FIGS. 22 and 23 show embodiment 9 of the projector according to the present invention. FIG. 22 is an overall view, and FIG. 23 is an enlarged view of a portion where the luminous flux are overlapped.

As illustrated, this projector includes LCDs 10, 11, 12, the auxiliary lenses 13, 14, 15, the projecting lens 30, and dichroic mirrors 40, 41 disposed so that each of them occupy a half of the optical path of the central projecting optical system, respectively.

In FIG. 22, principal rays Pr1, Pr2 and Pr3 are shown, while in FIG. 23, three principal rays are shown for each of the LCDs.

The optical axis of the auxiliary lens 14 of the central projecting optical system B is aligned with the optical axis of the projecting lens 30, while the optical axes of the auxiliary lenses 13, 15 of the peripheral projecting optical systems A, C are perpendicular to the optical axis of the projecting lens. The entrance pupil EnP of the projecting lens is in a position where the optical axes of the three auxiliary lenses intersect as shown by the two-dotted chain line in FIG. 23. The dichroic mirrors 40, 41 are mutually contacted at end points of the central side thereof in the intersecting position of the optical axes of the auxiliary lenses and are tilted by 45° relative to the optical axis of the projecting lens 30 to form a roof type arrangement.

If the projecting optical systems A, B, C are presumed to be projecting optical systems for R, G, B here, one dichroic mirror 40 has such characteristics to reflect the R component and permit the other components to transmit therethrough, while the other dichroic mirror 41 has such characteristics as to reflect the B component and permit other components to transmit therethrough.

The LCDs 10, 11 and 12 are perpendicular to the optical axes of the auxiliary lenses 13, 14 and 15, respectively. The central axis of the LCD 11 is aligned with the optical axis of the auxiliary lens 14, while the central axes of the LCDs 13, 15 are shifted rightward in FIGS. 22 and 23 relative to the optical axes of the auxiliary lenses 10, 12. Accordingly, the principal rays Pr2 of the central projecting optical system B are perpendicular to the screen 20, while the principal rays Pr2, Pr3 of the peripheral projecting optical systems A, C are not perpendicular to the screen. The three principal rays are intersected on the screen.

The shifting of the LCD with respect to the lens in each of the peripheral projecting optical systems is an arrangement for obviating the focus error and trapezoidal distortion of the image. If the central axis of the LCD should be aligned with the central axis of the auxiliary lens, the image projected onto the screen by the peripheral projecting optical system would include the focus error and the trapezoidal distortion.

According to the above-mentioned construction, in the central projecting optical system B, after the parallel luminous flux having a G component and emitted from a light source transmits through the LCD 11, the parallel luminous flux is converted to a convergent light by the auxiliary lens 14 and made incident to the projecting lens 30 after transmitting through the dichroic mirrors 40, 41. On the other hand, in the peripheral projecting optical systems A, C, the convergent light having R, B components and transmitted through the auxiliary lenses 13, 15 is reflected by the dichroic mirrors 40, 41 and made incident to the projecting lens. These luminous flux are overlapped on the screen through the projecting lens and forms a color image thereon.

Since the luminous flux coming from the respective projecting optical systems is reflected by the dichroic mirror and then made incident to the projecting lens, the angle between the luminous flux of the respective projecting lenses becomes small compared with the prior art shown in FIG. 71 where the LCDs are arranged in juxtaposed relation, and the colors are prevented from being one sided on the screen 20.

Concrete numerical examples will now be described.

The distances listed hereunder are along the principal rays Pr1, Pr2, Pr3.

focal length of the auxiliary lens: 60.000 mm
focal length of the projecting lens: 80.000 mm
the image forming means~incident surface of the auxiliary lens: 7.000 mm
the outgoing surface of the auxiliary lens~entrance pupil: 60.000 mm
entrance pupil~the projecting lens: 17.918 mm
the projecting lens~the screen: 1175.333 mm The central axes of the LCDs 10, 12 of the peripheral projecting optical systems A, C are shifted by 4.196 mm relative to the optical axis of the auxiliary lenses 13, 15. In the above-mentioned embodiment 9, the respective luminous flux transmitting through the projecting lens 40 are partly overlapped and arranged in one row on the diameter of the incident pupil of the projecting lens.

Embodiment 10

Figure 25:
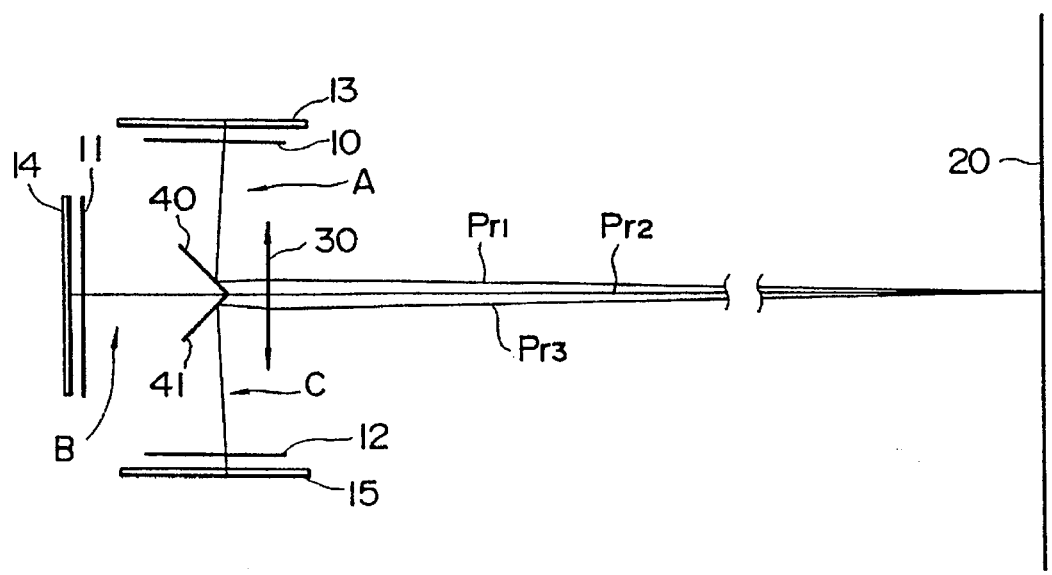
FIG. 25 is a schematic view of a projector of embodiment 10 according to the present invention.
Figure 26:
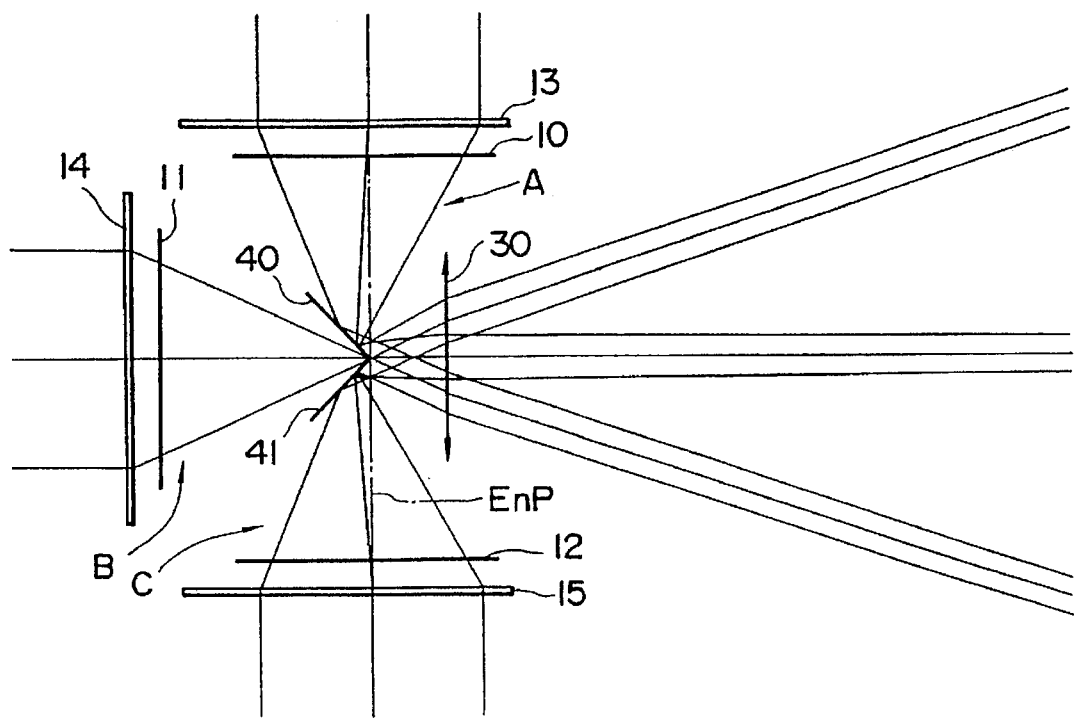
FIG. 26 is an enlarged view of the light path overlapping portion in FIG. 24.

FIGS. 25 and 26 show embodiment 10 of the projector according to the present invention.

This projector has an auxiliary lens disposed between a light source and a liquid crystal panel, so that the luminous flux made incident to the liquid crystal panel is made as a convergent light. All the other components are the same as in the above-mentioned embodiment 9.

Since the LCD is formed of a cell filled with liquid crystal sandwiched between a pair of polarizing plates, there is a possibility that the transmittance will become irregular due to differences in angle when the incident luminous flux is not a parallel luminous flux. On the other hand, since the dichroic mirror is also changed in transmittance depending on the degree of the angle when the incident light is not a parallel luminous flux, the incident luminous flux is preferably a parallel luminous flux.

If the auxiliary lens is disposed between the LCD and the dichroic mirror here as in embodiment 9, the parallel luminous flux is made incident to the LCD and is thus preferable. However, since the distance between the auxiliary lens and the dichroic mirror is short, the degree of convergence of the luminous flux becomes comparatively sharp and there is created a state in which irregularity of transmittance readily occurs to the dichroic mirror.

On the contrary, if the auxiliary lens is disposed on the side of the light source from the LCD as in embodiment 10, the distance between the auxiliary lens and the dichroic mirror becomes large and the degree of convergence becomes comparatively small. As a result, this construction is more preferable than the construction of embodiment 9 in view of the performance of the dichroic mirror.

The arrangement of these auxiliary lenses is selected considering the balance as to which of the LCD and the dichroic mirror is more easily able to receive the effect caused by the difference in angle.

A concrete numerical construction will now be described:
focal length of the auxiliary lens: 70.000 mm
focal length of the projecting lens: 80.000 mm
the exit pupil plane of the auxiliary lens~the image forming means: 7.000 mm
the image forming means~entrance pupil: 63.000 mm
entrance pupil~the projecting lens: 22.161 mm
the projecting lens~the screen: 1320.000 mm The central axes of the liquid crystal panels 10, 12 of the peripheral projecting optical systems A, C are disposed in such a manner as to be shifted by 4.896 mm relative to the optical axis.

Embodiment 11

Figure 27:
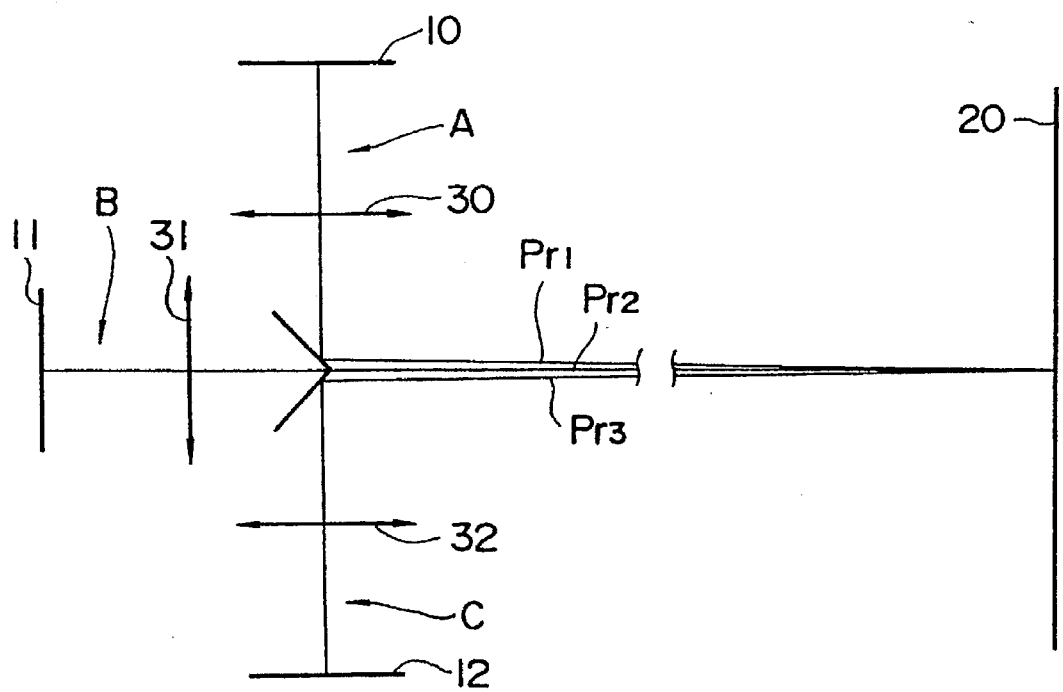
FIG. 27 is a schematic view of a projector of embodiment 11 according to the present invention.

FIGS. 27 and 28 show embodiment 11 of the projector according to the present invention.

This projector independently has the projecting lens for each projecting optical system and does not have the auxiliary lens. The optical axes of the projecting lenses 30, 32 are perpendicular to the optical axis of the projecting lens 31, and the dichroic mirrors 40, 41 are disposed in such a manner as to cover one half of the optical path of the central projecting optical system B at an angle 45° relative to the optical axis of the projecting lens 31 to form a roof shape. Accordingly, the optical axes of the respective projecting lenses directing to the screen are mutually in parallel relation.

The respective LCDs 10, 11, 12 are perpendicular to the optical axis of the respective projecting lenses, and in the central projecting optical system B, the central axis of the LCD 11 is disposed so that the perpendicular line of the LCD 11 is aligned with the optical axis of the projecting lens. Similarly, in the peripheral projecting optical systems A, C, the LCDs 10, 12 are shifted rightward in FIGS. 27 and 28 relative to the optical axes of the respective projecting lenses.

The exit pupil ExP of each projecting lens is located the point where the dichroic mirrors 40, 41 are intersected.

In this way, in case the projecting lens is provided to each projecting optical system, it is good enough even if the respective projecting lenses are small. Therefore, the cost for each lens is low compared with the conventional lens shown in FIG. 71, and even a combination of three lenses is lower in cost than the lens of one piece construction.

According to the above-mentioned construction, the parallel luminous flux emitted from a light source (not shown) is transmitted through the respective image forming means and made incident to the projecting lenses of the respective projecting optical systems. The luminous flux from the projecting lenses are transmitted through the dichroic mirrors 40, 41 in the central projecting optical system B and is reflected by the dichroic mirror in the peripheral projecting optical systems A, C and then overlapped on the screen respectively.

Next, a concrete numerical example will be described:
focal length of the projecting lenses: 80.000 mm
the image forming means~the projecting lens: 85.161 mm
the projecting lens~exit pupil: 80.000 mm
exit pupil~the screen: 1240.00 mmm The central axes of the LCDs 10, 12 of the peripheral projecting optical systems A, C are shifted by 5.594 mm relative to the optical axes of the projecting lenses 30, 32.

Since the luminous flux is made incident to the projecting lenses 30, 32 at angles in the peripheral projecting optical systems A, C, the projecting lenses 30, 32 of the peripheral projecting optical system C are required to have larger image circles than the projecting lens in the central projecting optical system B. The difference of the image circles is 0.361 mm.

Embodiment 12

Figure 29:
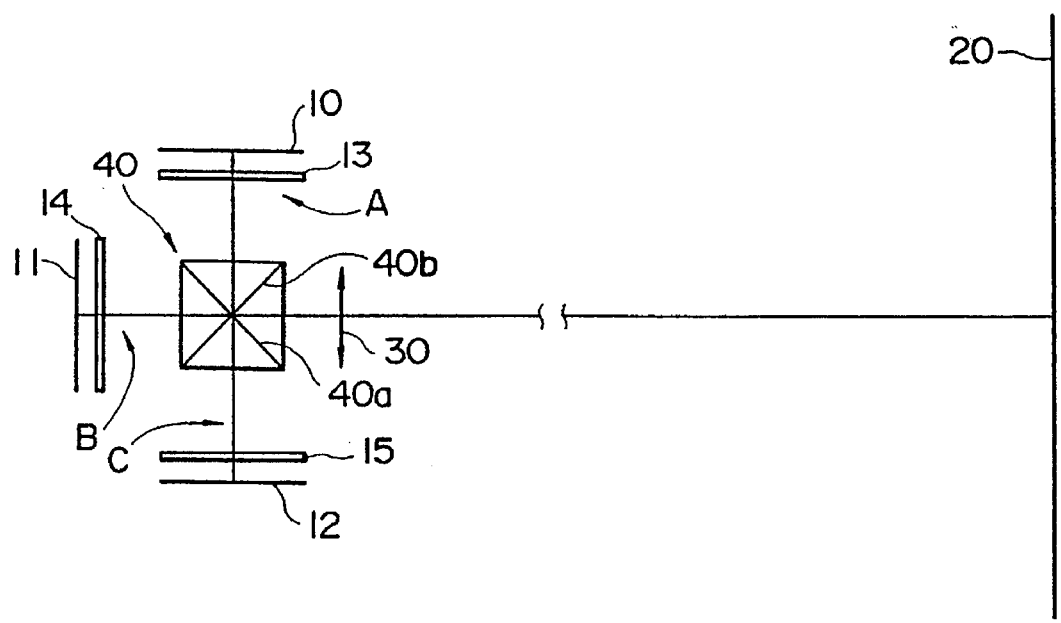
FIG. 29 is a schematic view of a projector of embodiment 12 according to the present invention.

FIGS. 29 and 30 show embodiment 12 of the projector according to the present invention. FIG. 29 shows an overall view thereof, and FIG. 30 is an enlarged view of a portion for overlapping the luminous flux.

As shown in FIGS. 29 and 30, this projector includes the LCDs 10, 11, 12, the auxiliary lenses 13, 14, 15, the projecting lens 30, and the dichroic prism 40 for overlapping the luminous flux of respective projecting optical systems.

In FIG. 29, one central principal ray is shown for each projecting optical system and in FIG. 30, three principal rays are shown for each of them.

The optical axes of the auxiliary lenses of the projecting optical systems are disposed so that the optical axis is aligned with the central axes of the LCDs. The optical axis of the auxiliary lens 14 in the central projecting optical system B is aligned with the optical axis of the projecting lens 30, while the optical axes of the auxiliary lenses 13, 15 of the peripheral projecting optical systems A and C are perpendicular to the optical axis of the projecting lens.

The dichroic prism 40 is provided with a dichroic surface 40a having such characteristics as that the R component is reflected and other components are permitted to transmit therethrough, and with another dichroic surface 40b having such characteristics as that the B component is reflected and other components are permitted to transmit therethrough, the dichroic surfaces 40a, 40b being mutually intersected at the point of intersection of the optical axes of the respective auxiliary lenses. Also, the dichroic surfaces 40a, 40b are tilted by 45° relative to the optical axis of the projecting lens 30, respectively.

According to this construction, the parallel luminous flux of the various color components transmitted through the respective LCDs is made into convergent light by the auxiliary lens and made incident to the dichroic prism 40. These luminous fluxes are overlapped one upon the other by the dichroic prism 40 and projected onto the screen 20 in the overlapping state to form a color image thereon through the projecting lens.

A concrete numerical example will now be described:

The distances mentioned hereunder are along the optical axis, and the distance indication within the prism is not an air converted distance but an actual distance.

focal length of the auxiliary lens: 100.000 mm
focal length of the projecting lens: 80.000 mm
refractive index of the prism: 1.51633
the image forming means~incident surface of the auxiliary lens: 7.000 mm
the outgoing surface of the auxiliary lens~incident surface of the prism: 23.000 mm
incident surface of the prism~outgoing surface of the prism: 60.000 mm outgoing surface of the prism~projecting lens: 15.545 mm
the projecting lens~exit pupil: 17.851 mm
exit pupil~the screen: 1215.350 mm
effective aperture of the auxiliary lens: 80.000 mm
one side of the prism: 60.000 mm
effective aperture of the projecting lens: 50.000 mm In the case of the prior art in which no auxiliary lens is used, one side of the prism is 80.000 mm and the effective diameter of the projecting lens is 90.000 mm in order to project the similar image forming means to those mentioned above.

Embodiment 13

Figure 31:
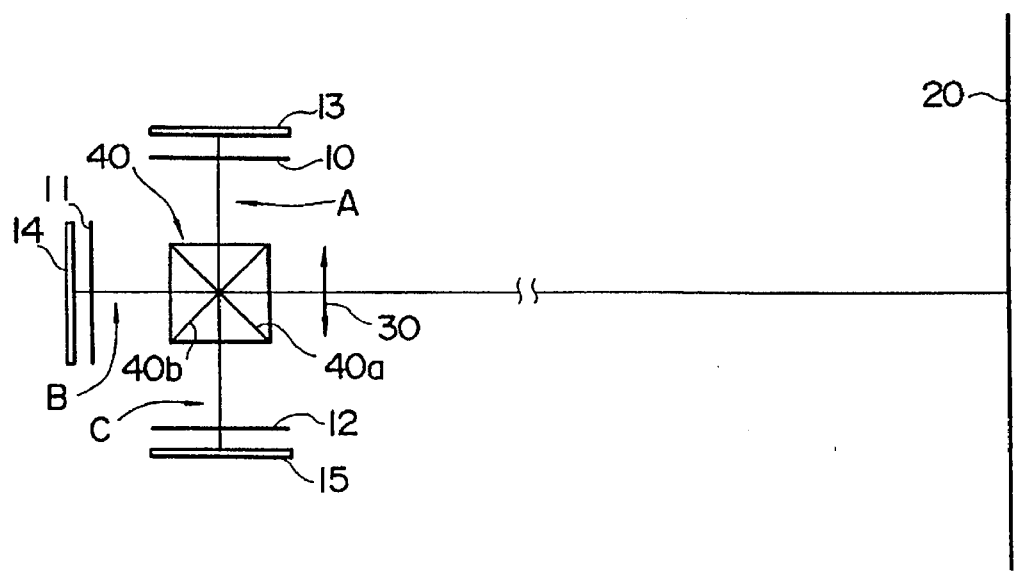
FIG. 31 is a schematic view of a projector of embodiment 13 according to the present invention.
Figure 32:
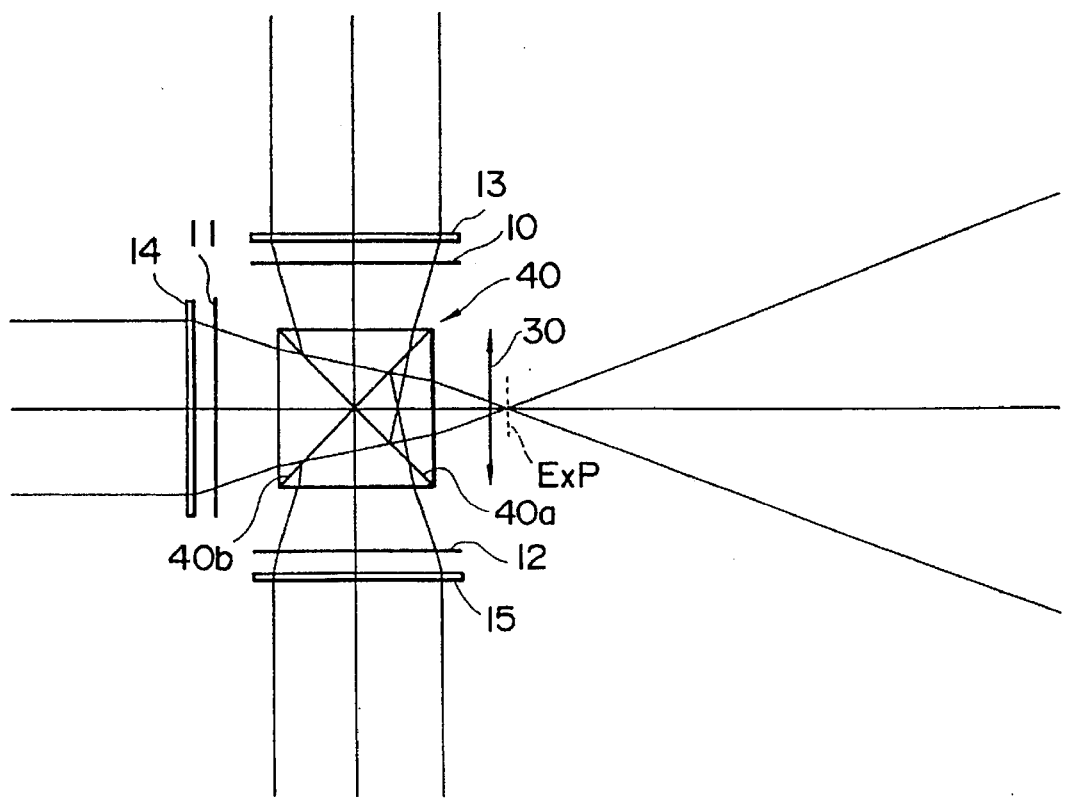
FIG. 32 is an enlarged view of the light path overlapping portion in FIG. 31.

FIGS. 31 and 32 show embodiment 13 of the projector according to the present invention.

This projector has an auxiliary lens disposed between a light source and the LCD, so that the luminous flux made incident to the LCD is made as a convergent light. All the other components are the same as the above-mentioned embodiment 12.

In embodiment 12, the parallel luminous flux is made incident to the LCD and is thus preferable. However, it has created such a state where irregularity of transmittance readily occurs to the dichroic mirror. To the contrary, in the case of embodiment 13, the projector is preferable to that of embodiment 12 in view of the performance of the dichroic mirror.

A concrete numerical construction will now be described:

focal length of the auxiliary lens: 100.000 mm focal length of the projecting lens: 80.000 mm refractive index of the prism: 1.51633 the outgoing surface of the auxiliary lens~the image forming means: 7.000 mm the image forming means~incident surface of the prism: 25.000 mm incident surface of the prism~outgoing surface of the prism: 60.000 mm outgoing surface of the prism~the projecting lens: 20.595 mm the projecting lens~exit pupil: 8.079 mm exit pupil~the screen: 1311.921 mm effective aperture of the auxiliary lens: 80.000 mm one side of the prism: 60.000 mm effective aperture of the projecting lens: 50.000 mm

Embodiment 14

Figure 33:
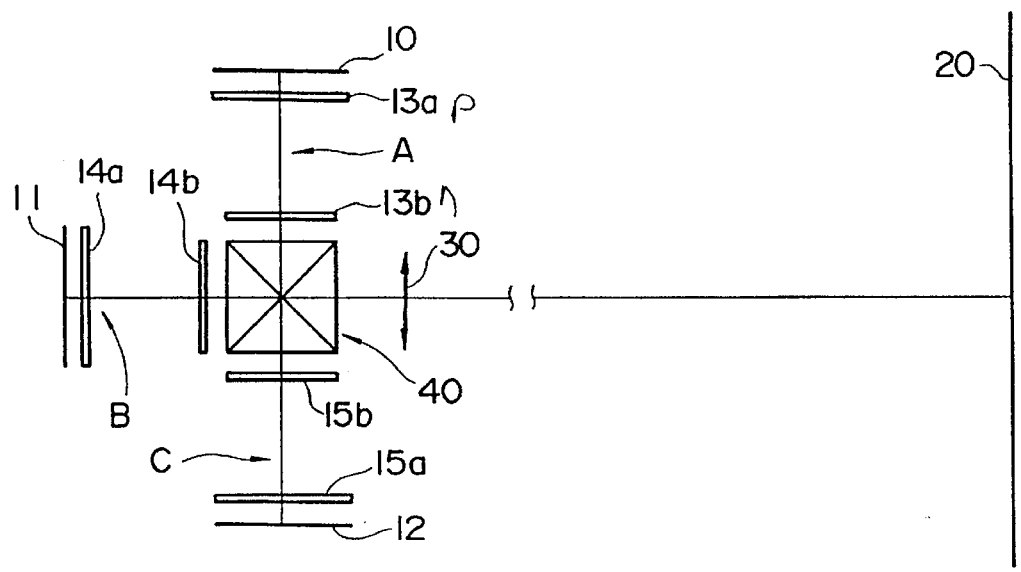
FIG. 33 is a schematic view of a projector of embodiment 14 according to the present invention.
Figure 34:
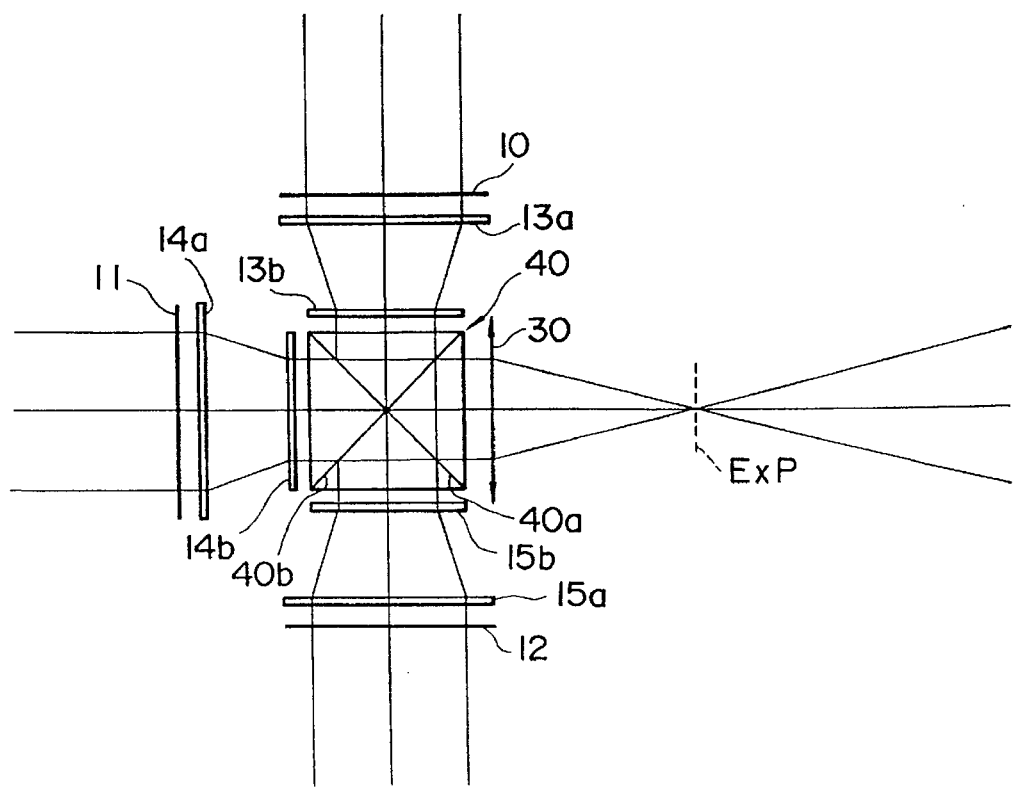
FIG. 34 is an enlarged view of the light path overlapping portion in FIG. 33.

FIGS. 33 and 34 show embodiment 14 of the projector according to the present invention.

This projector is provided with the positive auxiliary lenses 13a, 14a, 15a and the negative auxiliary lenses 13b, 14b, 15b disposed between the LCDs 10, 11, 12 and the dichroic prism 40, so that the luminous flux transmitted through the LCDs is made incident to the dichroic prism after the luminous flux is converted to a parallel luminous flux of a small diameter.

Accordingly, since the parallel luminous flux is made incident to the projecting lens, a lens in which the exit pupil is located behind the lens such as, for example, a telecentric lens to the image forming means side, is used as the projecting lens 30. All the other constructions are the same as those of embodiment 12.

According to this construction, irregularity of transmittance to the LCD and dichroic mirror can be reduced.

Next, a concrete numerical example will be described:

The thickness of six auxiliary lens are all 2.000 mm.

focal length of the positive auxiliary lens: 100.000 mm focal length of the negative auxiliary lens: −65.000 mm focal length of the projecting lens: 80.000 mm refractive index of the prism: 1.51633 the image forming means~incident surface of the positive auxiliary lens: 7.000 mm the outgoing surface of the positive auxiliary lens~incident surface of the negative auxiliary lens: 35.000 mm the outgoing surface of the negative auxiliary lens~incident surface of the prism: 7.000 mm incident surface of the prism~outgoing surface of the prism: 60.000 mm outgoing surface of the prism~the projecting lens: 11.878 mm the projecting lens~exit pupil: 80.000 mm exit pupil~the screen: 1907.692 mm effective aperture of the positive auxiliary lens: 80.000 mm effective aperture of the negative auxiliary lens: 70.000 mm one side of the prism: 60.000 mm effective aperture of the projecting lens: 80.000 mm

Embodiment 15

Figure 35:
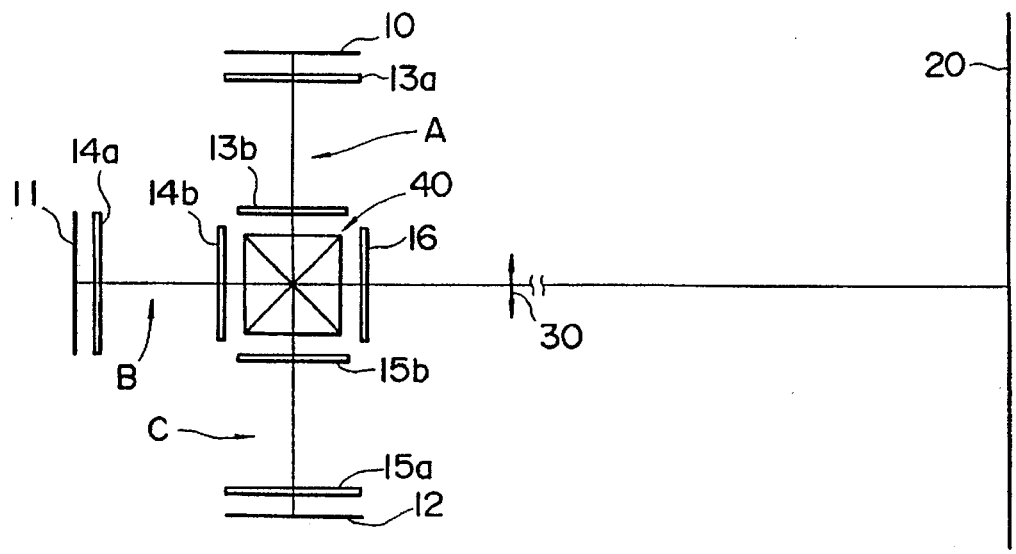
FIG. 35 is a schematic view of a projector of embodiment 15 according to the present invention.
Figure 36:
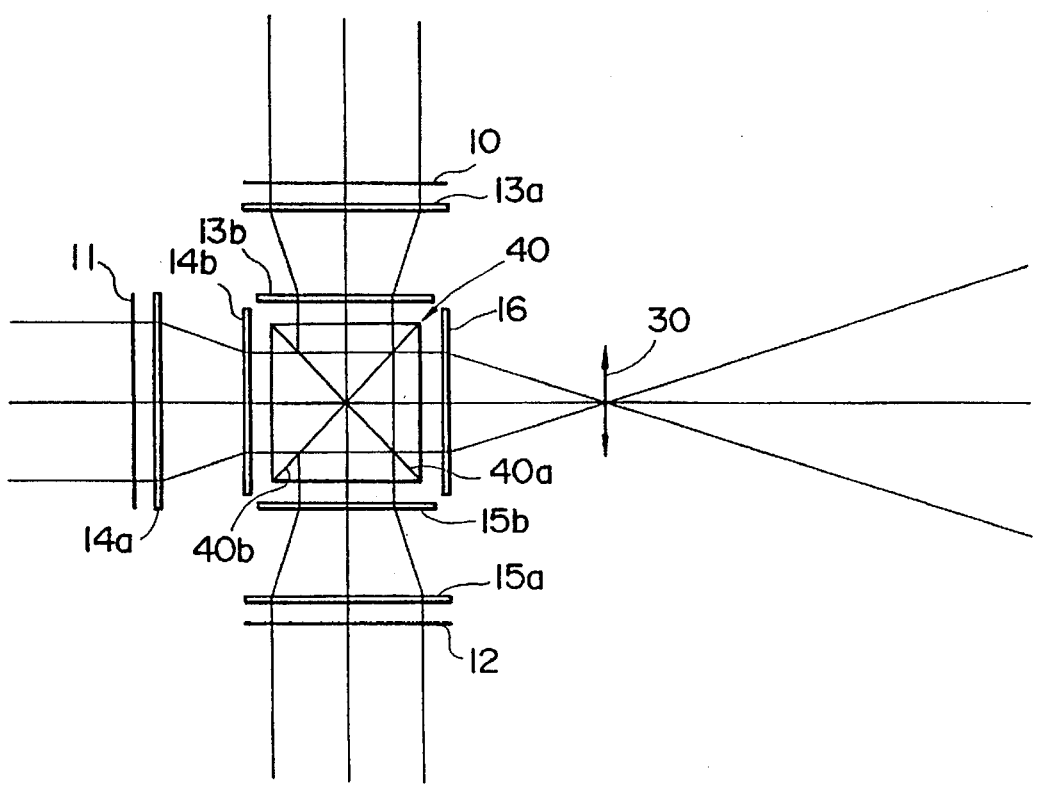
FIG. 36 is an enlarged view of the light path overlapping portion in FIG. 35.

FIGS. 35 and 36 show embodiment 15 of the projector according to the present invention.

In embodiment 14, since a telecentric lens is used on the image forming means side as the projecting lens, a projecting lens having an equal size to the diameter of the luminous flux is required. In embodiment 15, the auxiliary lens 16 for converging the luminous flux is disposed between the projecting lens and the dichroic lens in order to reduce the effective diameter required for the projecting lens.

A concrete numerical example will now be described:

The thickness of seven auxiliary lenses are all 2.000 mm.

focal length of the positive auxiliary lens: 100.000 mm focal length of the negative auxiliary lens : −65.000 mm focal length of the auxiliary lens 16: 65.000 mm focal length of the projecting lens: −365.772 mm refractive index of the prism: 1.51633 the image forming means~incident surface of the positive auxiliary lens: 7.000 mm the outgoing surface of the positive auxiliary lens~incident surface of the negative auxiliary lens: 35.000 mm the outgoing surface of the negative auxiliary lens~incident pupil of the prism: 7.000 mm incident pupil of the prism~outgoing surface of the prism: 60.000 mm outgoing surface of the prism~incident surface of the auxiliary lens 16: 7.000 mm outgoing surface of the auxiliary lens 16~the projecting lens: 65.000 mm the projecting lens~the screen: 1549.997 mm effective aperture of the positive auxiliary lens: 80.000 mm effective aperture of the negative auxiliary lens: 70.000 mm one side of the prism: 60.000 mm effective aperture of the auxiliary lens 16: 70.000 mm effective aperture of the projecting lens: 20.000 mm

Embodiment 16

Figure 37:
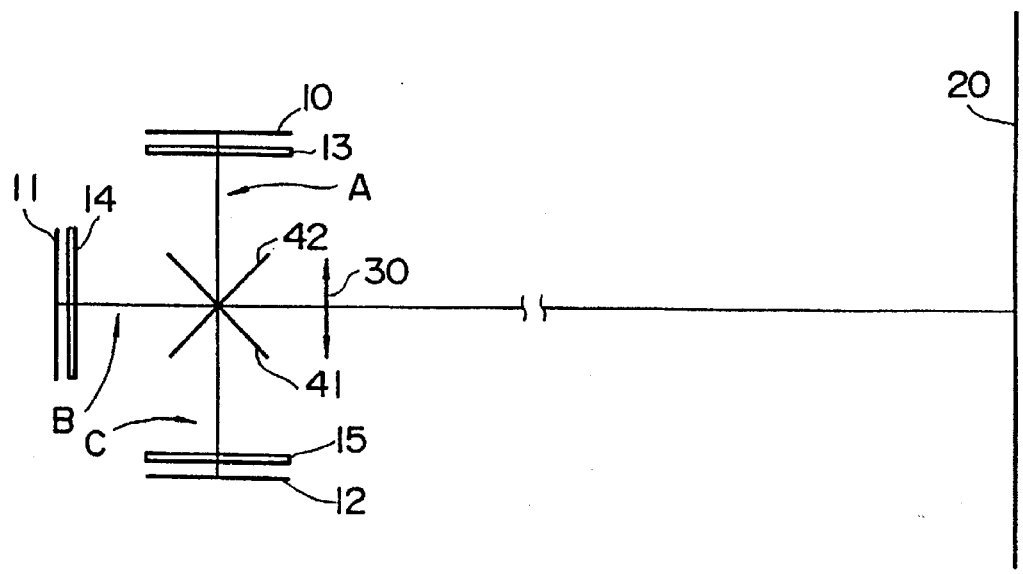
FIG. 37 is a schematic view of a projection of embodiment 16 according to the present invention.
Figure 38:
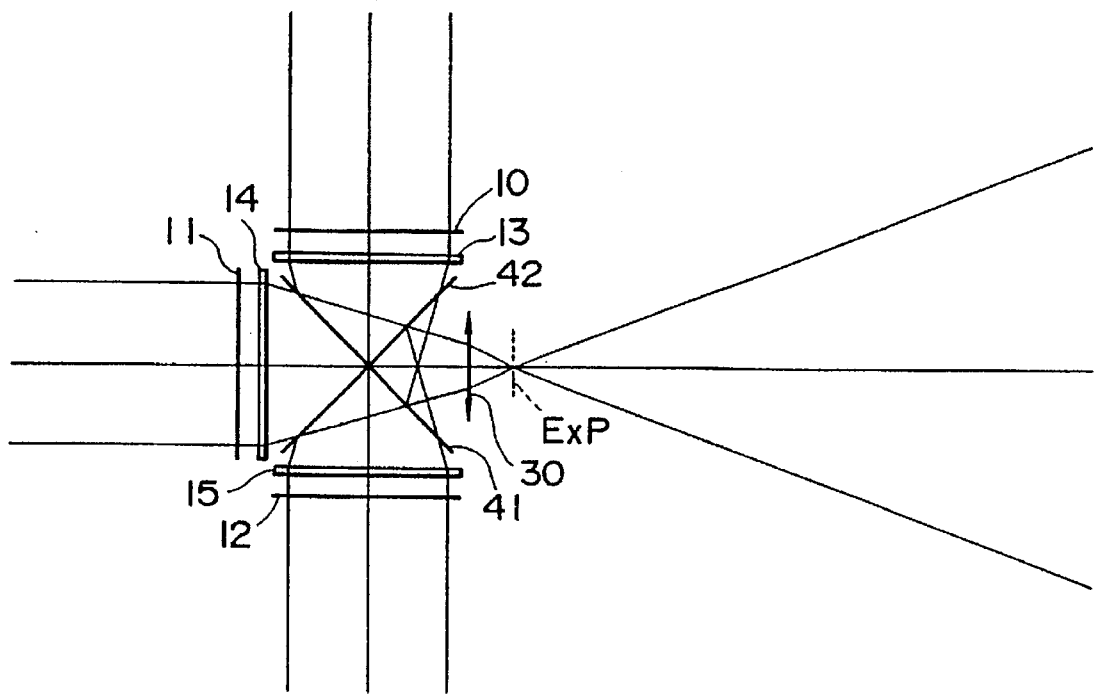
FIG. 38 is an enlarged view of the light path overlapping portion in FIG. 37.

FIGS. 37 and 38 show embodiment 16 of the projector according to the present invention. FIG. 37 is an overall view and FIG. 38 is an enlarged view of a portion for overlapping the luminous flux.

As shown in FIGS. 37 and 38, the projector is constructed such that the luminous flux coming from three projecting optical systems A, B, C comprising the LCDs 10, 11, 12 and the auxiliary lenses 13, 14, 15 are overlapped by two dichroic mirrors 41, 42 disposed in such a manner to be mutually intersected at the point of intersection of the optical axes of the respective auxiliary lenses and then made incident to the projecting lens 30.

In FIG. 37, one central principal ray is shown for each projecting optical system, and in FIG. 38, three principal rays are shown for each of them.

The dichroic prism 40 has such characteristics that the R component is reflected and other components are permitted to transmit therethrough, and the other dichroic lens 42 has such characteristics that the B component is reflected and other components are permitted to transmit therethrough. Also, the dichroic mirrors are tilted by 45° relative to the optical axis of the projecting lens 30, respectively.

According to this construction, the parallel luminous fluxes of the various color components transmitted through the respective LCDs is made into a convergent light by the auxiliary lenses and made incident to the dichroic mirrors 41, 42. And these luminous fluxes are overlapped one upon the other by the dichroic mirrors 41, 42 and projected onto the screen 20 in the overlapping state to form a color image thereon through the projecting lens.

A concrete numerical example will now be described:

The thickness of the auxiliary lens is 2.000 mm.

focal length of the auxiliary lens: 100.00 mm focal length of the projecting lens: 80.000 mm the image forming means~incident surface of the auxiliary lens: 7.000 mm the outgoing surface of the auxiliary lens~the mirror: 40.000 mm the mirror~the projecting lens: 38.023 mm the projecting lens~exit pupil: 17.241 mm exit pupil~the screen: 1215.960 mm effective aperture of the auxiliary lens: 80.000 mm effective aperture of the projecting lens: 50.000 mm Embodiment 17

FIGS. 39 and 40 show embodiment 17 of the projector according to the present invention.

This projector has the auxiliary lens disposed between the light source and the LCD, and all the other constructions are the same as in the above-mentioned embodiment 16.

In embodiment 16, the parallel luminous flux is made incident to the LCD and is thus preferable. However, it has created such a state where irregularity of transmittance readily occurs to the dichroic mirror. To the contrary, in the case of embodiment 17, the projector is more preferable than that of embodiment 12 in view of the performance of the dichroic mirror.

A concrete numerical construction will now be described:

focal length of the auxiliary lens: 100.00 mm focal length of the projecting lens: 80.000 mm the outgoing surface of the auxiliary lens~the image forming means: 7.000 mm the image forming means~the mirror: 45.000 mm the mirror~the projecting lens: 40.161 mm the projecting lens~exit pupil: 7.138 mm exit pupil~the screen: 1312.862 mm effective aperture of the auxiliary lens: 80.000 mm effective aperture of the projecting lens: 50.000 mm Embodiment 18

Figure 41:
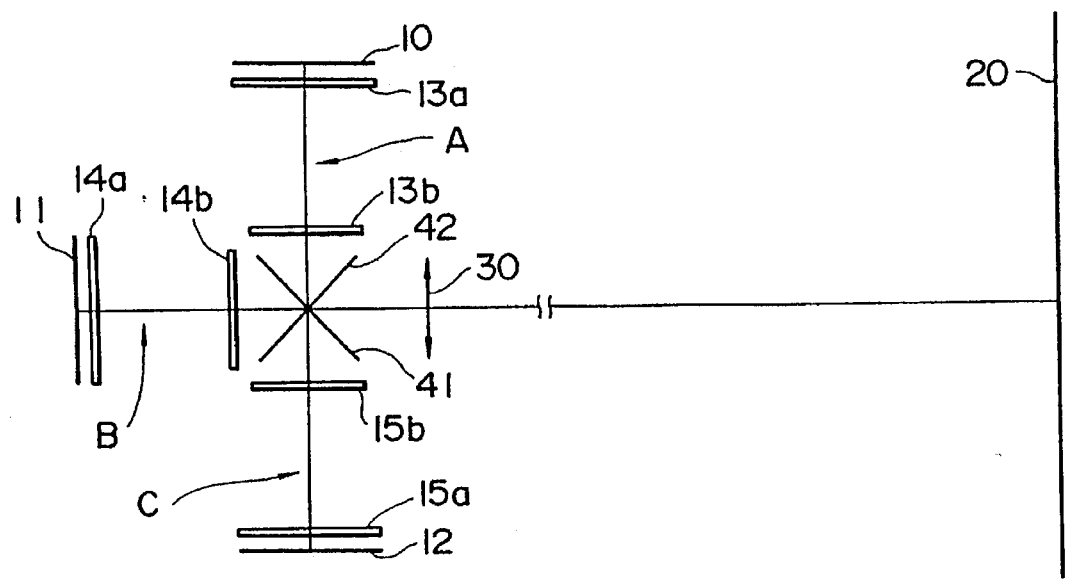
FIG. 41 is a schematic view of a projector of embodiment 18 according to the present invention.
Figure 42:
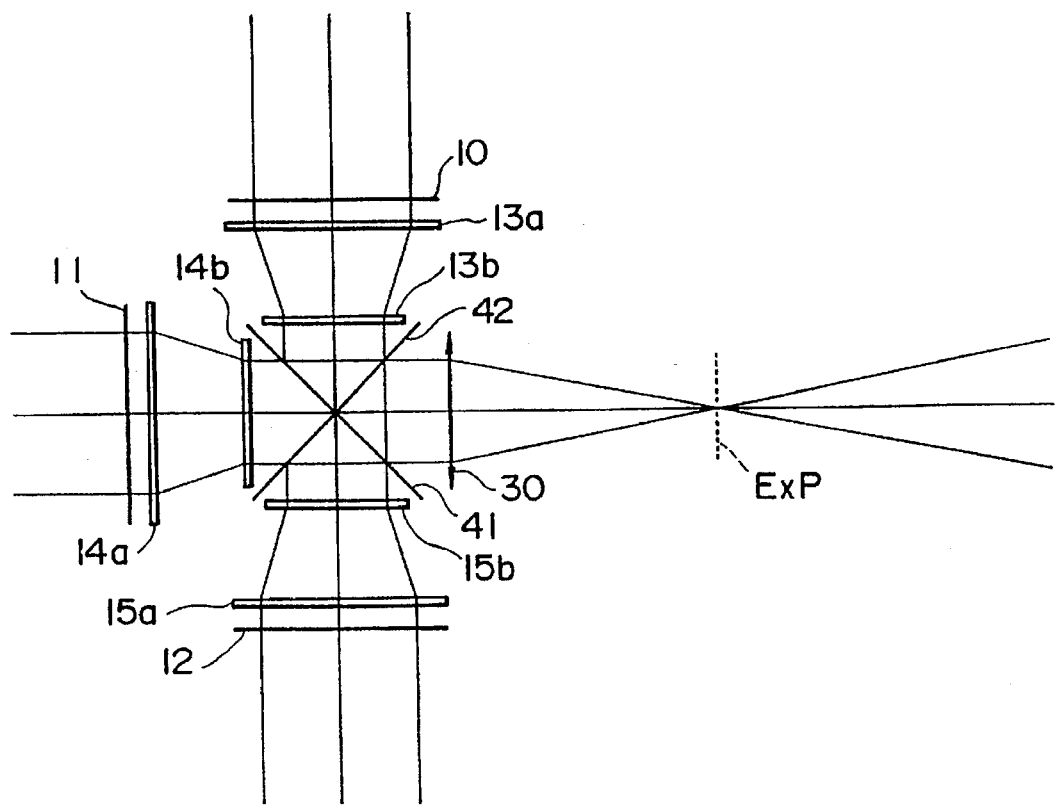
FIG. 42 is an enlarged view of the light path overlapping portion in FIG. 41.

FIGS. 41 and 42 show embodiment 18 of the projector according to the present invention.

This projector has the positive auxiliary lenses 13a, 14a, 15a and the negative auxiliary lenses 13b, 14b, 15b disposed between the LCDs 10, 11, 12 and the dichroic mirrors 40, 41, so that the luminous flux transmitted through the LCDs are made incident to the dichroic mirrors as a parallel luminous flux of a small diameter.

Accordingly, since the parallel luminous flux is made incident to the projecting lens 30, a lens in which the exit pupil is located behind the lens such as, for example, a telecentric lens on the image forming means side, is used as the projecting lens 30.

All the other constructions are the same as those of embodiment 16.

According to this construction, irregularity of the transmittance can be reduced to both the LCDs and dichroic mirrors.

Next, a concrete numerical example will be described:

The thickness of six auxiliary lenses are all 2.000 mm.

focal length of the positive auxiliary lens: 100.000 mm focal length of the negative auxiliary lens: −65.000 mm focal length of the projecting lens: 100.000 mm the image forming means~incident surface of the positive auxiliary lens: 7.000 mm the outgoing surface of the positive auxiliary lens~incident surface of the negative auxiliary lens: 35.000 mm the outgoing surface of the negative auxiliary lens~the mirror: 35.000 mm the mirror~the projecting lens: 43.486 mm the projecting lens~exit pupil: 100.000 mm exit pupil~the screen: 2284.615 mm effective aperture of the positive auxiliary lens: 80.000 mm effective aperture of the negative auxiliary lens: 60.000 mm effective aperture of the projecting lens: 80.000 mm Embodiment 19

Figure 43:
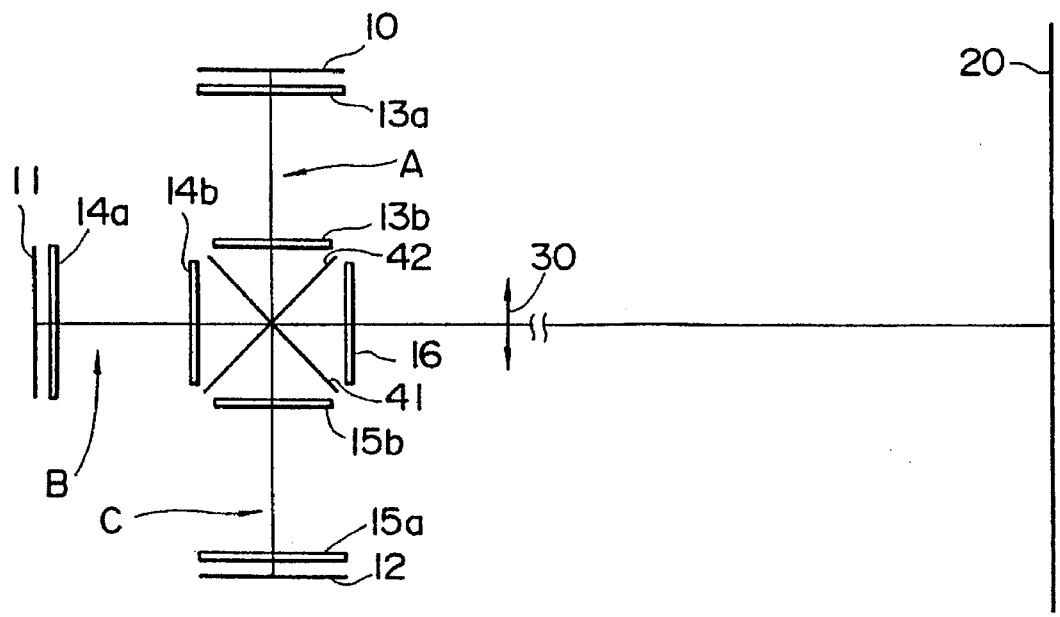
FIG. 43 is a schematic view of a projector of embodiment 19 according to the present invention.
Figure 44:
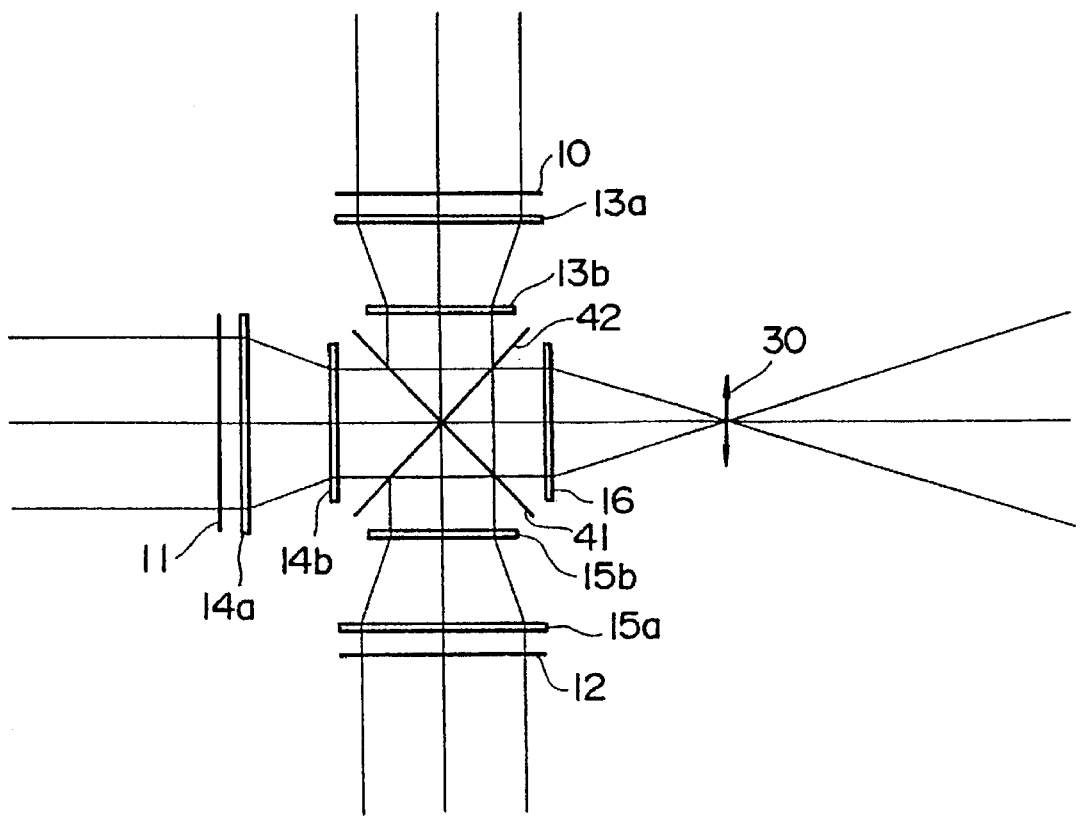
FIG. 44 is an enlarged view of the light path overlapping portion in FIG. 43.

FIGS. 43 and 44 show embodiment 19 of the projector according to the present invention.

In embodiment 18, since a telecentric lens is used on the image forming means side of the projecting lens, a projecting lens having an equal size to the diameter of the luminous flux is required. In embodiment 19, the auxiliary lens 16 for converging the luminous flux is disposed between the projecting lens 30 and the dichroic mirrors 41, 42 in order to reduce the effective diameter required for the projecting lens.

A concrete numerical example will now be described:

The thickness of seven auxiliary lenses are all 2.000 mm.

focal length of the positive auxiliary lens: 100.000 mm focal length of the negative auxiliary lens: −65.000 mm focal length of the auxiliary lens 16: 65.000 mm focal length of the projecting lens: −111.238 mm the image forming means~incident surface of the positive auxiliary lens: 7.000 mm the outgoing surface of the positive auxiliary lens~incident surface of the negative auxiliary lens: 35.000 mm the outgoing surface of the negative auxiliary lens~the mirror: 40.000 mm the mirror~incident surface of the auxiliary lens 16: 40.000 mm outgoing surface of the auxiliary lens 16~the projecting lens: 65.000 mm the projecting lens~the screen: 1549.961 mm effective aperture of the positive auxiliary lens: 80.000 mm effective aperture of the negative auxiliary lens: 70.000 mm effective aperture of the auxiliary lens 16: 80.000 mm effective aperture of the projecting lens: 40.000 mm

Embodiment 20

Figure 45:
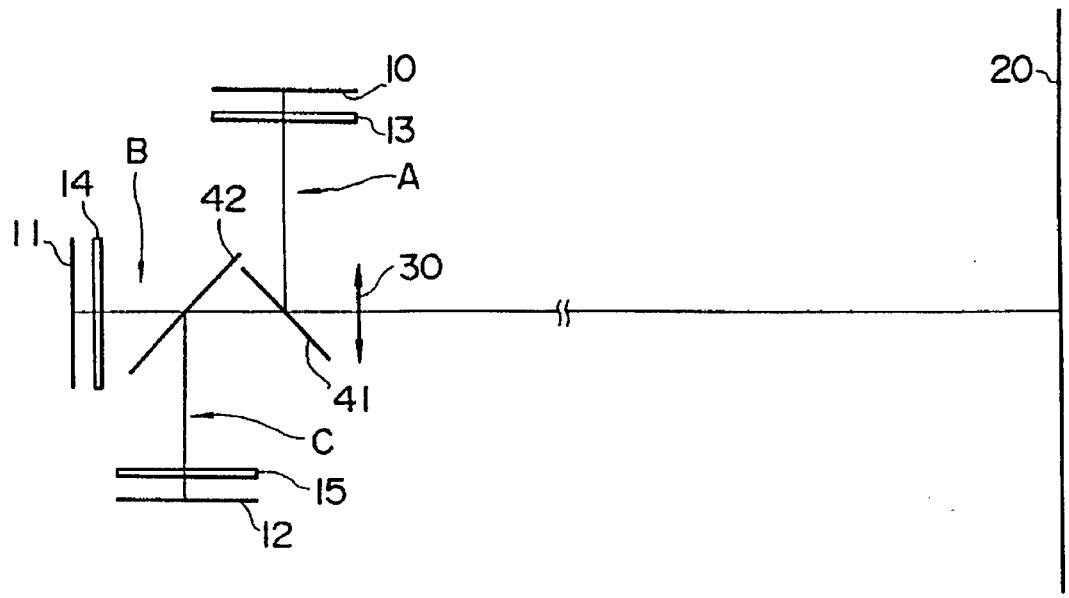
FIG. 45 is a schematic view of a projector of embodiment 20 according to the present invention.
Figure 46:
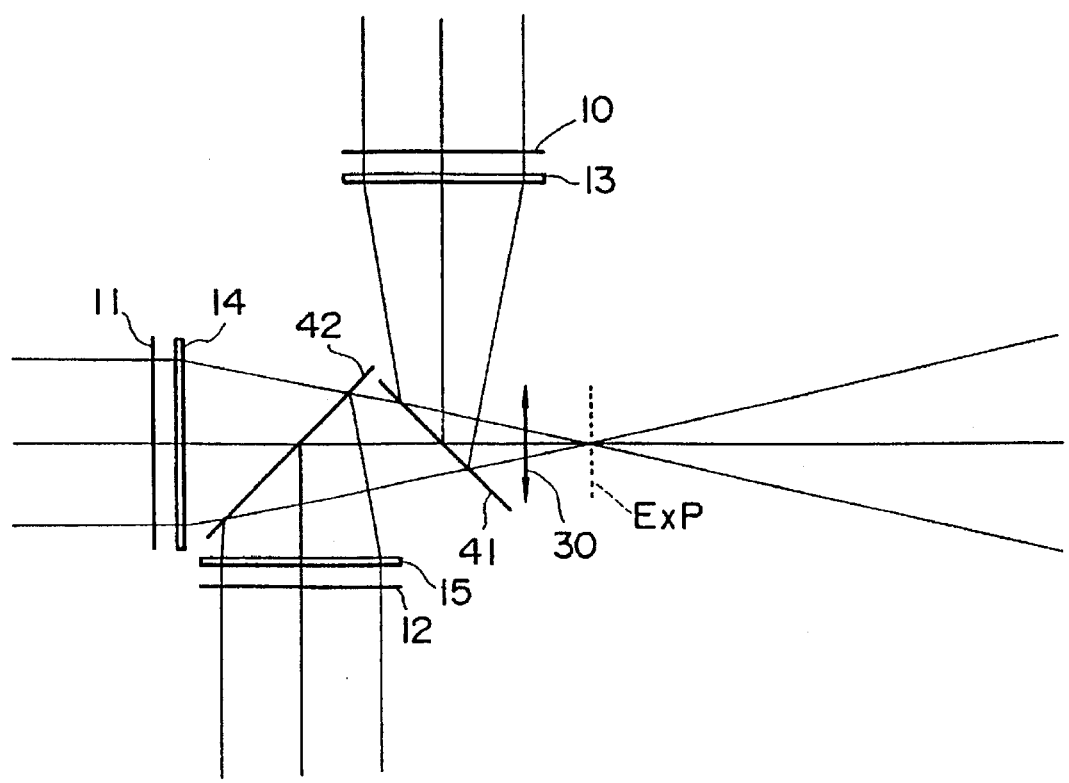
FIG. 46 is an enlarged view of the light path overlapping portion in FIG. 45.

FIGS. 45 and 46 show embodiment 20 of the projector according to the present invention. FIG. 45 is an overall view, and FIG. 46 is an enlarged view of a portion for overlapping the luminous flux.

As shown in FIGS. 45 and 46, this projector is constructed such that the luminous flux coming from three projecting optical systems A, B, C comprising the LCDs 10, 11, 12 and the auxiliary lenses 13, 14, 15 are overlapped by two dichroic mirrors 41, 42 disposed independently and then made incident to the projecting lens 30.

In FIG. 45, one central principal ray is shown for each projecting optical system, and in FIG. 46, three principal rays are shown for each of them.

The dichroic mirror 41 has such characteristics that the R component is reflected and other components are permitted to transmit therethrough, and the other dichroic mirror 42 has such characteristics that the B component is reflected and other components are permitted to transmit therethrough. Also, the dichroic mirrors are tilted by 45° relative to the optical axis of the projecting lens 30, respectively.

According to this construction, the parallel luminous flux of the various color components transmitted through the respective LCDs is made into a convergent light by the auxiliary lens and made incident to the dichroic mirrors 41, 42. And these luminous flux are overlapped one upon the other by the dichroic mirrors 41, 42 and projected onto the screen 20 in the overlapping state to form a color image thereon through the projecting lens 30.

A concrete numerical example will now be described:

The numerical values set forth hereunder are related to the projecting optical systems B, C. With regard to the projecting optical system A, the distance from the auxiliary lens to the mirror 41 is the same (100 mm) as for the other projecting optical systems, although the mirror 42 is not provided.

The thickness of the auxiliary lens is 2.000 mm.
focal length of the auxiliary lens: 160.000 mm
focal length of the projecting lens: 130.000 mm
the image forming means–incident surface of the auxiliary lens: 7.000 mm
the outgoing surface of the auxiliary lens–the mirror 42: 45.000 mm
the mirror 42–the mirror 41: 55.000 mm
the mirror 41–the projecting lens: 31.451 mm
the projecting lens–exit pupil: 23.407 mm
exit pupil–the screen: 2033.435 mm
effective aperture of the auxiliary lens: 80.000 mm
effective aperture of the projecting lens: 60.000 mm

Embodiment 21

Figure 47:
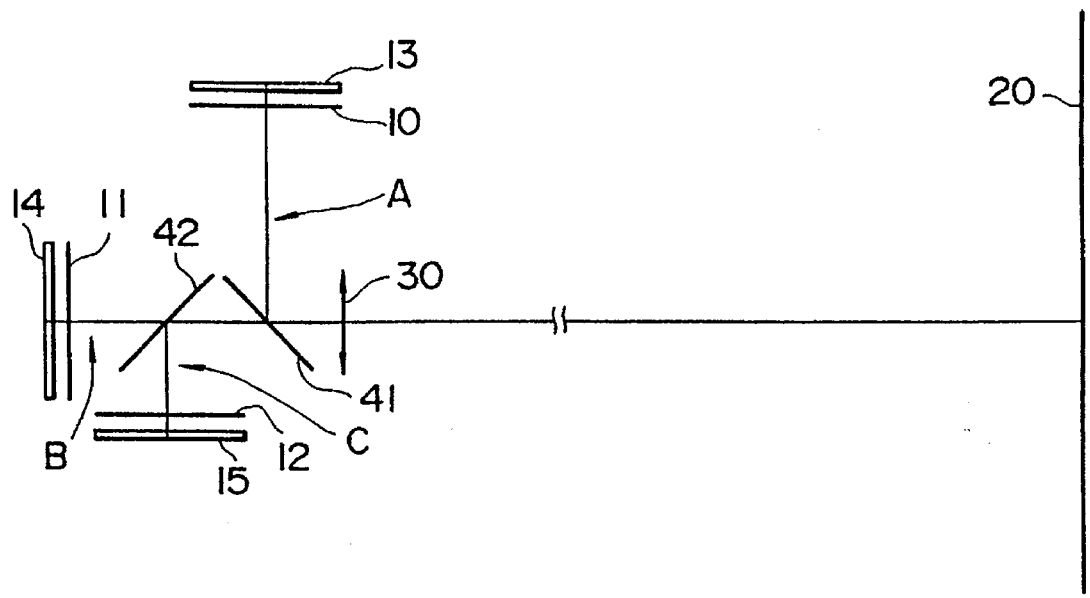
FIG. 47 is a schematic view of a projector of embodiment 21 according to the present invention.
Figure 48:
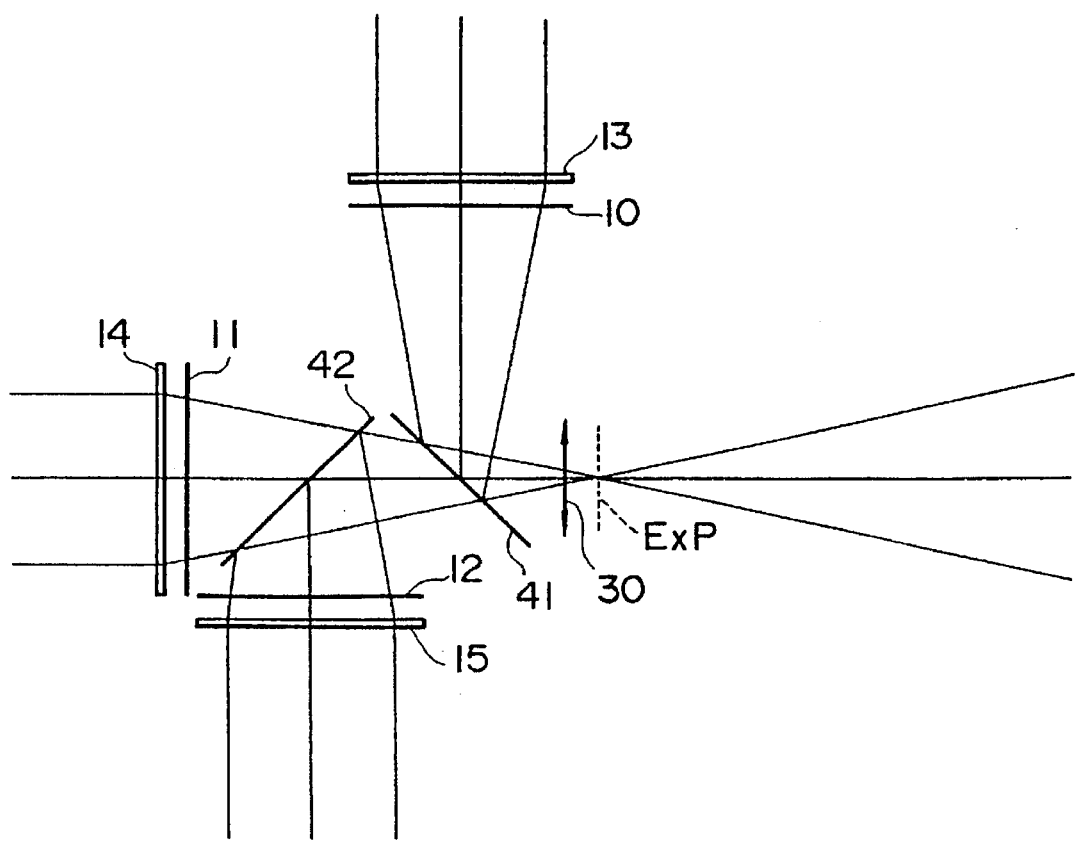
FIG. 48 is an enlarged view of the light path overlapping portion in FIG. 47.

FIGS. 47 and 48 show embodiment 21 of the projector according to the present invention.

In embodiment 20, the parallel luminous flux is made incident to the LCD and thus this embodiment is preferable. However, it has created such a state where irregularity of transmittance readily occurs to the dichroic mirror. To the contrary, in the case of embodiment 21, the projector is preferable to that of embodiment 20 in view of the performance of the dichroic mirror.

A concrete numerical construction will now be described:

The numerical values set forth hereunder are related to the projecting optical systems B, C. With regard to the projecting optical system A, the distance from the auxiliary lens to the mirror 41 is the same (100 mm) to the other projecting optical systems, although the mirror 42 is not provided.

focal length of the auxiliary lens: 160.000 mm
focal length of the projecting lens: 130.000 mm
the outgoing surface of the auxiliary lens–the image forming means: 7.000 mm
the image forming means–the mirror 42: 45.000 mm
the mirror 42–the mirror 41: 55.000 mm
the mirror 41–the projecting lens: 38.387 mm
the projecting lens–exit pupil: 13.136 mm
exit pupil–the screen: 2131.830 mm
effective aperture of the auxiliary lens: 80.000 mm
effective aperture of the projecting lens: 60.000 mm

Embodiment 22

Figure 49:
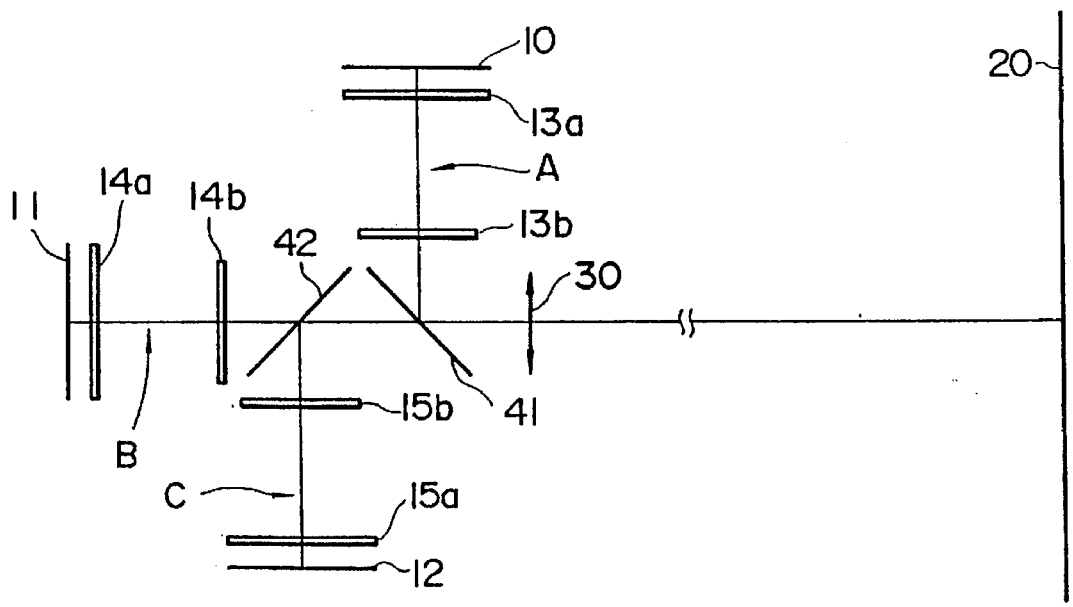
FIG. 49 is a schematic view of a projector of embodiment 22 according to the present invention.
Figure 50:
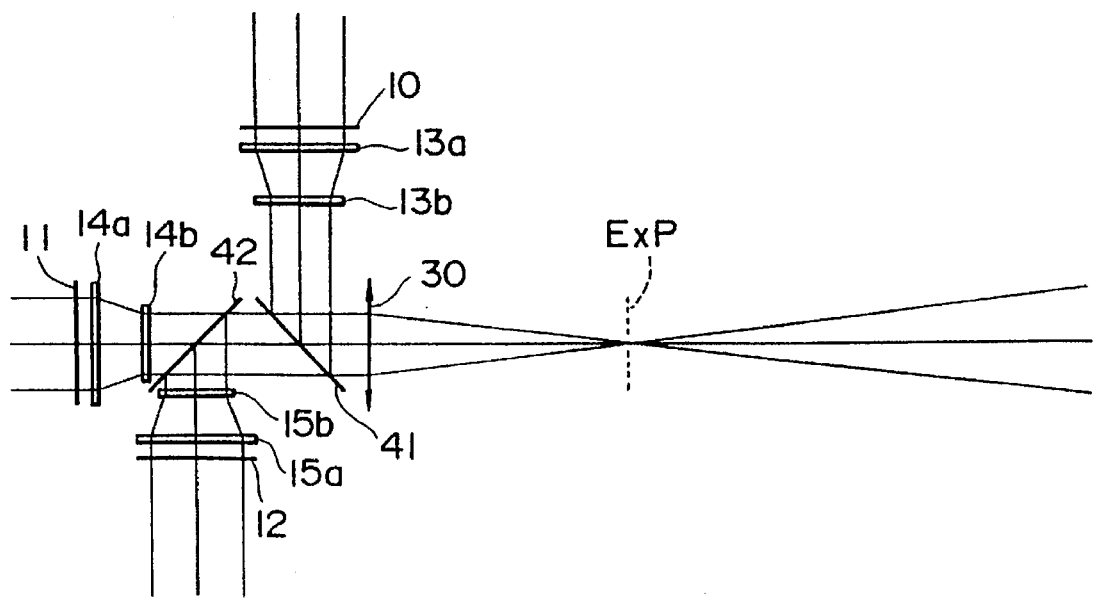
FIG. 50 is an enlarged view of the light path overlapping portion in FIG. 49.

FIGS. 49 and 50 show embodiment 22 of the projector according to the present invention.

This projector has the positive auxiliary lenses 13a, 14a, 15a and the negative auxiliary lenses 13b, 14b, 15b disposed between the LCDs 10, 11, 12 and the dichroic mirrors 40, 41, so that the luminous flux transmitted through the LCDs are made incident to the dichroic mirrors as a parallel luminous flux of a small diameter.

Accordingly, since the parallel luminous flux is made incident to the projecting lens 30, a lens in which the exit pupil is located behind the lens such as, for example, a telecentric lens to the image forming means side, is used as the projecting lens 30.

All the other constructions are the same as those of embodiment 20.

According to this constructions, irregularity of the transmittance can be reduced to both the LCDs and dichroic mirrors.

Next, a concrete numerical example will be described:

The numerical values set forth hereunder are related to the projecting optical systems B, C. With regard to the projecting optical system A, the distance from the auxiliary lens to the mirror 41 is the same (100 mm) as the other projecting optical systems, although the mirror 42 is not provided. The thickness of six auxiliary lenses are all 2.000 mm.

focal length of the positive auxiliary lens: 100.000 mm
focal length of the negative auxiliary lens: –65.000 mm
focal length of the projecting lens: 160.000 mm
the image forming means–incident surface of the positive auxiliary lens: 7.000 mm
the outgoing surface of the positive auxiliary lens–incident surface of the negative auxiliary lens: 35.000 mm
the outgoing surface of the negative auxiliary lens–the mirror 42: 30.000 mm
the mirror 42–the mirror 41: 65.000 mm
the mirror 41–the projecting lens: 46.002 mm
the projecting lens–exit pupil: 160.000 mm
exit pupil–the screen: 3815.407 mm
effective aperture of the positive auxiliary lens: 80.000 mm
effective aperture of the negative auxiliary lens: 60.000 mm
effective aperture of the projecting lens: 90.000 mm

Embodiment 23

Figure 51:
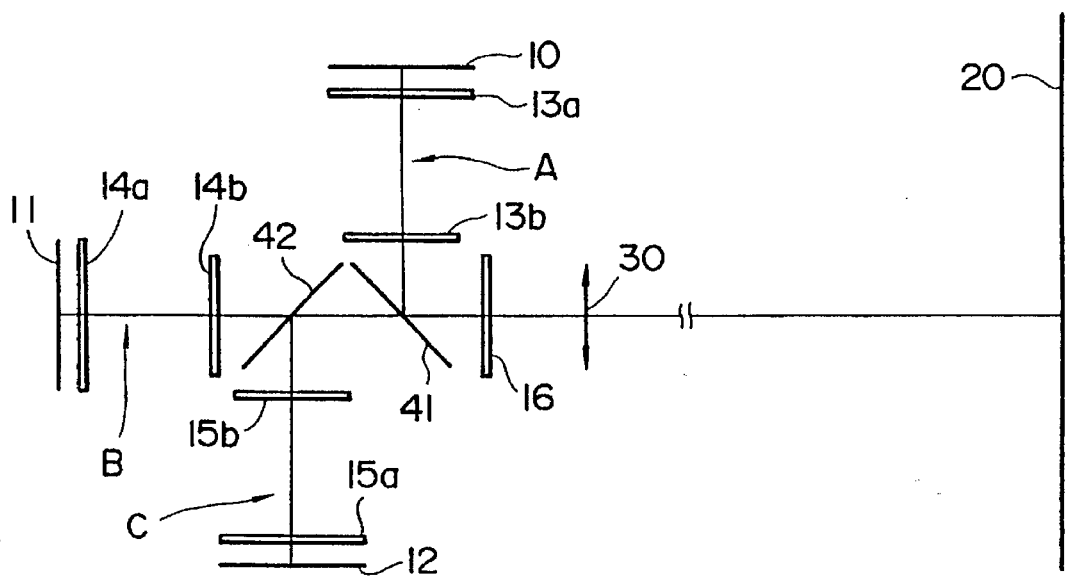
FIG. 51 is a schematic view of a projector of embodiment 23 according to the present invention.
Figure 52:
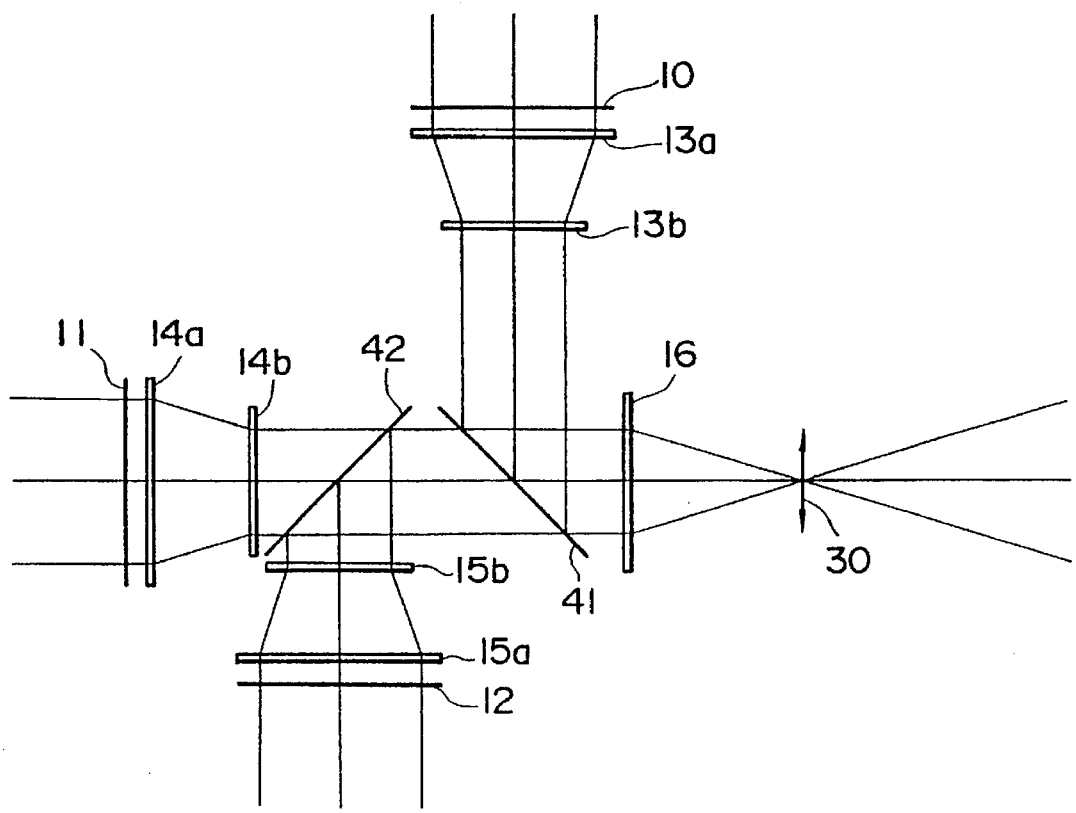
FIG. 52 is an enlarged view of the light path overlapping portion in FIG. 51.

FIGS. 51 and 52 show embodiment 23 of the projector according to the present invention.

In embodiment 22, since a telecentric lens is used on the image forming means side as the projecting lens, a projecting lens having an equal size to the diameter of the luminous flux is required. In embodiment 23, the auxiliary lens 16 for converging the luminous flux is disposed between the projecting lens 30 and the dichroic mirror in order to reduce the effective diameter required for the projecting lens.

A concrete numerical example will now be described:

The numerical values set forth hereunder are related to the projecting optical systems B, C. With regard to the projecting optical system A, the distance from the auxiliary lens to the mirror 41 is the same (97 mm) to the other projecting optical systems, although the mirror 42 is not provided. The thickness of seven auxiliary lenses are all 2.000 mm.

focal length of the positive auxiliary lens: 100.000 mm focal length of the negative auxiliary lens: −65.000 mm focal length of the auxiliary lens 16: 65.000 mm focal length of the projecting lens: −43.120 mm the image forming means~incident surface of the positive auxiliary lens: 7.000 mm the outgoing surface of the positive auxiliary lens~incident surface of the negative auxiliary lens: 35.000 mm the outgoing surface of the negative auxiliary lens~the mirror 42: 32.000 mm the mirror 42~the mirror 41: 65.000 mm the mirror 41~incident surface of the auxiliary lens 16: 43.000 mm outgoing surface of the auxiliary lens 16~the projecting lens: 65.000 mm the projecting lens~the screen: 1549.870 mm effective aperture of the positive auxiliary lens: 80.000 mm effective aperture of the negative auxiliary lens: 70.000 mm effective aperture of the auxiliary lens 16: 90.000 mm effective aperture of the projecting lens: 40.000 mm Embodiment 24

Figure 53:
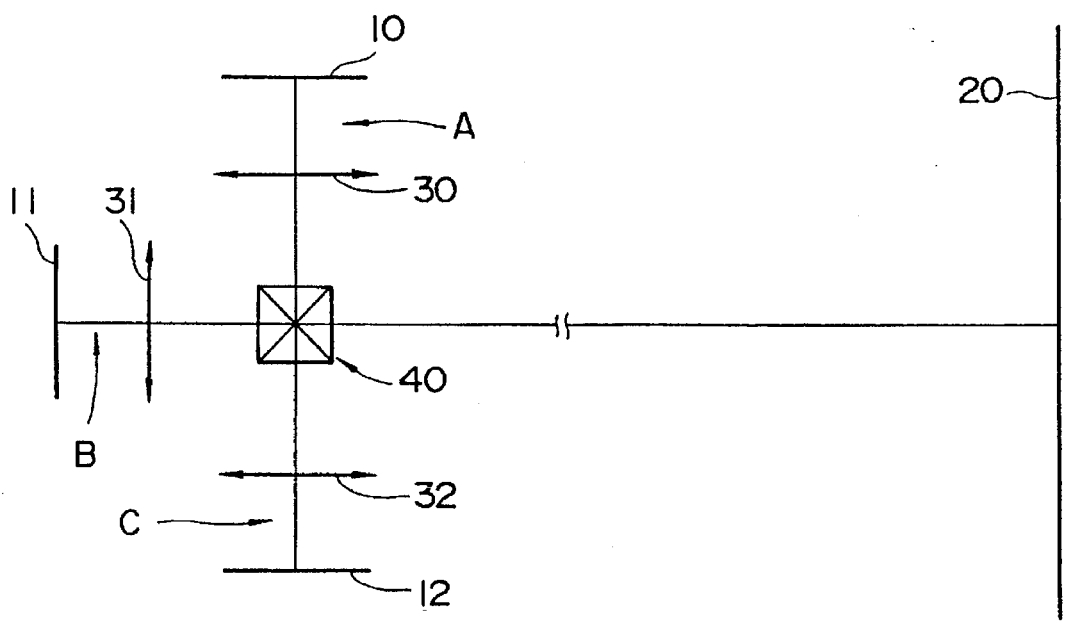
FIG. 53 is a schematic view of a projector of embodiment 24 according to the present invention.
Figure 54:
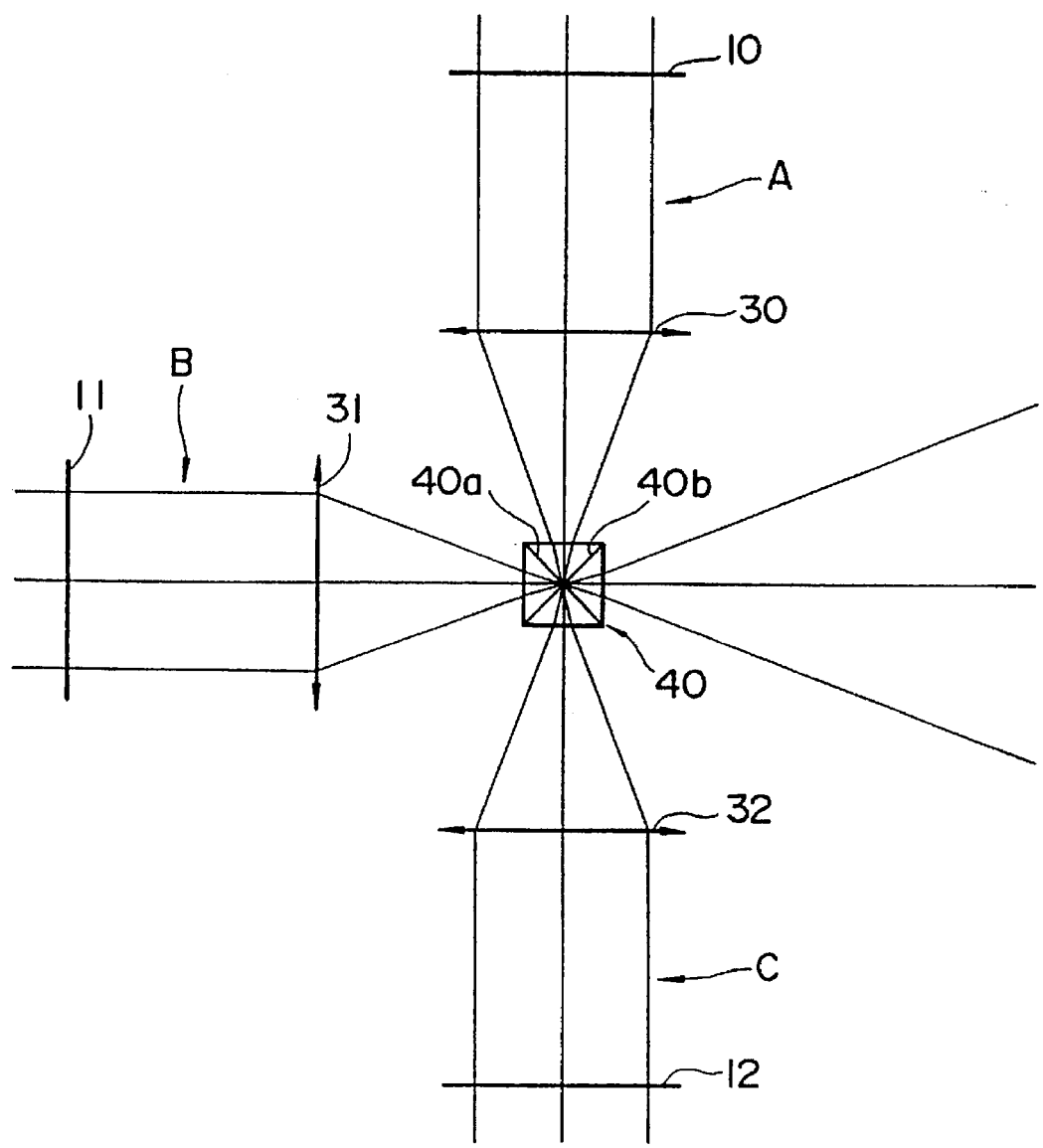
FIG. 54 is an enlarged view of the light path overlapping portion in FIG. 53.

FIGS. 53 and 54 show embodiment 24 of the projector according to the present invention. FIG. 53 is an overall view, and FIG. 54 is an enlarged view of a portion for overlapping the luminous flux.

This projector, as shown in FIG. 53, includes the LCDs 10, 11, 12, three projecting lenses 30, 31, 32 disposed corresponding to these LCDs, and the dichroic prism 40 for overlapping the luminous flux from the respective projecting lenses and projecting the same onto the screen 20 of the transmitting type.

In FIG. 53, one central principal ray is shown for each projecting optical system, and in FIG. 54, three principal rays are shown for each of them.

The optical axes of the auxiliary lenses of the projecting optical systems are disposed to be aligned with the central axes of the LCDs. The optical axes of the projecting lenses 30, 32 of the peripheral projecting optical systems A, C are perpendicular to the optical axis of the projecting lens 31 of the central projecting optical system B.

The dichroic prism 40 is provided with a dichroic surface 40a having such characteristics that the R component is reflected and other components are permitted to transmit therethrough, and with another dichroic surface 40b having such characteristics that the B component is reflected and other components are permitted to transmit therethrough, the dichroic surfaces 40a, 40b being mutually intersected at the point of intersection of the optical axes of the respective projecting lenses. Also, the dichroic surfaces 40a, 40b are tilted by 45° relative to the optical axis of the projecting lens 31, respectively.

According to this construction, the parallel luminous flux of the various color components transmitted through the respective LCDs is made into a convergent light by the projecting lens and made incident to the dichroic prism 40. And these luminous fluxes are overlapped one upon the other by the dichroic prism 40 and projected onto the screen 20 in the overlapping fashion to form a color image thereon.

A concrete numerical example will now be described:

The distances mentioned hereunder are along the optical axis, and the distance within the prism is not an air converted distance but an actual distance.

focal length of the projecting lenses: 80.000 mm refractive index of the prism: 1.51633 the image forming means~the projecting lens: 85.161 mm the projecting lens~incident surface of the prism: 70.108 mm incident surface of the prism~outgoing surface of the prism: 30.000 mm outgoing surface of the prism~the screen: 1230.108 mm effective aperture of the projecting lenses: 90.000 mm one side of the prism: 30.000 mm In the case of the prior art including only one projecting lens, it is necessary, in order to project the similar image forming means as in the case mentioned above, to form that one side of the prism for projecting the image forming means at 80.000 mm and the effective diameter of the projecting lens is 90.000 mm.

Embodiment 25

Figure 55:
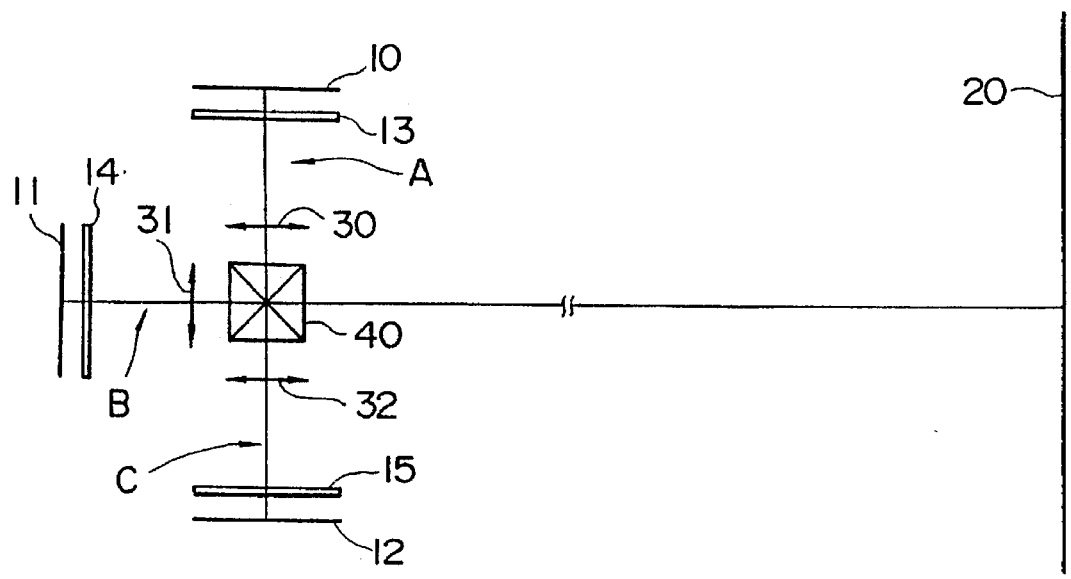
FIG. 55 is a schematic view of a projector of embodiment 25 according to the present invention.
Figure 56:
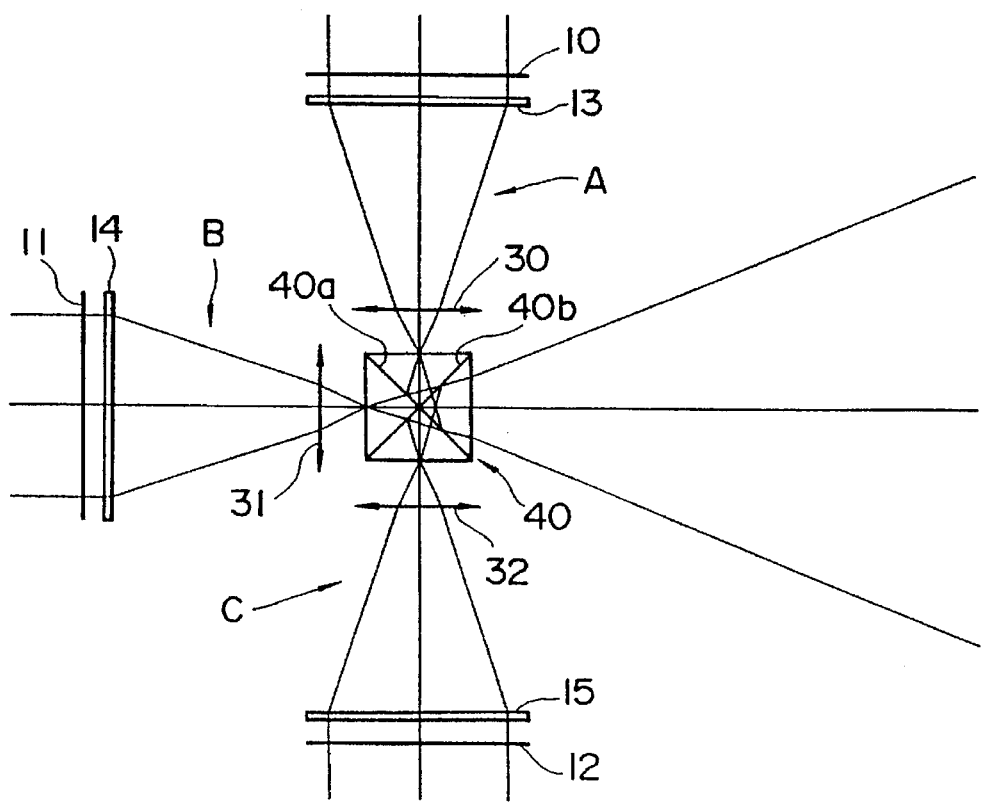
FIG. 56 is an enlarged view of the light path overlapping portion in FIG. 55.

FIGS. 55 and 56 show embodiment 25 of the projector according to the present invention. FIG. 55 is an overall view, and FIG. 56 is an enlarged view of a portion for overlapping the luminous flux.

This projector has the auxiliary lenses 13, 14, 15 disposed between the LCDs and the projecting lenses and adapted to reduce the diameter of the luminous flux coming from the respective LCDs. All the other constructions are the same as those of embodiment 24.

With this construction, the diameter of the luminous flux made incident to the projecting lenses is smaller than that of embodiment 24. In this example, the exit pupil of each projecting lens coincides with the end face on the incident side of the luminous flux of the prism.

Next, a concrete numerical example will be described:

focal length of the auxiliary lens: 100.000 mm focal length of the projecting lens: 80.000 mm refractive index of the prism: 1.51633 the image forming means~incident surface of the auxiliary lens: 7.000 mm the outgoing surface of the auxiliary lens~the projecting lens: 78.023 mm the projecting lens~incident surface of the prism: 17.241 mm incident surface of the prism~outgoing surface of the prism: 40.000 mm outgoing surface of the prism~the screen: 1189.581 mm effective aperture of the auxiliary lens: 80.000 mm effective aperture of the projecting lens: 40.000 mm one side of the prism: 40.000 mm

Embodiment 26

Figure 57:
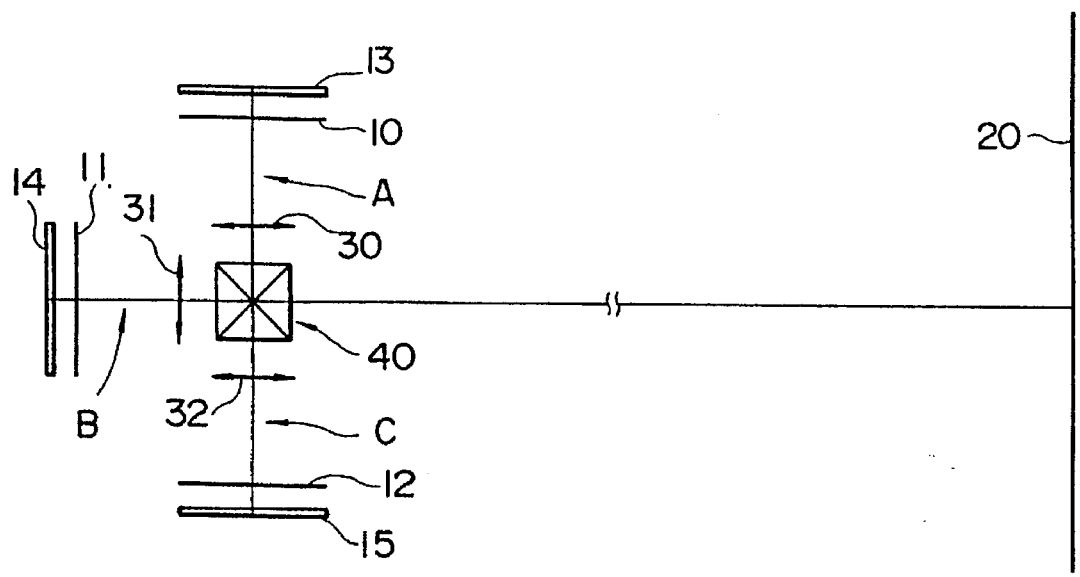
FIG. 57 is a schematic view of a projector of embodiment 26 according to the present invention.
Figure 58:
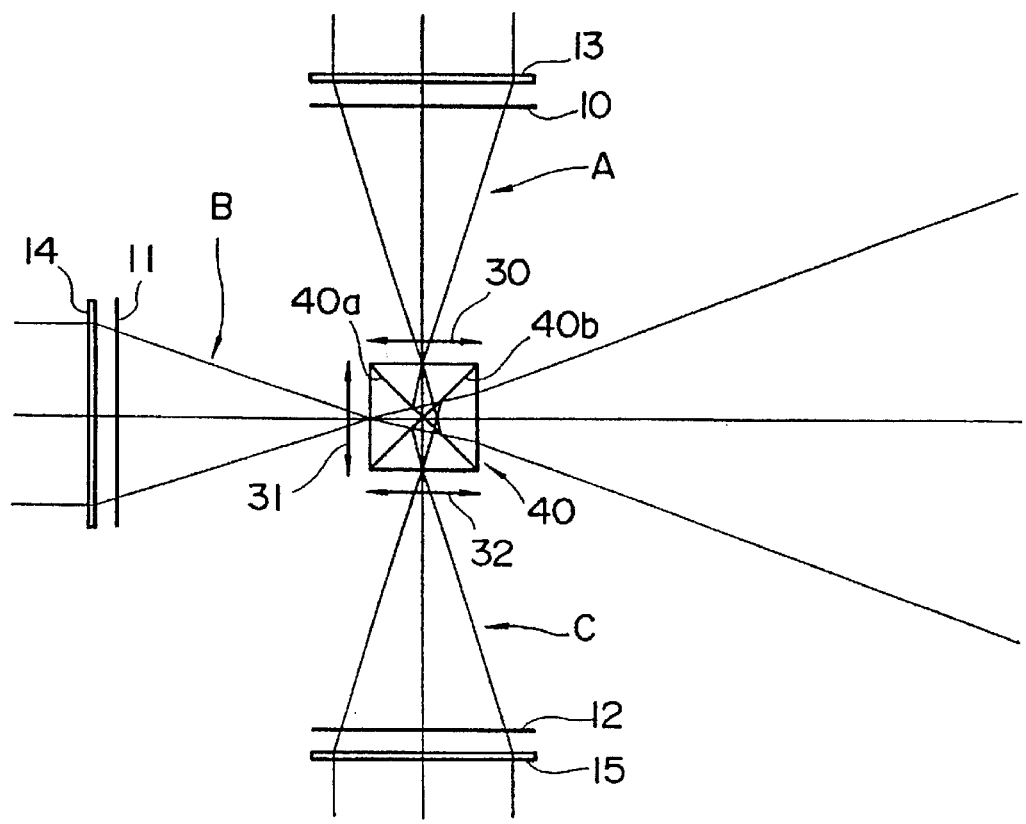
FIG. 58 is an enlarged view of the light path overlapping portion in FIG. 57.

FIGS. 57 and 58 show embodiment 26 of the projector according to the present invention. FIG. 57 is an overall view, and FIG. 58 is an enlarged view of a portion for overlapping the luminous flux.

This projector has the auxiliary lenses disposed between a light source and the LCDs, so that the luminous flux made incident to the LCDs are made into a convergent luminous flux. All the other constructions are the same as in embodiment 25. Also in this example, the exit pupil of the projecting lens coincides with the incident end face of the prism.

In embodiment 25, the parallel luminous flux is made incident to the LCD and is thus preferable. However, it has created such a state where irregularity of transmittance readily occurs to the dichroic mirror. To the contrary, in the case of embodiment 26, the projector is preferable to that of embodiment 25 in view of the performance of the dichroic mirror.

A concrete numerical construction will now be described:

focal length of the auxiliary lens: 100.000 mm focal length of the projecting lens: 80.000 mm refractive index of the prism: 1.51633 the outgoing surface of the auxiliary lens~the image forming means: 7.000 mm the image forming means~the projecting lens: 85.161 mm the projecting lens~incident surface of the prism: 7.138 mm incident surface of the prism~outgoing surface of the prism: 40.000 mm outgoing surface of the prism~the screen: 1286.483 mm effective aperture of the auxiliary lens: 80.000 mm effective aperture of the projecting lens: 40.000 mm one side of the prism: 40.000 mm

Embodiment 27

Figure 59:
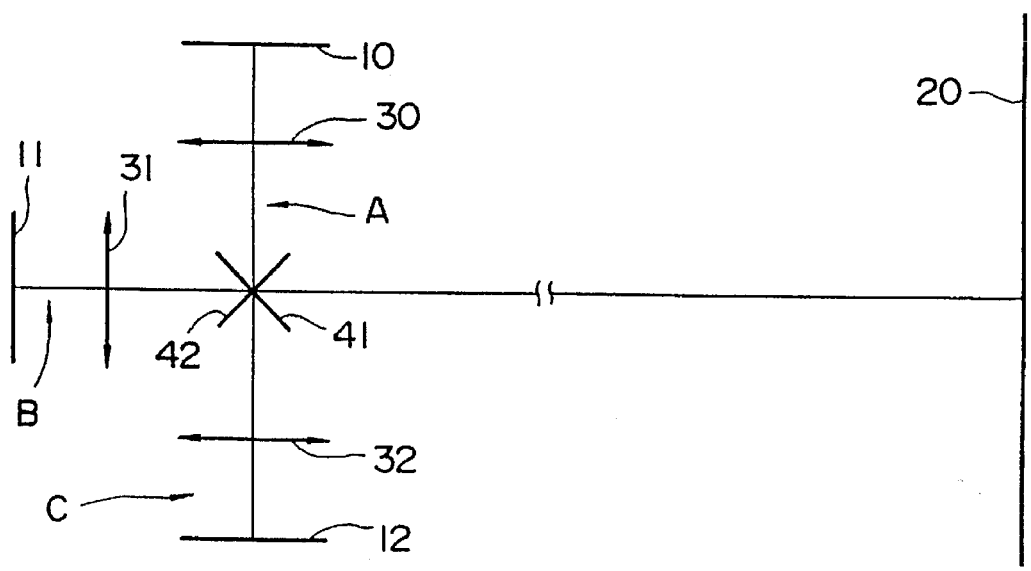
FIG. 59 is a schematic view of a projector of embodiment 27 according to the present invention.
Figure 60:
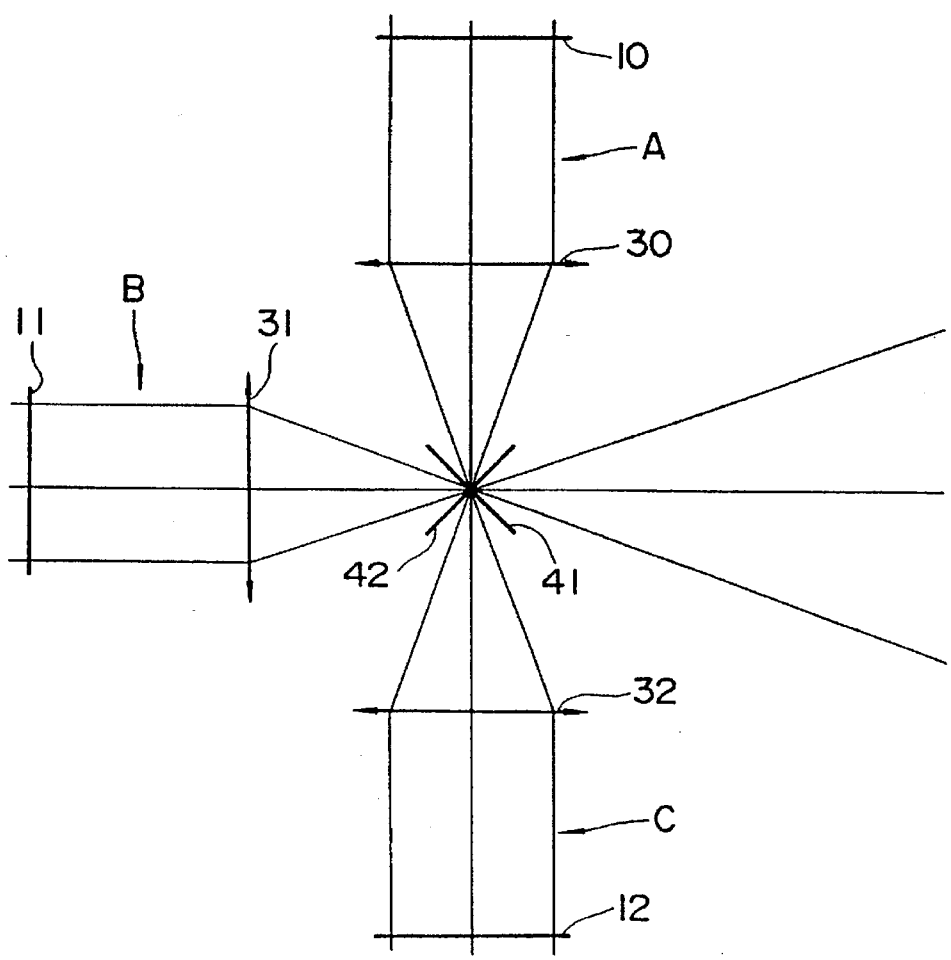
FIG. 60 is an enlarged view of the light path overlapping portion in FIG. 59.

FIGS. 59 and 60 show embodiment 27 of the projector according to the present invention. FIG. 59 is an overall view, and FIG. 60 is an enlarged view of a portion for overlapping the luminous flux.

As shown in FIGS. 59 and 60, the projector is constructed such that the luminous flux coming from three projecting optical systems A, B, C comprising the LCDs 10, 11, 12 and the projecting lenses 30, 31, 32 are overlapped by two dichroic mirrors 41, 42 disposed in such a manner to be mutually intersected at the point of intersection of the optical axes of the respective projecting lenses and then made incident to the screen 20.

In FIG. 59, one central principal ray is shown for each projecting optical system, and in FIG. 60, three principal rays are shown for each of them.

The dichroic mirror 41 has such characteristics that the R component is reflected and other components are permitted to transmit therethrough, and the other dichroic mirror 42 has such characteristics that the B component is reflected and other components are permitted to transmit therethrough. Also, the dichroic mirrors are tilted by 45° relative to the optical axis of the projecting lens 31, respectively.

According to this construction, the parallel luminous flux of the various color components transmitted through the respective LCDs is made into a convergent light by the projecting lens and made incident to the dichroic mirrors 41, 42. And these luminous fluxes are overlapped one upon the other by the dichroic mirrors 41, 42 and projected onto the screen 20 in the overlapping state to form a color image thereon. The exit pupil of each projecting lens is coincident with the point of intersection of the mirror.

A concrete numerical example will now be described:

focal length of the projecting lens: 80.000 mm the image forming means~the projecting lens: 85.161 mm the projecting lens~the mirror: 80.000 mm the mirror~the screen: 1240.000 mm effective aperture of the projecting lens: 90.000 mm

Embodiment 28

Figure 61:
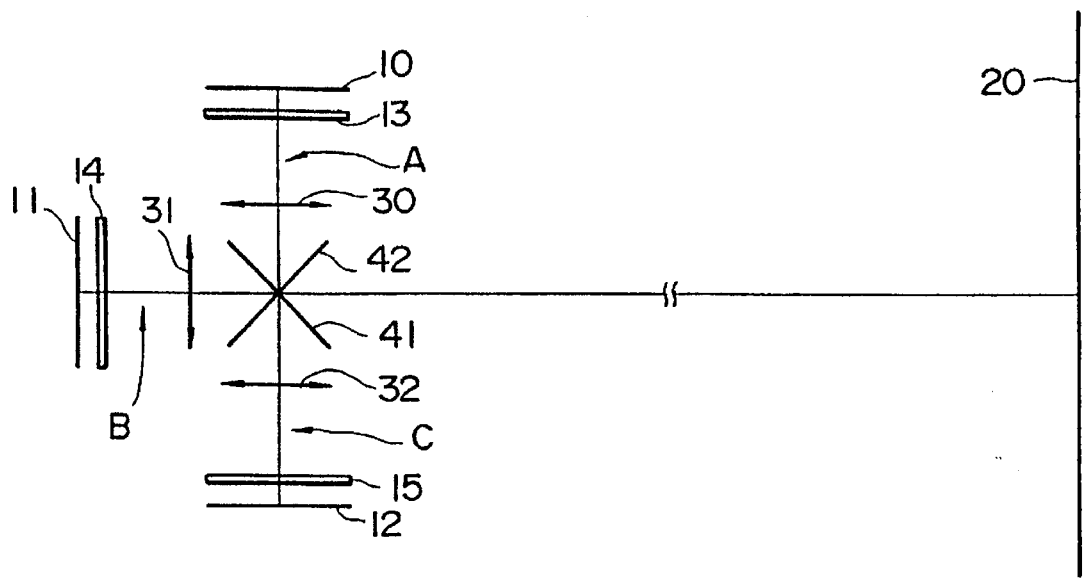
FIG. 61 is a schematic view of a projector of embodiment 28 according to the present invention.
Figure 62:
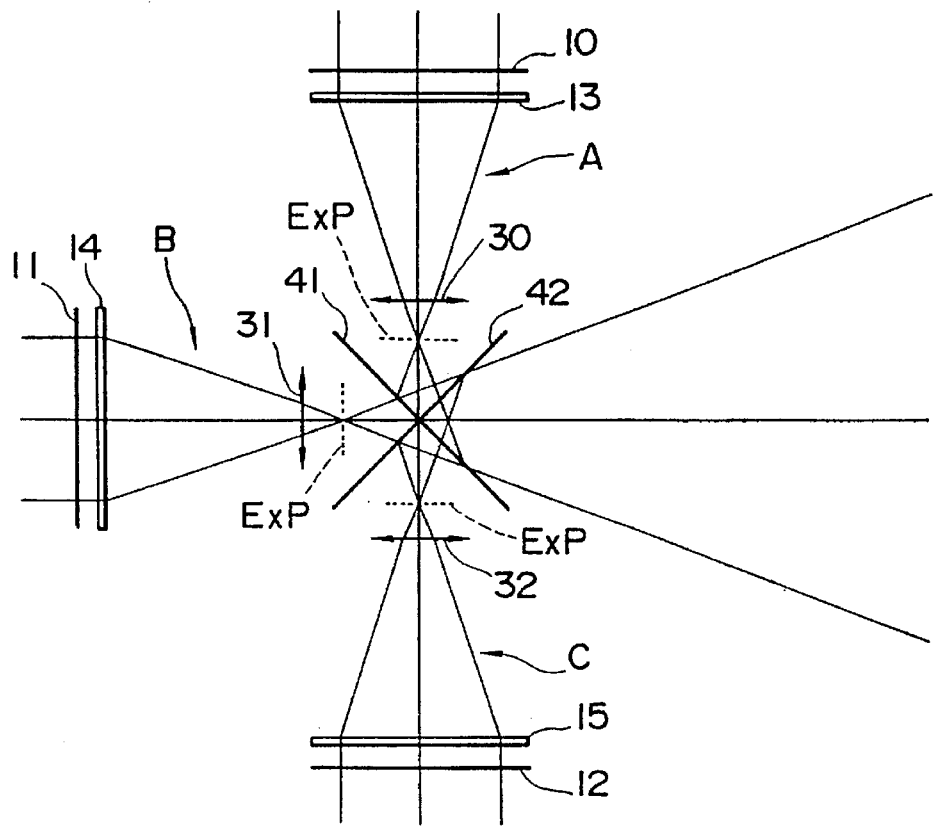
FIG. 62 is an enlarged view of the light path overlapping portion in FIG. 61.

FIGS. 61 and 62 show embodiment 28 of the projector according to the present invention. FIG. 61 is an overall view, and FIG. 62 is an enlarged view of a portion for overlapping the luminous flux.

This projector has the auxiliary lenses 13, 14, 15 disposed between the LCDs and the projecting lenses and adapted to reduce the diameter of the luminous flux coming from the respective LCDs. All the other constructions are the same as those in embodiment 27.

With this construction, the diameter of the luminous flux made incident to the projecting lenses is reduced and the diameter of the projecting lens becomes smaller than embodiment 27.

Next, a concrete numerical example will be described:

The thickness of the auxiliary lens is 2.000 mm.

focal length of the auxiliary lens: 100.000 mm focal length of the projecting lens: 80.000 mm the image forming means~incident surface of the auxiliary lens: 7.000 mm the outgoing surface of the auxiliary lens~the projecting lens: 78.023 mm the projecting lens~exit pupil: 17.241 mm exit pupil~the mirror: 30.000 mm the mirror~the screen: 1185.960 mm effective aperture of the auxiliary lens: 80.000 mm effective aperture of the projecting lens: 50.000 mm

Embodiment 29

Figure 63:
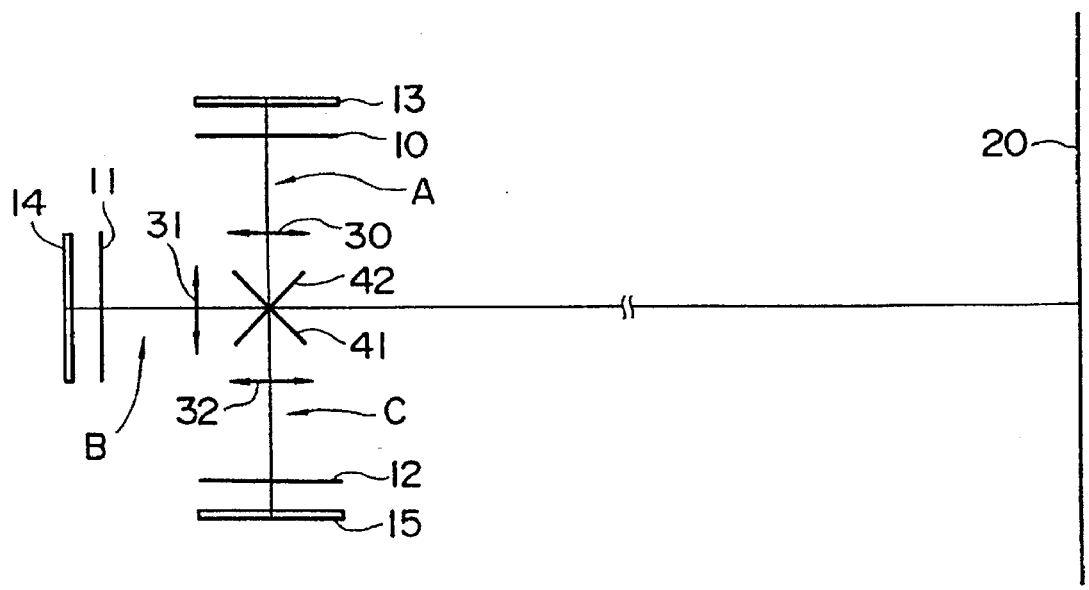
FIG. 63 is a schematic view of a projector of embodiment 29 according to the present invention.
Figure 64:
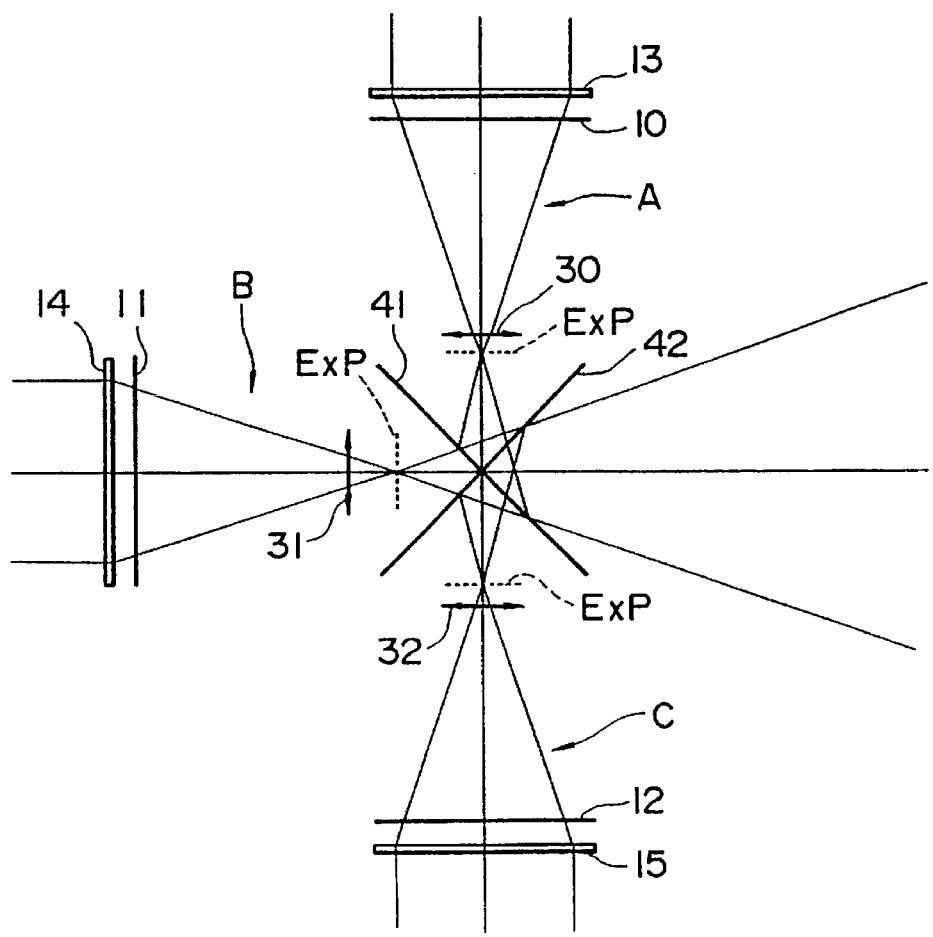
FIG. 64 is an enlarged view of the light path overlapping portion in FIG. 63.

FIGS. 63 and 64 show embodiment 29 of the projector according to the present invention. FIG. 63 is an overall view, and FIG. 64 is an enlarged view of a portion for overlapping the luminous flux.

This projector has the auxiliary lenses disposed between a light source and the LCDs, so that the luminous flux made incident to the LCDs are made into a convergent luminous flux. All the other constructions are the same as those of embodiment 28.

In embodiment 28, the parallel luminous flux is made incident to the LCD and is thus preferable. However, it has created such a state where irregularity of transmittance readily occurs to the dichroic mirror. To the contrary, in the case of embodiment 29, the projector is preferable to that of embodiment 28 in view of the performance of the dichroic mirror.

A concrete numerical construction will now be described:

focal length of the auxiliary lens: 100.000 mm focal length of the projecting lens: 80.000 mm the outgoing surface of the auxiliary lens~the image forming means: 7.000 mm the image forming means~the projecting lens: 85.161 mm the projecting lens~exit pupil 7.138mm exit pupil~the mirror: 42.862 mm the mirror~the screen: 1270.000 mm effective aperture of the auxiliary lens: 80.000 mm effective aperture of the projecting lens: 40.000 mm Embodiment 30

Figure 65:
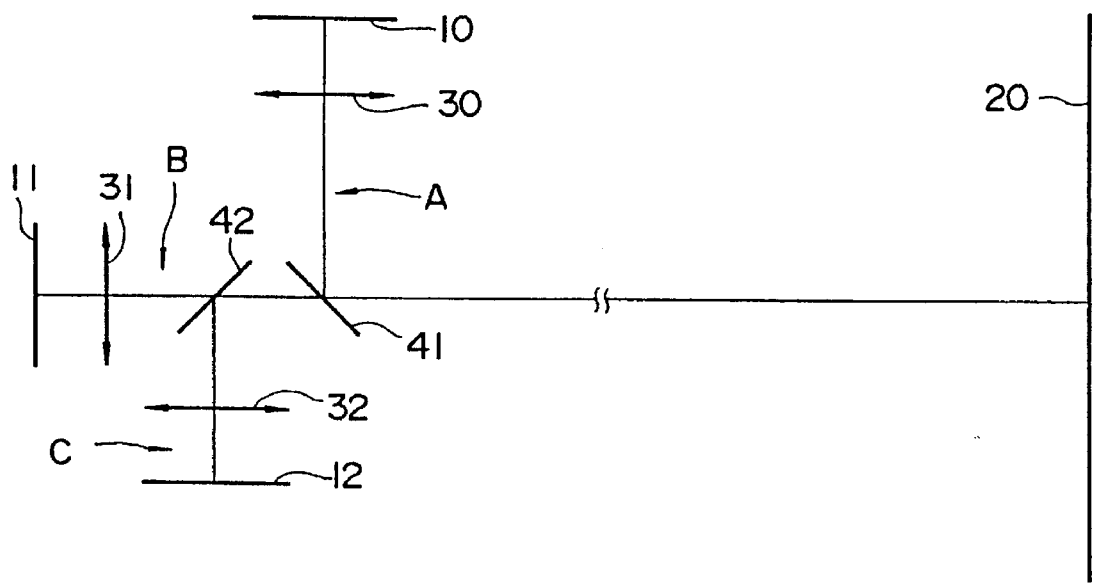
FIG. 65 is a schematic view of a projector of embodiment 30 according to the present invention.
Figure 66:
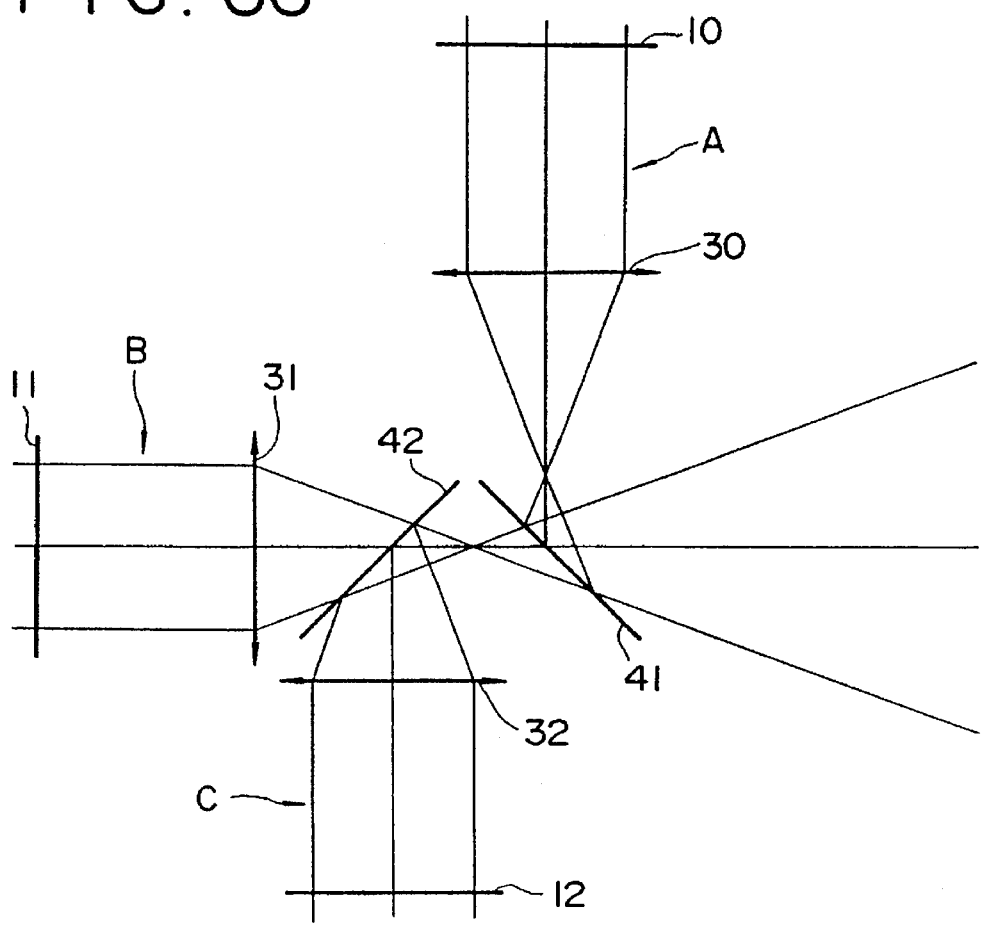
FIG. 66 is an enlarged view of the light path overlapping portion in FIG. 65.

FIGS. 65 and 66 show embodiment 30 of the projector according to the present invention. FIG. 65 is an overall view, and FIG. 66 is an enlarged view of a portion for overlapping the luminous flux.

As shown in FIGS. 65 and 66, the projector is constructed such that the luminous flux coming from three projecting optical systems A, B, C comprising the LCDs 10, 11, 12 and the auxiliary lenses 13, 14, 15 are overlapped by two dichroic mirrors 41, 42 disposed independently and then made incident to the projecting lens 30.

In FIG. 65, one central principal ray is shown for each projecting optical system, and in FIG. 66, three principal rays are shown for each of them.

The dichroic mirror 41 has such characteristics that the R component is reflected and other components are permitted to transmit therethrough, and the other dichroic mirror 42 has such characteristics that the B component is reflected and other components are permitted to transmit therethrough. Also, the dichroic mirrors are tilted by 45° relative to the optical axis of the projecting lens 31, respectively.

According to this construction, the parallel luminous flux of the various color components transmitted through the respective LCDs is made into a convergent light by the projecting lens and made incident to the dichroic mirrors 41, 42. And these luminous fluxes are overlapped one upon the other by the dichroic mirrors 41, 42 and projected onto the screen 20 in the overlapping state to form a color image thereon.

A concrete numerical example will now be described:

The numerical values set forth hereunder are related to the projecting optical systems B, C. With regard to the projecting optical system A, the distance from the exit pupil to the mirror 41 is the same (110 mm) to the other projecting optical systems although the mirror 42 is not provided.

focal length of the projecting lens: 80.000 mm the image forming means~the projecting lens: 85.161 mm the projecting lens~the mirror 42: 50.000 mm the mirror 42~the mirror 41: 60.000 mm the mirror 41~the screen: 1210.000 mm effective aperture of the projecting lenses: 90.000 mm Embodiment 31

Figure 67:
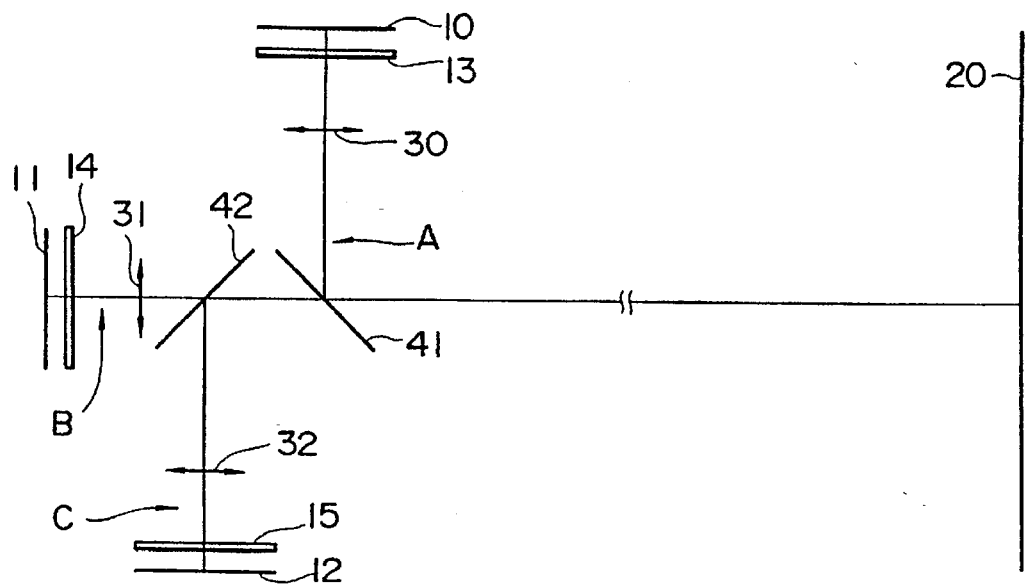
FIG. 67 is a schematic view of a projector of embodiment 31 according to the present invention.
Figure 68:
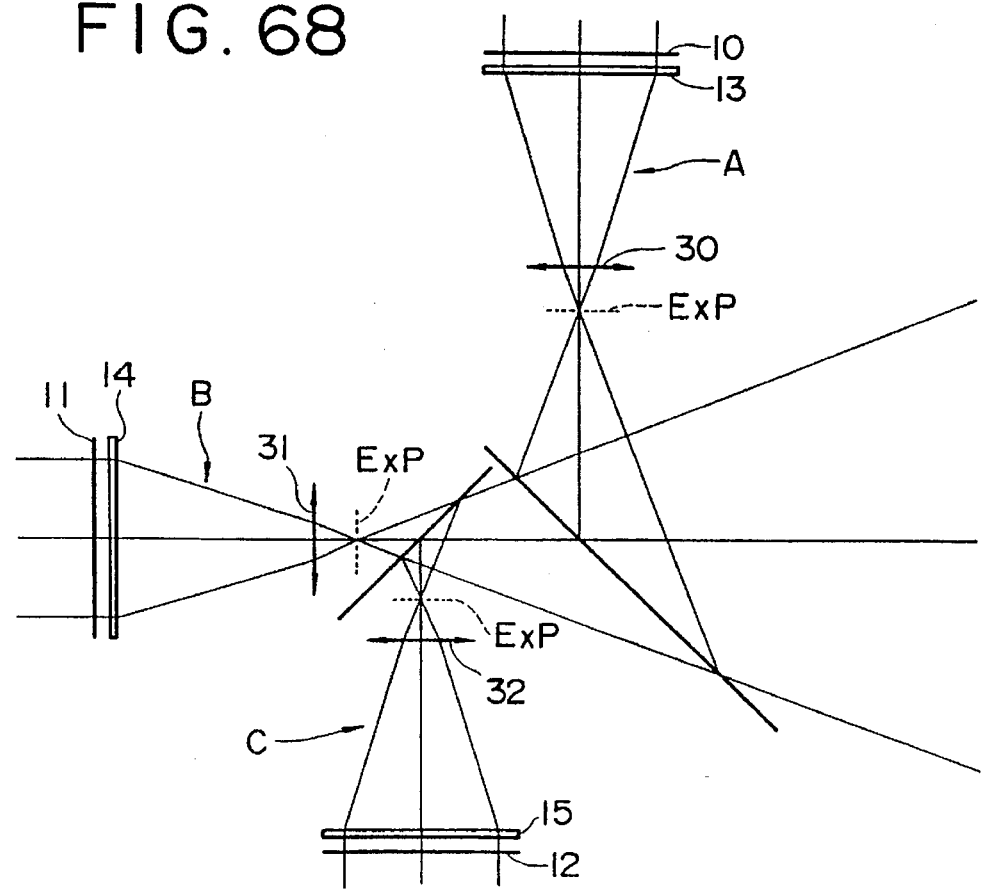
FIG. 68 is an enlarged view of the light path overlapping portion in FIG. 67.

FIGS. 67 and 68 show embodiment 31 of the projector according to the present invention. FIG. 67 is an overall view, and FIG. 68 is an enlarged view of a portion for overlapping the luminous flux.

This projector has the auxiliary lenses 13, 14, 15 disposed between the LCDs and the projecting lenses and is adapted to reduce the diameter of the luminous flux coming from the respective LCDs. All the other constructions are the same as those of embodiment 30.

With this construction, the diameter of the luminous flux made incident to the projecting lenses is reduced and the diameter of the projecting lens becomes smaller than embodiment 30.

Next, a concrete numerical example will be described:

The thickness of the auxiliary lens is 2.000 mm.

The numerical values set forth hereunder are related to the projecting optical systems B, C. With regard to the projecting optical system A, the distance from the exit pupil to the mirror 41 is the same (90 mm) to the other projecting optical systems, although the mirror 42 is not provided.

focal length of the auxiliary lens: 100.000 mm focal length of the projecting lens: 80.000 mm the image forming means~incident surface of the auxiliary lens: 7.000 mm the outgoing surface of the auxiliary lens~the projecting lens: 78.023 mm the projecting lens~exit pupil: 17.241 mm exit pupil~the mirror 42: 25.000 mm the mirror 42~the mirror 41: 65.000 mm the mirror 41~the screen: 1125.960 mm effective aperture of the auxiliary lens: 80.000 mm effective aperture of the projecting lens: 50.000 mm Embodiment 32

Figure 69:
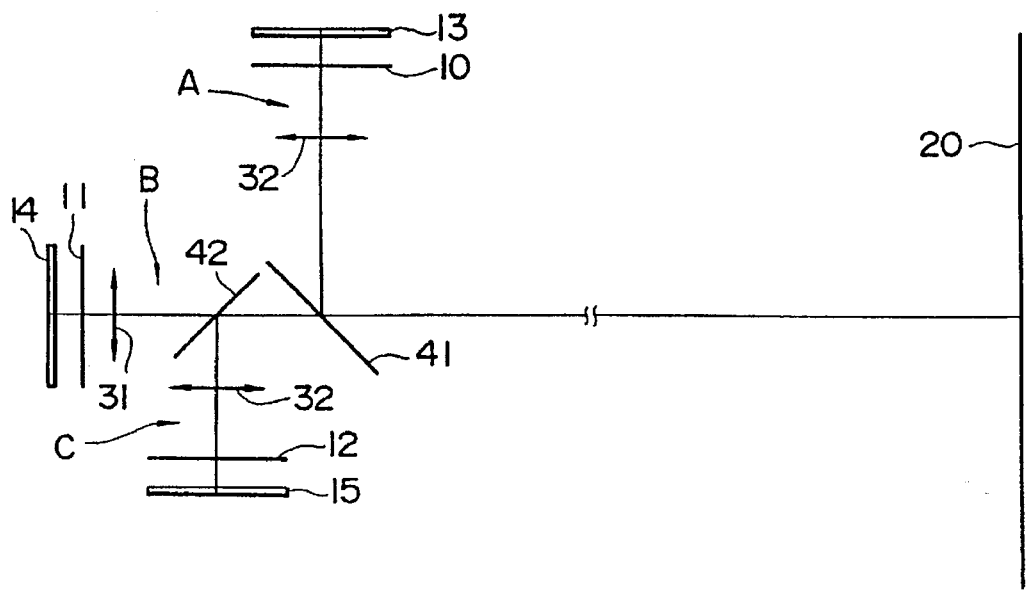
FIG. 69 is a schematic view of a projector of embodiment 32 according to the present invention.
Figure 70:
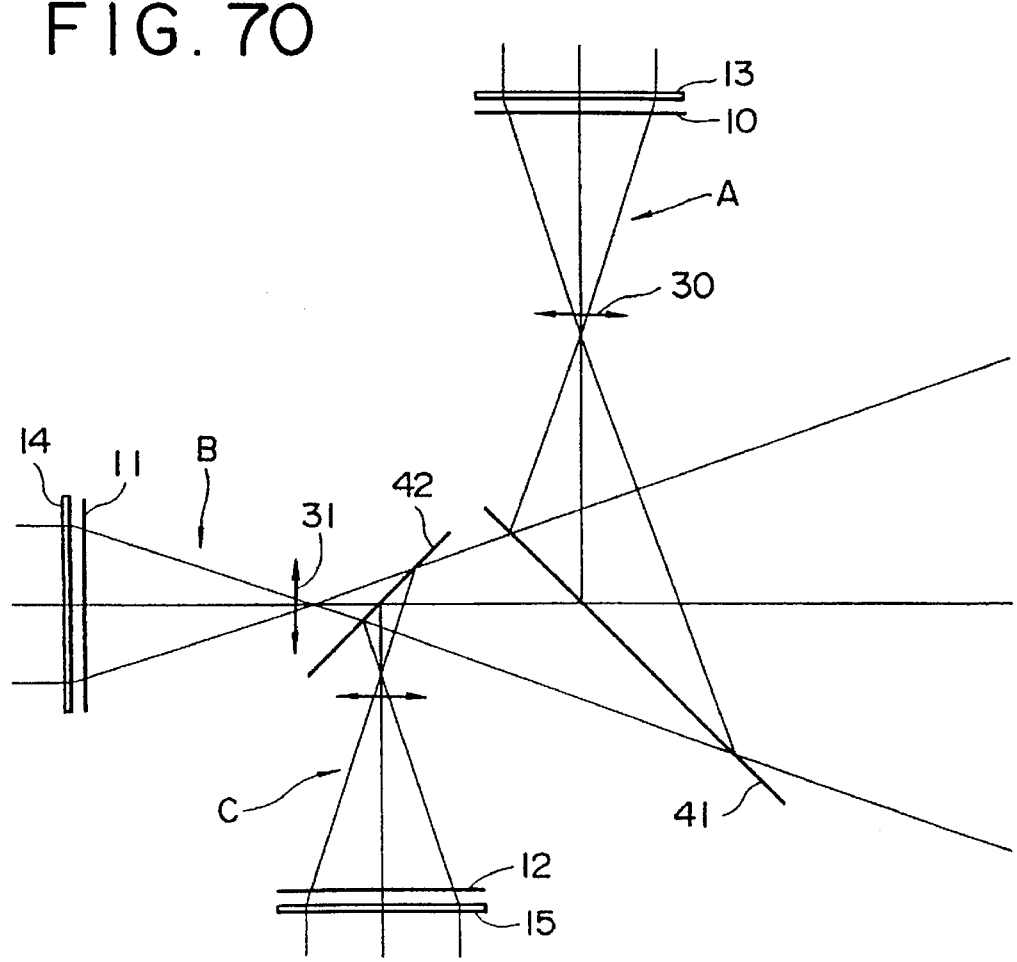
FIG. 70 is an enlarged view of the light path overlapping portion in FIG. 69.

FIGS. 69 and 70 show embodiment 32 of the projector according to the present invention. FIG. 69 is an overall view, and FIG. 70 is an enlarged view of a portion for overlapping the luminous flux.

This projector has the auxiliary lenses disposed between a light source and the LCDs and is adapted to reduce the diameter of the luminous flux made incident to the LCD. All the other constructions are the same as those of embodiment 31.

In embodiment 31, the parallel luminous flux is made incident to the LCD and is thus preferable. However, it has created such a state where irregularity of transmittance readily occurs to the dichroic mirror. To the contrary, in the case of embodiment 32, the projector is preferable to that of embodiment 31 in view of the performance of the dichroic mirror.

A concrete numerical construction will now be described:

The numerical values set forth hereunder are related to the projecting optical systems B, C. With regard to the projecting optical system A, the distance from the projecting lens to the mirror 41 is the same (110 mm) as the other projecting optical systems, although the mirror 42 is not provided.

focal length of the auxiliary lens: 100.000 mm focal length of the projecting lens: 80.000 mm the outgoing surface of the auxiliary lens~the image forming means: 7.000 mm the image forming means~the projecting lens: 85.161 mm the projecting lens~the mirror 42: 30.000 mm the mirror 42~the mirror 41: 80.000 mm the mirror 41~the screen: 1210.000 mm effective aperture of the auxiliary lens: 80.000 mm effective aperture of the projecting lens: 40.000 mm

What is claimed is:

1. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said images forming means is disposed between said corresponding auxiliary lens system and said at least one projecting lens; said projector having an optical axis along which said means for forming plural images projects the plural images, wherein at least one of said means for forming images emits light beams which are not deflected by one of said mirror surfaces, said at least one of said means for forming images that emits the light beams which are not deflected by one of said mirror surfaces being symmetrically arranged with respect to said optical axis of the projector;

wherein said at least one mirror surface comprises two dichroic mirror surfaces which intersect with each other, wherein said dichroic mirror surfaces are disposed within a prism; and wherein said at least one projecting lens comprises a projecting lens corresponding to each said means for forming images, wherein each said projecting lens is disposed between said corresponding images forming means and said prism.

2. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said images forming means is disposed between said corresponding auxiliary lens system and said at least one projecting lens, said projector having an optical axis along which said means for forming plural images projects the plural images, wherein at least one of said means for forming images emits light beams which are not deflected by one of said mirror surfaces, said at least one of said means for forming images that emits the light beams which are not deflected by one of said mirror surfaces being symmetrically arranged with respect to said optical axis of the projector;

said at least one mirror surface comprises two dichroic mirror surfaces which intersect with each other, said dichroic mirror surfaces comprise plate mirrors; and wherein said at least one projecting lens comprises a projecting lens corresponding to each said means for forming images, wherein each said projecting lens is disposed between said corresponding images forming means and said plate mirrors.

3. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said images forming means is disposed between said corresponding auxiliary lens system and said at least one projecting lens, said projector having an optical axis along which said means for forming plural images projects the plural images, wherein at least one of said means for forming images emits light beams which are not deflected by one of said mirror surfaces, said at least one of said means for forming images that emits the light beams which are not deflected by one of said mirror surfaces being symmetrically arranged with respect to said optical axis of the projector;

said at least one mirror surface comprises two dichroic mirror surfaces which are separate from each other, said dichroic mirror surfaces being aligned along said optical axis of the projector; and wherein said at least one projecting lens comprises a projecting lens corresponding to each said means for forming images, wherein each said projecting lens is disposed between said corresponding images forming means and one of said dichroic mirror surfaces.

4. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said auxiliary lens system is disposed between said corresponding images forming means and said at least one projecting lens; said projector having an optical axis along which said means for forming plural images projects the plural images, wherein at least one of said means for forming images emits light beams which are not deflected by one of said mirror surfaces, said at least one of said means for forming images that emits the light beams which are not deflected by one of said mirror surfaces being symmetrically arranged with respect to said optical axis of the projector;

said at least one mirror surface comprises two dichroic mirror surfaces which intersect with each other, said dichroic mirror surfaces comprise plate mirrors.

5. The projector of claim 4, wherein said at least one projecting lens comprises a projecting lens corresponding to each said means for forming images, wherein each said projecting lens is disposed between said corresponding images forming means and said plate mirrors.

6. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said auxiliary lens system is disposed between said corresponding images forming means and said at least one projecting lens; said projector having an optical axis along which said means for forming plural images projects the plural images, wherein at least one of said means for forming images emits light beams which are not deflected by one of said mirror surfaces, said at least one of said means for forming images that emits the light beams which are not deflected by one of said mirror surfaces being symmetrically arranged with respect to said optical axis of the projector;

said at least one mirror surface comprises two dichroic mirror surfaces which are separate from each other, said dichroic mirror surfaces being aligned along said optical axis of the projector.

7. The projector of claim 6, wherein said at least one projecting lens comprises a projecting lens corresponding to each said means for forming images, wherein each said projecting lens is disposed between said corresponding images forming means and one of said plate mirrors.

8. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said auxiliary lens system is disposed between said corresponding images forming means and said at least one projecting lens; said projector having an optical axis along which said means for forming plural images projects the plural images, wherein at least one of said means for forming images emits light beams which are not deflected by one of said mirror surfaces, said at least one of said means for forming images that emits the light beams which are not deflected by one of said mirror surfaces being symmetrically arranged with respect to said optical axis of the projector;

said at least one mirror surface comprises two dichroic mirror surfaces which intersect with each other, said dichroic mirror surfaces being disposed within a prism.

9. The projector of claim 8, wherein said at least one projecting lens comprises a projecting lens corresponding to each said means for forming images, wherein each said projecting lens is disposed between said corresponding images forming means and said prism.

10. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said at least one means for forming images associated with each said mirror surface, is asymmetrically arranged with respect to an optical axis of said corresponding auxiliary lens system, and at least one of said means for forming images is not associated with one of said mirror surfaces and is symmetrically arranged with respect to an optical axis of said corresponding auxiliary lens system.

11. The projector of claim 10 having an optical axis along which said means for forming plural images projects the plural images, wherein said at least one of said means for forming images not associated with one of said mirror surfaces is symmetrically arranged with respect to said optical axis of the projector;

wherein said at least one mirror surface comprises two dichroic mirror surfaces which intersect with each other.

12. The projector of claim 11 wherein each said images forming means projects luminous flux comprising color components and each said dichroic mirror surface reflects the color components from one of said images forming means and transmits the color components projected from at least one other of said images forming means.

13. The projector of claim 11, wherein said dichroic mirror surfaces comprise plate mirrors.

14. The projector of claim 13, wherein each said auxiliary lens system is disposed between said corresponding images forming means and said at least one projecting lens.

15. The projector of claim 13, wherein each said images forming means is disposed between said corresponding auxiliary lens system and said at least one projecting lens.

16. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said auxiliary lens system is further adapted to transmit parallel luminous flux after reducing the cross-sectional area of luminous flux emitted from each said image forming means, said projector having an optical axis along which said means for forming plural images projects the plural images, at least one of said means for forming images emits light beams which are not deflected by one of said mirror surfaces, wherein said at least one of said means for forming images that emits light beams which are not deflected by one of said mirror surfaces is symmetrically arranged with respect to said optical axis of the projector;

wherein said at least one mirror surface comprises two dichroic mirror surfaces which intersect with each other, wherein said dichroic mirror surfaces are disposed within a prism.

17. The projector of claim 16, further comprising:

an auxiliary lens disposed between said at least one projecting lens and said prism.

18. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said auxiliary lens system is further adapted to transmit parallel luminous flux after reducing the cross-sectional area of luminous flux emitted from each said image forming means; said projector having an optical axis along which said means for forming plural images projects the plural images, at least one of said means for forming images emits light beams which are not deflected by one of said mirror surfaces, wherein said at least one of said means for forming images that emits light beams which are not deflected by one of said mirror surfaces is symmetrically arranged with respect to said optical axis of the projector;

wherein said at least one mirror surface comprises two dichroic mirror surfaces which intersect with each other, wherein said dichroic mirror surfaces comprise plate mirrors.

19. The projector of claim 18, further comprising:

an auxiliary lens disposed between said at least one projecting lens and said plate mirrors.

20. A projector comprising:

means for forming plural images comprising at least two means for forming images;

at least one projecting lens for projecting images which are formed by said images forming means;

at least one mirror surface disposed between one of said means for forming images and said screen, wherein each said at least one mirror surface deflects only light beams which are emitted from said one of said means for forming images; and an auxiliary lens system, corresponding to each said images forming means adapted to reduce the cross-sectional area of luminous flux emitted from each said image forming means;

wherein each said auxiliary lens system is further adapted to transmit parallel luminous flux after reducing the cross-sectional area of luminous flux emitted from each said image forming means; said projector having an optical axis along which said means for forming plural images projects the plural images, at least one of said means for forming images emits light beams which are not deflected by one of said mirror surfaces, wherein said at least one of said means for forming images that emits light beams which are not deflected by one of said mirror surfaces is symmetrically arranged with respect to said optical axis of the projector;

said at least one mirror surface comprises two dichroic mirror surfaces which are separate from each other, said dichroic mirror surfaces being aligned along said optical axis of the projector.

21. The projector of claim 20, further comprising:

an auxiliary lens disposed between said at least one projecting lens and one of said dichroic mirror surfaces.

22. A projector comprising:

means for forming plural images comprising at least two means for forming images;

at least one projecting lens for projecting images which are formed by said images forming means; and at least one mirror surface disposed between one of said means for forming images and said screen, wherein each said at least one mirror surface deflects only light beams which are emitted from said one of said means for forming images;

wherein said at least one projecting lens comprises a projecting lens corresponding to each said means for forming images, wherein each said projecting lens is disposed between said corresponding images forming means and at least one of said mirror surfaces.

23. The projector of claim 22, wherein each said projecting lens is disposed directly adjacent said corresponding means for forming images and directly adjacent said at least one of said mirror surfaces.

24. The projector of claim 22, having an optical axis along which said means for forming plural images projects the plural images, wherein said at least one of said means for forming images not associated with one of said mirror surfaces is symmetrically arranged with respect to said optical axis of the projector;

said at least one mirror surface comprises two dichroic mirror surfaces which intersect with each other, said dichroic mirror surfaces comprise plate mirrors.

25. The projector of claim 23 having an optical axis along which said means for forming plural images projects the plural images, wherein said at least one of said means for forming images not associated with one of said mirror surfaces is symmetrically arranged with respect to said optical axis of the projector;

said at least one mirror surface comprises two dichroic mirror surfaces which intersect with each other, said dichroic mirror surfaces being disposed within a prism.

26. The projector of claim 22 having an optical axis along which said means for forming plural images projects the plural images, wherein said at least one of said means for forming images not associated with one of said mirror surfaces is symmetrically arranged with respect to said optical axis of the projector;

said at least one mirror surface comprises two dichroic mirror surfaces which are separate from each other, said dichroic mirror surfaces being aligned along said optical axis of the projector.

27. A projector comprising:

means for forming plural images comprising at least two means for forming images;

at least one projecting lens for projecting images that are formed by said images forming means on a screen;

at least one dichroic plate type mirror disposed between one of said means for forming images and said screen, wherein each said at least one dichroic plate type mirror deflects only light beams which are emitted from said one of said means for forming images; and an auxiliary lens system, corresponding to each said images forming means and adapted to reduce the cross-sectional area of luminous flux emitted from each said images forming means;

wherein each said auxiliary lens system, corresponding to each said images forming means, comprises two auxiliary lenses; and wherein said two auxiliary lenses comprise a positive auxiliary lens and a negative auxiliary lens.

28. The projector of claim 27, further comprising an auxiliary lens system between said at least one dichroic plate type mirror and said at least one projecting lens.

29. The projector of claim 28, wherein said auxiliary lens system between said at least one dichroic plate type mirror and said at least one projecting lens consists of an auxiliary lens.

30. A projector comprising:

means for forming plural images comprising at least two means for forming images;

at least one projecting lens for projecting images that are formed by said images forming means on a screen; and at least one dichroic plate type mirror disposed between one of said means for forming images and said screen, wherein each said at least one dichroic plate type mirror deflects only light beams which are emitted from said one of said means for forming images;

wherein said projector has an optical axis along which said means for forming plural images projects the plural images, wherein one of said at least two means for forming images emits light beams which are not deflected by one of said dichroic plate type mirrors and is symmetrically arranged with respect to the optical axis of the projector; and at least one of said at least two means for forming plural images being associated with one of said at least one dichroic plate type mirrors, and being symmetrically arranged about an optical axis which is substantially perpendicular to the optical axis of the projector; and said at least one dichroic plate type mirror comprises two dichroic plate type mirrors which intersect with the optical axis of the projector and do not intersect with each other.

31. The projector of claim 30, wherein said dichroic plate type mirrors each intersect with the optical axis of the projector at an angle of substantially 45 degrees.

32. The projector of claim 30, further comprising:

an auxiliary lens system, corresponding to each said images forming means adapted to reduce the cross-sectional area of luminous flux emitted from each said images forming means.

33. The projector of claim 32, wherein each said auxiliary lens system is disposed between each said corresponding images forming means and said at least one projecting lens.

34. The projector of claim 32, wherein each said auxiliary lens system is disposed between a light source used for illuminating said images forming means, and each said corresponding images forming means.

35. The projector of claim 32, wherein each said auxiliary lens system, corresponding to each said images forming means, comprises two auxiliary lenses.

36. The projector of claim 35, wherein said two auxiliary lenses comprise a positive auxiliary lens and a negative auxiliary lens.

37. The projector of claim 32, further comprising an auxiliary lens system between said at least one dichroic plate type mirror and said at least one projecting lens.

38. The projector of claim 35, further comprising an auxiliary lens system between said at least one dichroic plate type mirror and said at least one projecting lens.

39. The projector of claim 30, wherein said at least one projecting lens for projecting images comprises an independent projecting lens corresponding to each of said at least two means for forming images.

40. The projector of claim 39, wherein each said independent projecting lens is located between a corresponding one of said means for forming images and one of said dichroic plate type mirrors.

41. A projector comprising:

means for forming plural images comprising at least two means for forming images;

at least one projecting lens for projecting images that are formed by said images forming means on a screen; and at least one dichroic plate type mirror disposed between one of said means for forming images and said screen, wherein each said at least one dichroic plate type mirror deflects only light beams which are emitted from said one of said means for forming images, wherein said at least one dichroic plate type mirror comprises two dichroic plate type mirror surfaces which intersect to form a roof shape comprising a ridge line formed by the intersection of said two dichroic plate type mirror surfaces, wherein said ridge line faces said screen and wherein light beams emitted from only one other of said images forming means pass through each of said at least one dichroic plate type mirror.

42. The projector of claim 41, further comprising:

an auxiliary lens system, corresponding to each said images forming means and adapted to reduce the cross-sectional area of luminous flux emitted from each said images forming means.

43. The projector of claim 42, wherein each said at least one means for forming images associated with each said dichroic plate type mirror is asymmetrically arranged with respect to an optical axis of said corresponding auxiliary lens system, and at least one of said means for forming images emits light beams which are not deflected by one of said dichroic plate type mirrors, and is symmetrically arranged with respect to an optical axis of said corresponding auxiliary lens system.

44. The projector of claim 41 wherein each said images forming means projects luminous flux comprising color components and each said dichroic plate type mirror reflects the color components from one of said images forming means and transmits the color components projected from one other of said images forming means.

45. The projector of claim 41, wherein said at least one projecting lens for projecting images comprises an independent projecting lens corresponding to each of said at least two means for forming images.

46. The projector of claim 45, having an optical axis along which said means for forming plural images projects the plural images, wherein one of said at least two means for forming images emits light beams which are not deflected by one of said dichroic plate type mirrors and is symmetrically arranged with respect to the optical axis of the projector; and at least one of said at least two means for forming plural images being associated with one of said at least one dichroic plate type mirrors, and being symmetrically arranged about an optical axis which is substantially perpendicular to the optical axis of the projector.

47. The projector of claim 41, wherein said two dichroic plate type mirrors are each disposed at substantially 45 degrees with respect to an optical axis of the projector.

48. The projector of claim 42, wherein each said auxiliary lens system is disposed between each said corresponding images forming means and said at least one projecting lens.

49. The projector of claim 42, wherein each said auxiliary lens system is disposed between a light source used for illuminating said images forming means, and each said corresponding images forming means.

50. The projector of claim 43, wherein each said auxiliary lens system is disposed between each said corresponding images forming means and said at least one projecting lens.

51. The projector of claim 43, wherein each said auxiliary lens system is disposed between a light source used for illuminating said images forming means, and each said corresponding images forming means.

52. The projector of claim 41, wherein each of said at least two means for forming images is symmetrically arranged with respect to an optical axis thereof.

53. A projector comprising:
means for forming plural images comprising at least two means for forming images;
an auxiliary lens system, corresponding to at least one of said at least two means for forming images and adapted to reduce the cross-sectional area of luminous flux emitted from said at least one of said at least two means for forming images;
at least one projecting lens for projecting images that are formed by said images forming means on a screen; and
at least one dichroic plate type mirror disposed between one of said means for forming images and said screen, wherein each said at least one dichroic plate type mirror deflects only light beams which are emitted from said one of said means for forming images; and wherein said projector has an optical axis along which said means for forming plural images projects the plural images, wherein one of said at least two means for forming images emits light beams which are not deflected by one of said dichroic plate type mirrors, and is symmetrically arranged with respect to the optical axis of the projector.

54. The projector of claim 53, wherein said at least one dichroic plate type mirror comprises two dichroic plate type mirrors which intersect with each other.

55. The projector of claim 54, further comprising an optical path along which said at least one symmetrically arranged means for forming images projects said images; wherein said two dichroic plate type mirrors are disposed to each cover substantially half of said optical path.

56. The projector of claim 54, wherein said two dichroic plate type mirrors are each disposed at substantially 45 degrees with respect to an optical axis of the projector.

57. The projector of claim 54, wherein said two dichroic plate type mirrors intersect to form a roof shape.

58. The projector of claim 55, wherein said two dichroic plate type mirrors intersect.

59. The projector of claim 55, wherein said two dichroic plate type mirrors are arranged to form a roof shape.

60. The projector of claim 58, wherein said two dichroic plate type mirrors form a roof shape.

61. The projector of claim 55, wherein said two dichroic plate type mirrors are each disposed at substantially 45 degrees with respect to an optical axis of the projector.

62. The projector of claim 54, wherein said two dichroic plate type mirrors are arranged to form an X shape.

63. The projector of claim 54, wherein said dichroic plate type mirrors intersect at a point of intersection of optical axes of at least two of said images forming means.

64. A projector comprising:
means for forming plural images comprising at least two means for forming images;
at least two projecting lenses adapted for projecting images which are formed by said at least two image forming means, respectively, said at least two projecting lenses projecting images on a screen; and
at least one dichroic mirror surface disposed between one of said means for forming images and said screen, wherein each said at least one dichroic mirror surface deflects only light beams which are emitted from said one of said means for forming images, and wherein said at least two projecting lenses are located between said at least two image forming means and said at least one dichroic mirror surface, respectively.

65. The projector of claim 64 having an optical axis along which said means for forming plural images projects the plural images, wherein one of said at least two means for forming images emits light beams which are not deflected by one of said dichroic mirror surfaces, and is symmetrically arranged with respect to the optical axis of the projector.

66. The projector of claim 65, wherein said at least one dichroic mirror surface comprises two dichroic mirror surfaces which intersect with each other.

67. The projector of claim 66, further comprising an optical path along which said at least one symmetrically arranged means for forming images projects said images; wherein said two dichroic mirror surfaces are disposed to each traverse substantially half of said optical path.

68. The projector of claim 64, wherein said at least one dichroic mirror surface comprises two dichroic mirror surfaces which intersect to form a roof shape.

69. The projector of claim 68, wherein said two dichroic mirror surfaces are each disposed at substantially 45 degrees with respect to an optical axis of the projector.

70. The projector of claim 66, wherein said two dichroic mirror surfaces are each disposed at substantially 45 degrees with respect to an optical axis of the projector.

71. The projector of claim 66, wherein said two dichroic mirror surfaces intersect to form a roof shape.

72. The projector of claim 67, wherein said two dichroic mirror surfaces intersect.

73. The projector of claim 67, wherein said two dichroic mirror surfaces are arranged to form a roof shape.

74. The projector of claim 72, wherein said two dichroic mirror surfaces form a roof shape.

75. The projector of claim 67, wherein said two dichroic mirror surfaces are each disposed at substantially 45 degrees with respect to an optical axis of the projector.

76. The projector of claim 64 wherein each said images forming means projects luminous flux comprising color components and each said dichroic mirror surface reflects the color components from one of said images forming means and transmits the color components projected from at least one other of said images forming means.

77. The projector of claim 66, wherein said dichroic mirror surfaces are disposed within a prism.

78. The projector of claim 77, wherein said dichroic mirror surfaces intersect at a point of intersection of optical axes of at least two of said images forming means.

79. The projector of claim 77, wherein said dichroic mirror surfaces intersect at a point of intersection of optical axes of three of said images forming means.

80. The projector of claim 64, wherein each of said at least two means for forming images is symmetrically arranged with respect to an optical axis thereof.

81. The projector of claim 64, having an optical axis along which said means for forming plural images projects the plural images, wherein one of said at least two means for forming images is not associated with one of said dichroic mirror surfaces and is symmetrically arranged with respect to the optical axis of the projector; and at least one of said at least two means for forming plural images being associated with one of said at least one dichroic mirror surfaces, and being symmetrically arranged about an optical axis which is substantially perpendicular to the optical axis of the projector.

82. The projector of claim 81, wherein said dichroic mirror surfaces are disposed within a prism, and wherein said dichroic mirror surfaces intersect at a point of intersection of the optical axes of at least two of said images forming means.

83. The projector of claim 82, wherein said dichroic mirror surfaces are disposed within a prism, and wherein said dichroic mirror surfaces intersect at a point of intersection of the optical axes of at least three of said images forming means.

84. The projector of claim 64, further comprising:

an auxiliary lens system, corresponding to each said images forming means and adapted to reduce the cross-sectional area of luminous flux emitted from each said image forming means.

85. The projector of claim 84, wherein each said auxiliary lens system is disposed between each said corresponding images forming means and a corresponding one of said at least two projecting lenses.

86. The projector of claim 84, wherein each said auxiliary lens system is disposed between a light source used for illuminating said images forming means, and each said corresponding images forming means.

87. The projector of claim 74, further comprising:

an auxiliary lens system, corresponding to each said images forming means and adapted to reduce the cross-sectional area of luminous flux emitted from each said image forming means.

88. The projector of claim 87, wherein each said auxiliary lens system is disposed between each said corresponding images forming means and a corresponding one of said at least two projecting lenses.

89. The projector of claim 87, wherein each said auxiliary lens system is disposed between a light source used for illuminating said images forming means, and each said corresponding images forming means.

90. The projector of claim 89, further comprising an exit pupil substantially coinciding with an incident face of said prism.

91. The projector of claim 66, wherein said two dichroic mirror surfaces are arranged to form an X shape.

92. The projector of claim 91, wherein said dichroic mirror surfaces intersect at a point of intersection of optical axes of at least two of said images forming means.

93. The projector of claim 66, wherein said two dichroic mirror surfaces are arranged upon plate-type mirrors.

94. The projector of claim 91, further comprising:

an auxiliary lens system, corresponding to each said images forming means and adapted to reduce the cross-sectional area of luminous flux emitted from each said images forming means.

95. The projector of claim 94, wherein each said auxiliary lens system is disposed between each said corresponding images forming means and a corresponding one of said at least two projecting lenses.

96. The projector of claim 94, wherein each said auxiliary lens system is disposed between a light source used for illuminating said images forming means, and each said corresponding images forming means.

97. The projector of claim 64 having an optical axis along which said means for forming plural images projects the plural images;

wherein said at least one dichroic mirror surface comprises two dichroic mirror surfaces which intersect with the optical axis of the projector and do not intersect with each other.

98. The projector of claim 97, wherein said dichroic mirror surfaces comprise plate mirrors.

99. The projector of claim 97, wherein said dichroic mirror surfaces each intersect with the optical axis of the projector at an angle of substantially 45 degrees.

100. The projector of claim 97, further comprising:

an auxiliary lens system, corresponding to each said images forming means and adapted to reduce the cross-sectional area of luminous flux emitted from each said images forming means.

101. The projector of claim 100, wherein each said auxiliary lens system is disposed between each said corresponding images forming means and a corresponding one of said at least two projecting lenses.

102. The projector of claim 97, wherein each said auxiliary lens system is disposed between a light source used for illuminating said images forming means, and each said corresponding images forming means.

* * * * *